United States Patent
Talebi Fard et al.

(10) Patent No.: US 11,632,705 B2
(45) Date of Patent: Apr. 18, 2023

(54) DEVICE CONFIGURATION FOR TIME SENSITIVE NETWORK BRIDGE

(71) Applicant: Ofinno, LLC, Reston, VA (US)

(72) Inventors: Peyman Talebi Fard, Vienna, VA (US); Esmael Hejazi Dinan, McLean, VA (US); Jinsook Ryu, Oakton, VA (US); Kyungmin Park, Vienna, VA (US); Weihua Qiao, Herndon, VA (US); Jayshree Bharatia, Plano, TX (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/509,326

(22) Filed: Oct. 25, 2021

(65) Prior Publication Data
US 2022/0046513 A1 Feb. 10, 2022

Related U.S. Application Data

(63) Continuation of application No. 16/788,412, filed on Feb. 12, 2020, now Pat. No. 11,178,592.

(60) Provisional application No. 62/806,185, filed on Feb. 15, 2019.

(51) Int. Cl.
*H04W 40/24* (2009.01)
*H04W 76/12* (2018.01)
*H04L 45/02* (2022.01)

(52) U.S. Cl.
CPC .......... *H04W 40/246* (2013.01); *H04L 45/04* (2013.01); *H04W 40/248* (2013.01); *H04W 76/12* (2018.02)

(58) Field of Classification Search
CPC . H04W 40/246; H04W 40/248; H04W 76/12; H04L 45/04
See application file for complete search history.

(56) References Cited

U.S. PATENT DOCUMENTS

| | | | |
|---|---|---|---|
| 2018/0184438 A1 | 6/2018 | Cavalcanti et al. | |
| 2021/0007160 A1* | 1/2021 | Sivasiva Ganesan | H04W 28/0268 |
| 2021/0084713 A1* | 3/2021 | Miklós | H04W 8/082 |
| 2021/0112001 A1* | 4/2021 | Li | H04W 76/12 |
| 2021/0274375 A1* | 9/2021 | Li | H04W 28/24 |

(Continued)

FOREIGN PATENT DOCUMENTS

| | | |
|---|---|---|
| CN | 109286567 B | 1/2019 |
| KR | 20180021636 A | 3/2018 |
| WO | 201813198 A1 | 1/2018 |

OTHER PUBLICATIONS

S2-1811769 23734 Evaluation of Solutions for KI#3.1 and KI#3.2; SA WG2 Meeting #129Bis; Nov. 26-30, 2018, West Palm Beach, US; Source:Samsung; Title:Evaluation of Solutions for KI#3.1 and KI#3.2; Document for: Approval; Agenda Item:6.15.

(Continued)

*Primary Examiner* — Hashim S Bhatti
(74) *Attorney, Agent, or Firm* — Sachin Kandhari; Kavon Nasabzadeh; Philip R. Smith

(57) ABSTRACT

A session management function (SMF) receives, from a wireless device, time sensitive networking (TSN) bridge parameter comprising port information of a TSN bridge. The SMF sends, to a policy and charging function (PCF), a request for policy information, the request comprising the TSN bridge parameter. The SMF receives, from the PCF, a response to the request, the response comprising policy information for the wireless device.

20 Claims, 48 Drawing Sheets

(56) References Cited

U.S. PATENT DOCUMENTS

| | | | |
|---|---|---|---|
| 2021/0274585 A1* | 9/2021 | Yu | H04L 12/1407 |
| 2021/0368331 A1* | 11/2021 | Ke | H04B 17/364 |
| 2022/0046462 A1* | 2/2022 | De Andrade Jardim | H04L 47/2416 |

OTHER PUBLICATIONS

S2-1811770 23734 Conclusion for KI#3.1 and KI#3.2; SA WG2 Meeting #129Bis; Nov. 26-30, 2018, West Palm Beach, US; Source:Samsung; Title:Conclusion for KI#3.1 and KI#3.2; Document for:Approval; Agenda Item:6.15.
S2-1811826-TSNArchitecture-Conclusion-v1; SA WG2 Meeting #129bis; Nov. 26-30, 2018, West Palm Beach, USA(was S2-181xxxx); Source:Nokia, Nokia Shanghai Bell, Qualcomm Incorporated, Ericsson, ZTE; Title:Overall evaluation and conclusion of key issues 3.1; Document for:Discussion/Approval.
S2-1811827-TSNBridgeModel; Sa WG2 Meeting #129bis; November 26-30, 2018West Palm Beach FL; Source:Nokia, Nokia Shanghai Bell; Title:KI#3.1—TSN—Updates to Solution #8 architecture; Document for:Discussion/Approval; Agenda Item:6.15.2.
S2-1811828-TSN-Sol8-BridgeModel-TSNTasks-v0; SA WG2 Meeting #129bis; Nov. 26-30, 2018 West Palm Beach FL; Source:Nokia, Nokia Shanghai Bell; Title:KI#3.1—TSN—Definition of potential Impacts on Existing Nodes and Functionality of 5GS bridge model; Document for:Discussion/Approval.
S2-1811831-TSN-QoSFramework-update_v7; ISA WG2 Meeting #129bis; Nov. 26-30, 2018West Palm Beach FL; Source:Nokia, Nokia Shanghai Bell; Title:TSN—QoS Framework Solution Update; Document for:Discussion/Approval.
S2-1812193-TSNKeyIssue1-QoS-Conclusion; SA WG2 Meeting #129bis; 3 Nov. 26-30, 2018, West Palm Beach, USA(was S2-181xxxx); Source:Nokia, Nokia Shanghai Bell; Title:Updates to Overall evaluation and conclusion of key issues 3.1; Document for:Discussion/Approval.
S2-1812232 TR23734 pCR Solution #18 updating for 5GS bridge sets up and QoS profile generation; 3GPP TSG-SA WG2 Meeting #129Bis; 2; West Palm Beach, USA, Nov. 26-Nov. 30, 2018; Source:Huawei, HiSilicon; Title:Updates on Solution #18; Document for:Approval; Agenda Item:6.15.2.
S2-1812295 Discussion and proposal on solution to key issue#3.1; SA WG2 Meeting #129bis; Nov. 26-30, 2018, West Palm Beach, USA(revision of S2-18xxxxx); Source:ZTE; Title:Discussion and proposal on solution to key Issue#3.1; Document for:Approval; Agenda Item:6.15.2.
S2-188101-TSN-QoSFramework-v2; SA WG2 Meeting #128-Bis; Aug. 20-24, 2018, Sophia Antipolis; Source: Nokia, Nokia Shanghai Bell; Title:TSN—QoS Framework; Document for:Discussion/Approval.
S2-188233-TR23.734 Solution for KI 3_QoS negotiation between 3GPP and TSN networks v1; SA WG2 Meeting #128Bis; Aug. 20-24, 2018, Sophia Antipolis, France(revision of S2-18xxxx); Source:Huawei, HiSilicon; Title:QoS Negotiation between 3GPP and TSN networks KI#3.1; Document for:Approval; Agenda Item:6. 15.
S2-188459-Architecture_for_TSN_Integration_with_5G-v3; SA WG2 Meeting #128-Bis; Aug. 20-24, 2018, Sophia Antipolis-;Source:Nokia, Nokia Shanghai Bell; Title:Integration of the 5G System in a TSN network; Document for:Discussion/Approval.
S2-188976_8966_8569_7861_CR_URSP_User_pref_v7; SA WG2 Meeting #128-bis; Aug. 20-24, 2018, Sophia Antipolis, France (revision of S2-187861, 8569, 8966); CR-Form-v11.2; Change Request.
S2-1900288 TS 23.501 Support of UP based QoS negotiation between 3GPP and TSN networks v4; 3GPP TSG-SA2 Meeting #130; Jan. 21-25, 2019, Kochi, India; CR-Form-v11.2; Change Request.
S2-1900405 Enhancements to 5GS QoS framework for support of deterministic services; SA WG2 Meeting #130; 5 Jan. 21-25, 2019, Kochi, India; Source:Samsung; Title:Enhancements to 5GS QoS framework for support of deterministic services; Document for:Discussion and Agreement.
S2-1900407 23.501 CR Deterministic QoS Class; 3GPP TSG-SA WG2 Meeting #1130; Kochi, India, Jan. 21-25, 2019 ; CR-Form-v11.2; Change Request.
S2-1900517 Discussion on the Enhancements to 5GS QoS framework for support of deterministic services; SA WG2 Meeting #130; Jan. 21-25, 2019, Kochi, India(revision of S2-19xxxxx); Source:ZTE; Title:Discussion on the Enhancements to 5GS QoS framework for support of deterministic services; Document for:Approval; Agenda Item:6.15.2.
S2-1900557-TSC-definitions; SA WG2 Meeting #130 S2-190xxxx; Jan. 21-25, 2019, Kochi, India (revision of S2-1900557); CR-Form-v11.4; Change Request.
S2-1900558-TSC-v1; SA WG2 Meeting #130; Jan. 21-25, 2019, Kochi, India (revision of S2-190xxxx); CR-Form-v11.4; Change Request.
S2-1900559-TSN-QoS_Discussion_Paper_v2; SA WG2 Meeting #130; Jan. 21-25, 2019, Kochi, India; Source: Nokia, Nokia Shanghai Bell; Title:TSN—QoS; Document for:Discussion/Approval; Agenda Item:6.15.2.
S2-1900590 Discussion on system enhancement for TSN logical bridge management; 3GPP TSG-SA WG2 Meeting #130; Kochi, India, Jan. 21-Jan. 25, 2019(revision of S2-xxxxxxx); Source:Huawei, HiSilicon; Title:Discussion on system enhancement for TSN logical bridge management; Document for:Discussion/ Decision; Agenda Item:6.15.2.
S2-1900591 TS23.501 CR0885 System enhancement for TSN logical bridge management; 3GPP TSG-SA WG2 Meeting #130S2-1900501; Jan. 21-25, 2019, Kochi, India; CR-Form-v11.2; Change Request.
S2-1900592 TS23.502 CR0963 System enhancement for TSN logical bridge management; 3GPP TSG-SA WG2 Meeting #130; Jan. 21-25, 2019, Kochi, India; CR-Form-v11.2; Change Request.
S2-1900609_Soln#xx_Framwork of TSN QoS and traffic pattern mapping_pa2; 3GPP TSG-SA WG2 Meeting #130; Jan. 21-25, 2019, Kochi, India; CR-Form-v11.1;Change Request.
S2-1901150_was609_Soln#xx_Framwork of TSN QoS and traffic pattern mapping_pa2; 3GPP TSG-SA WG2 Meeting #130; Jan. 21-25, 2019, Kochi, India(revision of S2-1901150); CR-Form-v11. 1; Change Request.
S2-1901234_1151_was610_additional TSN traffic for RAN_pa2; 3GPP TSG-SA WG2 Meeting #130; Jan. 21-25, 2019, Kochi, India; CR-Form-v11.1; Change Request.
SA WG2 Meeting #129 S2-1811021; Oct. 15-19, 2018, Dongguan, China revision of S2-1811435); Huawei; QoS Negotiation between 3GPP and TSN networks KI#3.1.
3GPP TR 22.804 V16.1.0(Sep. 2018) 3rd Generation Partnership Project; Technical Specification Group Services and System Aspects; Study on Communication for Automation in Vertical Domains (Release 16).
3GPP TR 22.821 V16.1.0(Sep. 2018) 3rd Generation Partnership Project; Technical Specification Group Services and System Aspects; Feasibility Study on LAN Support in 5G (Release 16).
3GPP TR 23.501V15.2.0(Sep. 2018) 3rd Generation Partnership Project; Technical Specification Group Services and System Aspects; System Architecture for the 5G System; Stage 2 (Release 15).
3GPP TR 23.502 V15.4.0(Dec. 2018) 3rd Generation Partnership Project; Technical Specification Group Services and System Aspects; Procedures for the 5G System; Stage 2 (Release 15).
3GPP TR 23.503 V15.430(Sep. 2018) 3rd Generation Partnership Project; Technical Specification Group Services and System Aspects; Policy and Charging Control Framework for the 5G System; Stage 2 (Release 15).
3GPP TR 23.734 V0.2.0 (Sep. 2018) 3rd Generation Partnership Project; Technical Specification Group Services and System Aspects; Study on 5GS Enhanced support of vertical and LAN Services ; (Release 16).
3GPP TR 23.734 V0.3.0 (Oct. 2018) 3rd Generation Partnership Project; Technical Specification Group Services and System Aspects; Study on 5GS Enhanced support of vertical and LAN Services ; (Release 16).

(56) References Cited

OTHER PUBLICATIONS

3GPP TR 23.734 V16.0.0 (Dec. 2018) 3rd Generation Partnership Project; Technical Specification Group Services and System Aspects; Study on 5GS Enhanced support of vertical and LAN Services ; (Release 16).
3GPP TSG-RAN WG2 Meeting #103BIS R2-1814992 Chengdu, China, Oct. 8-12, 2018; Nokia, Nokia Shanghai Bell; Agenda Item 11.7.1.
IEEE 802.1 Q; Media Access Control Bridges and Virtual Bridged Local Area Network; Patricia Thaler, Norman Finn, Don Fedyk, Janos Farkas, Glenn Parsons, Eric Gray, Mar. 10, 2013.
MRP-Based Stream Reservation; The Multiple Stream Registration Protocol (MSRP) for AVB stream reservation; Norman Finn; Cisco; Sep. 2007.
Centralized Network Configuration; View from the End (Node) Sep. 9, 2014, v01, Todd Walter: National Instruments.
3GPP TR 38.825 V0.0.1 (Nov. 2018) 3rd Generation Partnership Project; Technical Specification Group Radio Access Network; Study on NR Industrial Internet on Things (IoT); Release 16.
Ultra-Reliable Low Latency 5G for Industrial Automation; Qualcomm; Gabriel Brown, Principal Analyst, Heavy Reading.
IEEE; Joint IEEE-SA and ITU Workshop on Ethernet; Stream Reservation Protocol (SRP) Craigh Gunther, Senior Principal Engineer Harman International; Geneva, Switzerland, Jul. 13, 2013.
IEEE 802.1 Time-Sensitive Networking (TSN) for DetNet; Janos Farkas, Ericsson, Norman Finn Huawei, Patricia Thaler Broadcom; Jul. 20, 2017.
Time Sensitive Networking; A Technical Introduction; 2017; Cisco.

\* cited by examiner

CM State Transition in UE

CM State Transition in AMF

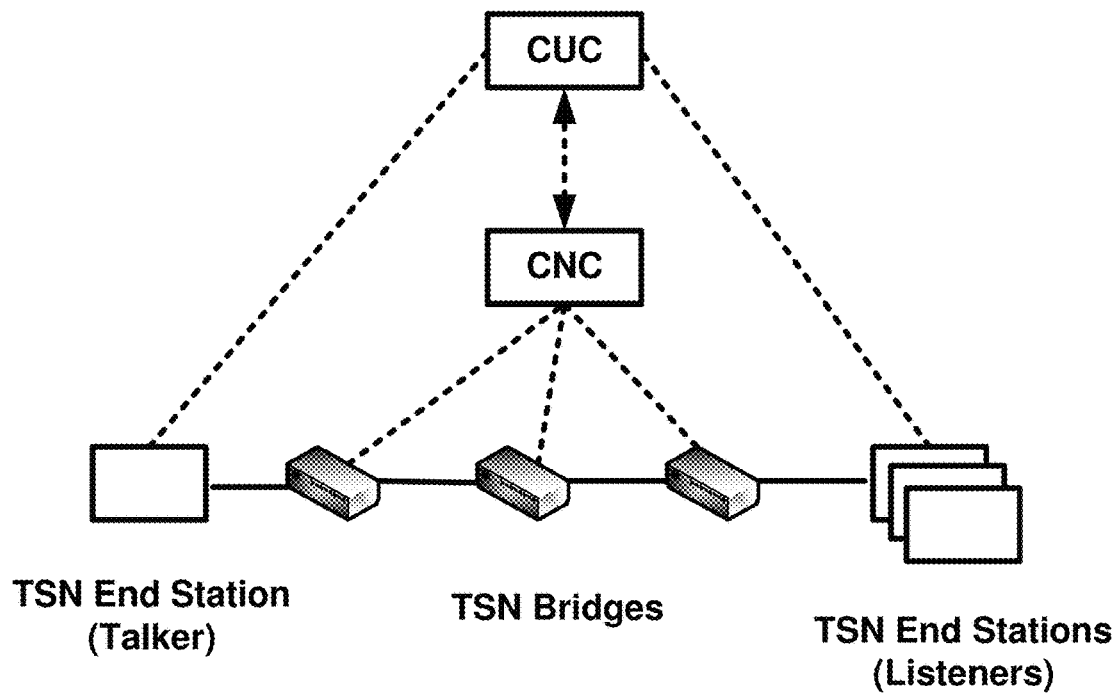
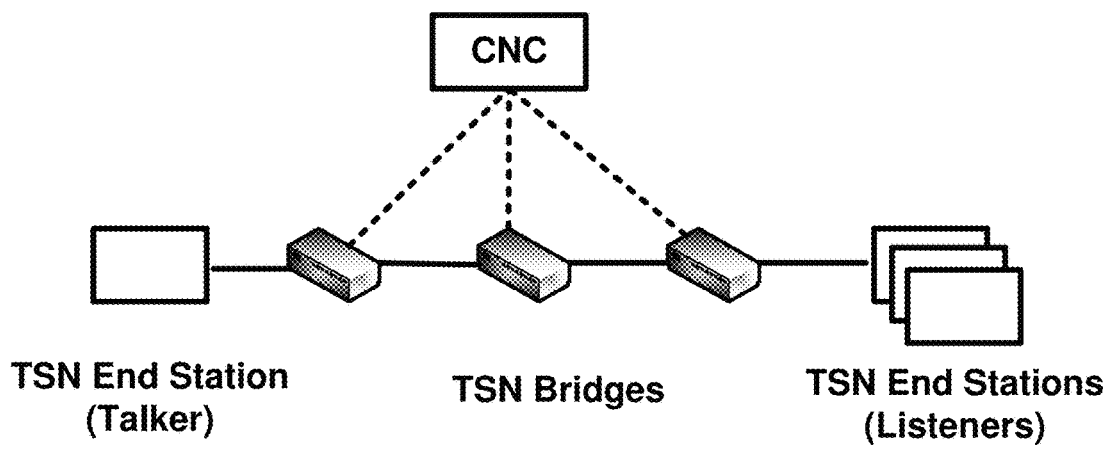
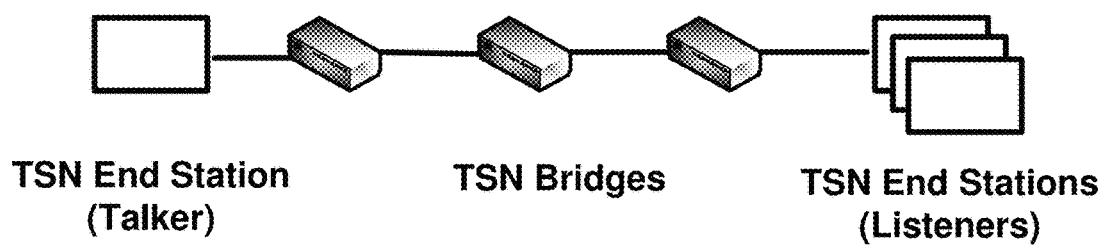
FIG. 15

| Information name | Description | Category | PCF permitted to modify in a URSP | Scope |
|---|---|---|---|---|
| URSP rules | 1 or more URSP rules | Mandatory | Yes | UE context |

UE Route Selection Policy Rule

| Information name | Description | Category | PCF permitted to modify in a UE context | Scope |
|---|---|---|---|---|
| Rule Precedence | Determines the order the URSP rule is enforced in the UE. | Mandatory | Yes | UE context |
| Traffic descriptor | *This part defines the traffic descriptors for the URSP rule.* | | | |
| Application descriptors | It consists of OSId and OSAppId(s). | Optional | Yes | UE context |
| IP descriptors | IP 3 tuple(s) (destination IP address or IPv6 network prefix, destination port number, protocol ID of the protocol above IP). | Optional | Yes | UE context |
| Non-IP descriptors | Descriptor(s) for non-IP traffic | Optional | Yes | UE context |
| DNN | This is the DNN information provided by the application. | Optional | Yes | UE context |
| Connection Capabilities | This is the information provided by a UE application when it requests a network connection with certain capabilities. | Optional | Yes | UE context |
| List of Route Selection Descriptors | A list of Route Selection Descriptors. | Mandatory | Yes | UE Context/Group Context |

FIG. 32

URSP Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory | Yes | UE context |
| Route selection components | *This part defines the route selection components* | Mandatory | | |
| SSC Mode Selection | One single value of SSC mode. | Optional | Yes | UE context |
| Network Slice Selection | Either a single value or a list of values of S-NSSAI(s). | Optional | Yes | UE context |
| Network Slice Selection | Either a single value or a list of values of S-NSSAI(s). | Mandatory/ Optional | Yes | Group Context |
| DNN Selection | Either a single value or a list of values of DNN(s). | Optional | Yes | UE context |
| PDU Session Type Selection | One single value of PDU Session Type | Optional | Yes | UE context |
| Non-seamless Offload indication | Indicates if the traffic of the matching application is to be offloaded to non-3GPP access outside of a PDU Session. | Optional | Yes | UE context |
| Access Type preference | Indicates the preferred Access Type (3GPP or non-3GPP) when the UE establishes a PDU Session for the matching application. | Optional | Yes | UE context |

FIG. 33

UE policy part contents including one or more URSP rules

UE policy part contents including a URSP rule

| Precedence value of URSP rule (octet v+1) |
|---|
| Traffic descriptor (octets v+4 to w) |
| Traffic descriptor component type identifier<br>Bits<br>8 7 6 5 4 3 2 1<br>0 0 0 0 0 0 0 1   Match-all type<br>0 0 0 0 1 0 0 0   OS Id + OS App Id type<br>0 0 0 1 0 0 0 0   IPv4 remote address type<br>0 0 1 0 0 0 0 1   IPv6 remote address/prefix length type<br>0 0 1 1 0 0 0 0   Protocol identifier/next header type<br>0 1 0 1 0 0 0 0   Single remote port type<br>0 1 0 1 0 0 0 1   ...<br>...<br>...<br>1 0 0 0 0 1 1 1   Ethertype type<br>1 0 0 0 1 0 0 0   DNN type<br>1 0 0 1 0 0 0 0   Connection capabilities type<br>All other values are reserved. |
| "Connection capabilities" type:<br>Bits<br>8 7 6 5 4 3 2 1<br>0 0 0 0 0 0 0 1   IMS<br>0 0 0 0 0 0 1 0   MMS<br>0 0 0 0 0 1 0 0   SUPL<br>0 0 0 0 1 0 0 0   Internet<br>0 0 0 0 1 0 0 1   TSN<br><br>All other values are reserved. |

FIG. 38

UE policy part contents including a URSP rule

```
Traffic descriptor component type identifier
Bits
8 7 6 5 4 3 2 1
0 0 0 0 0 0 0 1    Match-all type
0 0 0 0 1 0 0 0    OS Id + OS App Id type
0 0 0 1 0 0 0 0    IPv4 remote address type
0 0 1 0 0 0 0 1    IPv6 remote address/prefix length type
0 0 1 1 0 0 0 0    Protocol identifier/next header type
0 1 0 1 0 0 0 0    Single remote port type
0 1 0 1 0 0 0 1    Remote port range type
0 1 1 0 0 0 0 0    Security parameter index type
0 1 1 1 0 0 0 0    Type of service/traffic class type
1 0 0 0 0 0 0 0    Flow label type
1 0 0 0 0 0 0 1    Destination MAC address type
1 0 0 0 0 0 1 1    802.1Q C-TAG VID type
1 0 0 0 0 1 0 0    802.1Q S-TAG VID type
1 0 0 0 0 1 0 1    802.1Q C-TAG PCP/DEI type
1 0 0 0 0 1 1 0    802.1Q S-TAG PCP/DEI type
1 0 0 0 0 1 1 1    Ethertype type
1 0 0 0 1 0 0 0    DNN type
1 0 0 1 0 0 0 0    Connection capabilities type
1 0 0 1 0 X 0 1    TSN Bridge Identifier
1 0 0 1 0 X 1 0    TSN (Virtual/Physical) Port Identifier
1 0 0 1 0 X 1 1    TSN (Virtual/Physical) Port Priority
All other values are reserved.
```

FIG. 39

| Route selection descriptor component type identifier | |
|---|---|
| Bits | |
| 8 7 6 5 4 3 2 1 | |
| 0 0 0 0 0 0 0 1 | SSC mode type |
| 0 0 0 0 0 0 1 0 | S-NSSAI type |
| 0 0 0 0 0 1 0 0 | DNN type |
| 0 0 0 0 1 0 0 0 | PDU session type type |
| 0 0 0 1 0 0 0 0 | Preferred access type type |
| 0 0 1 0 0 0 0 0 | Non-seamless non-3GPP offload indication type |
| All other values are reserved. | |

FIG. 40

| Example URSP rules | |
|---|---|
| Rule Precedence =1<br><br>Traffic Descriptor:<br><br>Application Identifiers=App1<br><br>Connection Capabilities="TSN" | Route Selection Descriptor Precedence =1<br>Network Slice Selection: S-NSSAI-a<br>DNN Selection: DNN_1<br>Access Type preference: Non-3GPP access |
| Rule Precedence = 2<br><br>Traffic Descriptor:<br><br>Application Identifiers= *<br><br>Connection Capabilities= "TSN" | Route Selection Descriptor Precedence =1<br>Network Slice Selection: S-NSSAI-b<br>Access Type preference: 3GPP access |

FIG. 41

DEVICE CONFIGURATION FOR TIME SENSITIVE NETWORK BRIDGE

CROSS-REFERENCE TO RELATED APPLICATIONS

This application is a continuation of U.S. patent Ser. No. 16/788,412, filed Feb. 12, 2020, which claims the benefit of U.S. Provisional Application No. 62/806,185, filed Feb. 15, 2019, all of which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 15 is an example diagram as per an aspect of an embodiment of the disclosure.

FIG. 32 is an example diagram as per an aspect of an embodiment of the disclosure.

FIG. 33 is an example diagram as per an aspect of an embodiment of the disclosure.

FIG. 38 is an example diagram as per an aspect of an embodiment of the disclosure.

FIG. 39 is an example diagram as per an aspect of an embodiment of the disclosure.

FIG. 40 is an example diagram as per an aspect of an embodiment of the disclosure.

FIG. 41 is an example diagram as per an aspect of an embodiment of the disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
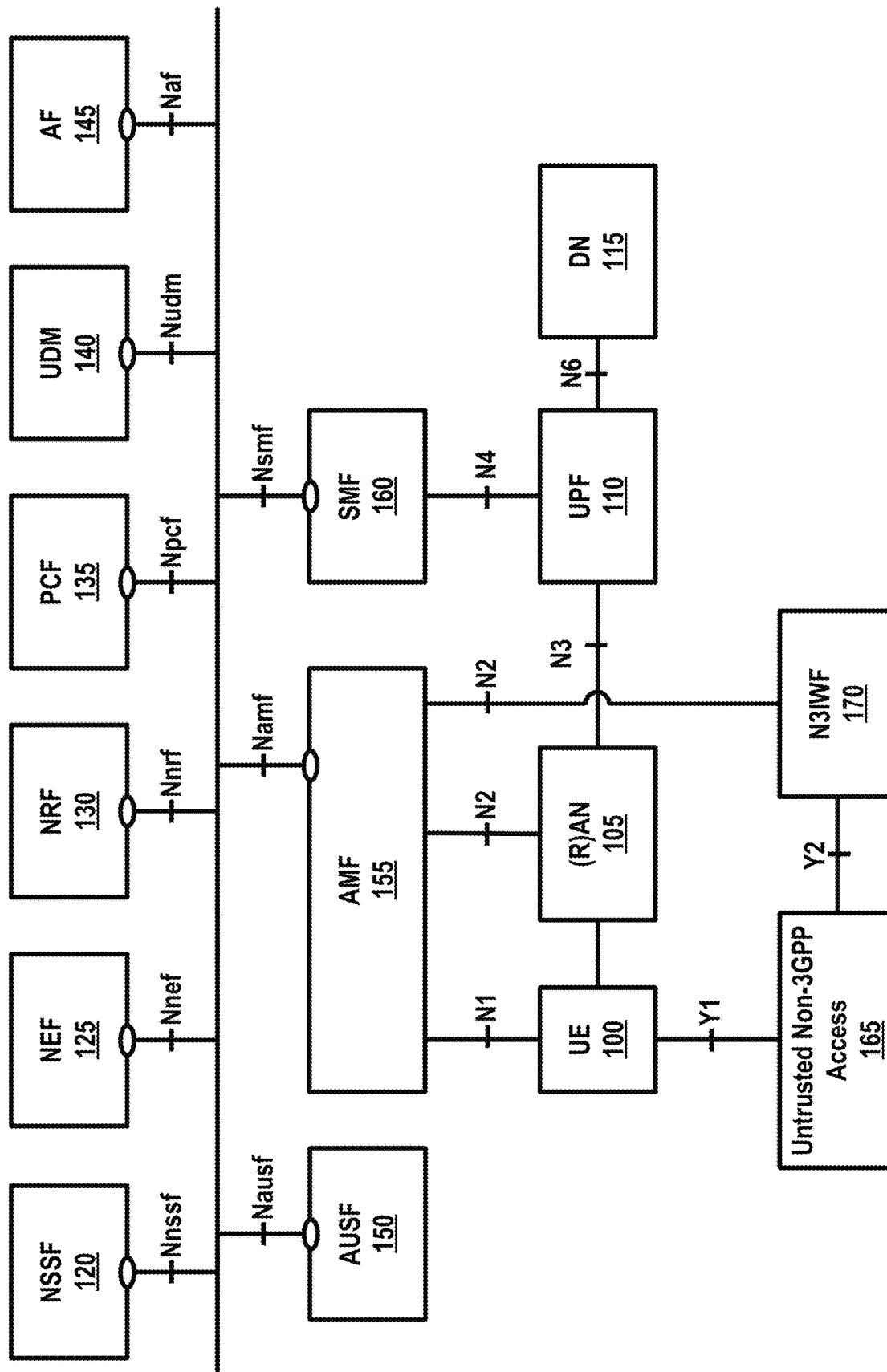
FIG. 1 is a diagram of an example 5G system architecture as per an aspect of an embodiment of the present disclosure.
Figure 2:
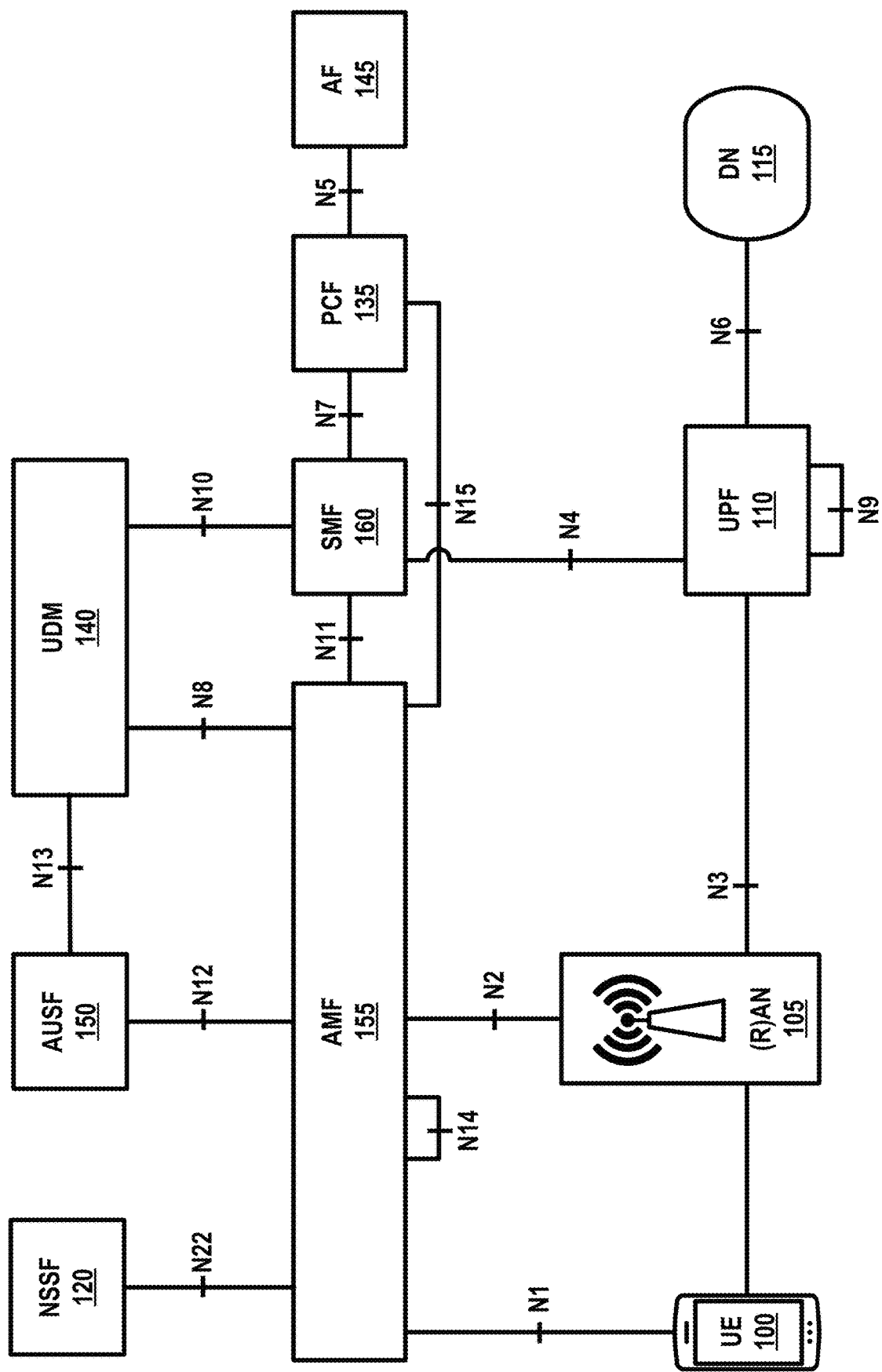
FIG. 2 is a diagram of an example 5G System architecture as per an aspect of an embodiment of the present disclosure.

The following acronyms are used throughout the present disclosure:
5G 5th generation mobile networks
5GC 5G Core Network 5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GPSI Generic Public Subscription Identifier
GTP GPRS Tunneling Protocol
GUTI Globally Unique Temporary Identifier
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
TSN Time Sensitive Networking
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
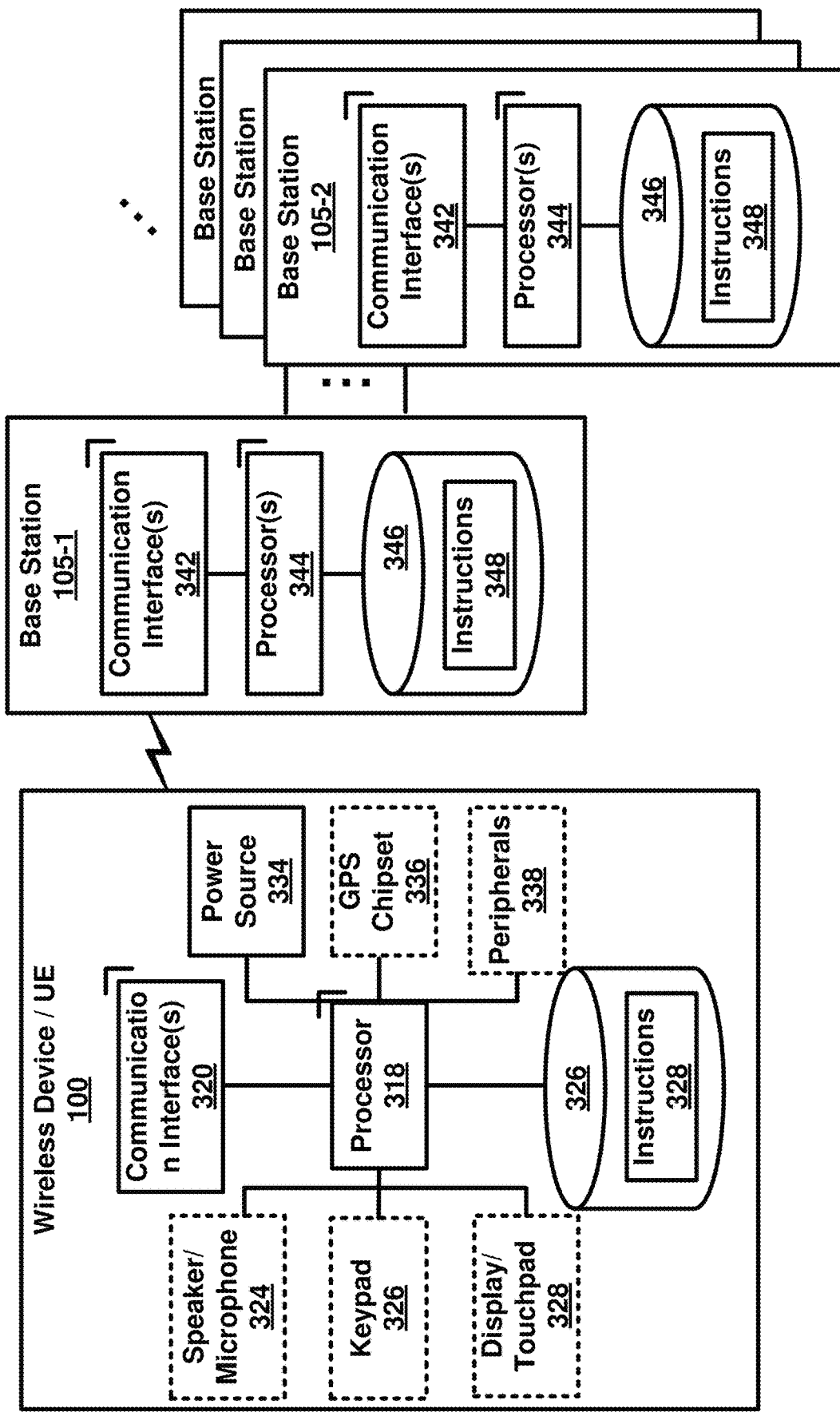
FIG. 3 is a system diagram of an example wireless device and a network node in a 5G system as per an aspect of an embodiment of the present disclosure.
Figure 4:
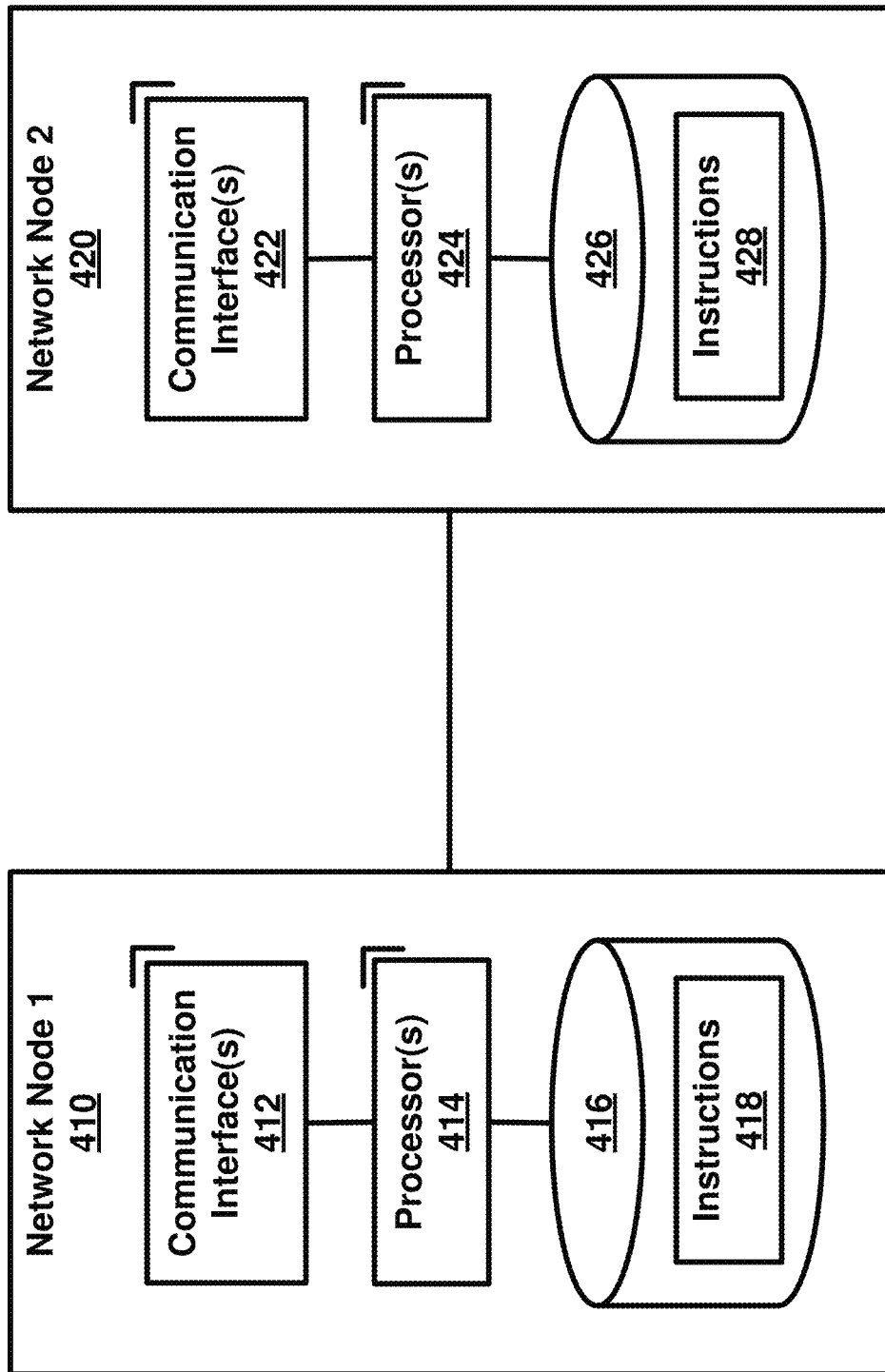
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155($s$) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
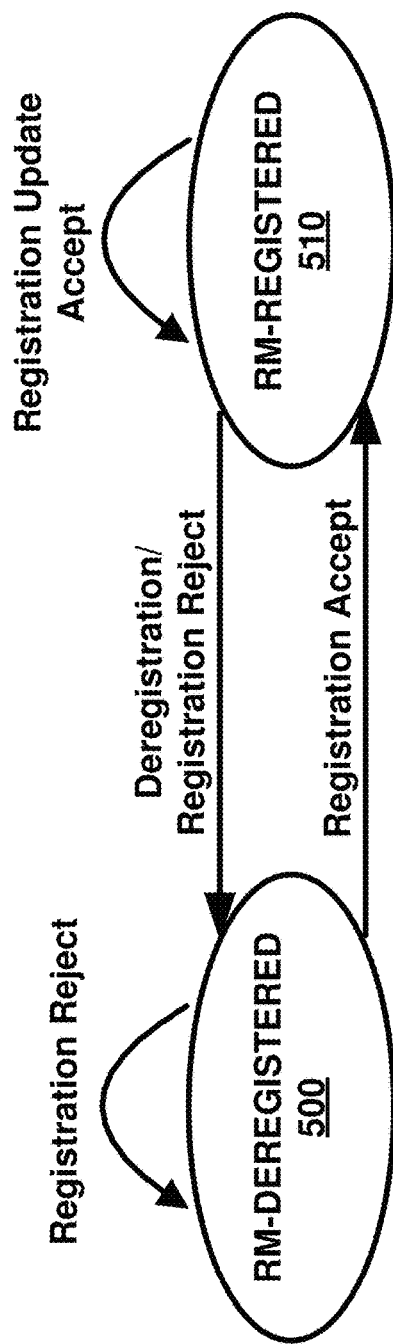
FIG. 5A and FIG. 5B depict two registration management state models in UE 100 and AMF 155 as per an aspect of embodiments of the present disclosure.
Figure 5B:
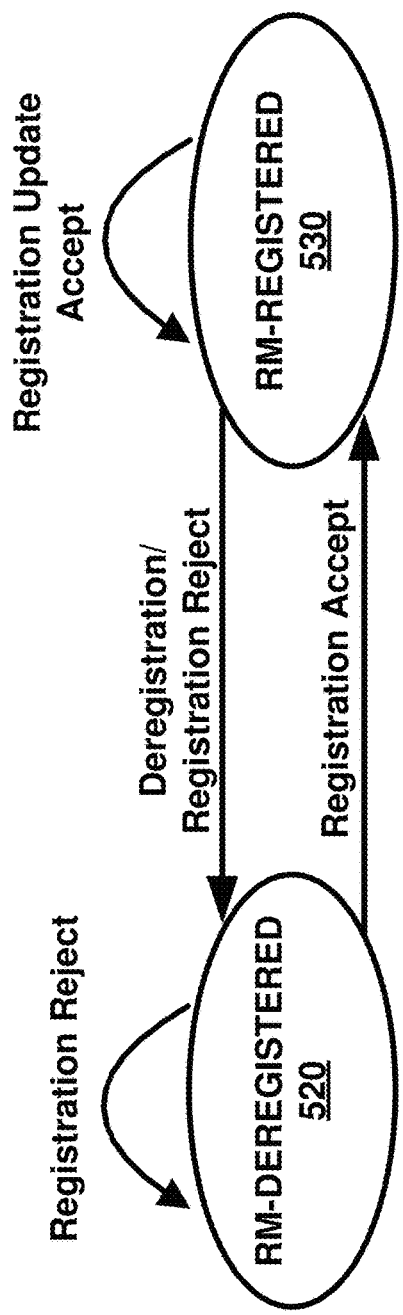

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
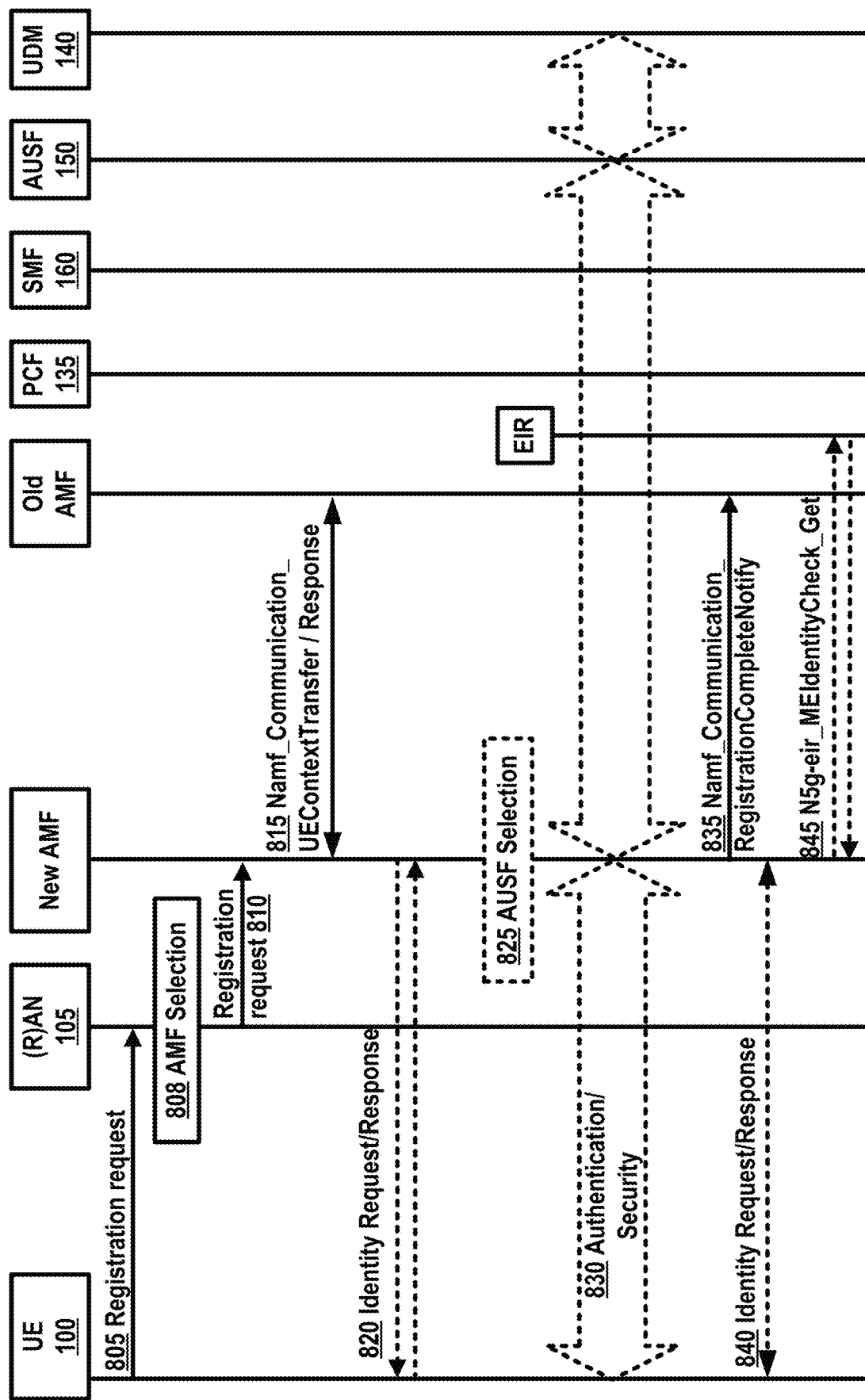
FIG. 8 is an example call flow as per an aspect of an embodiment of the present disclosure.
Figure 9:
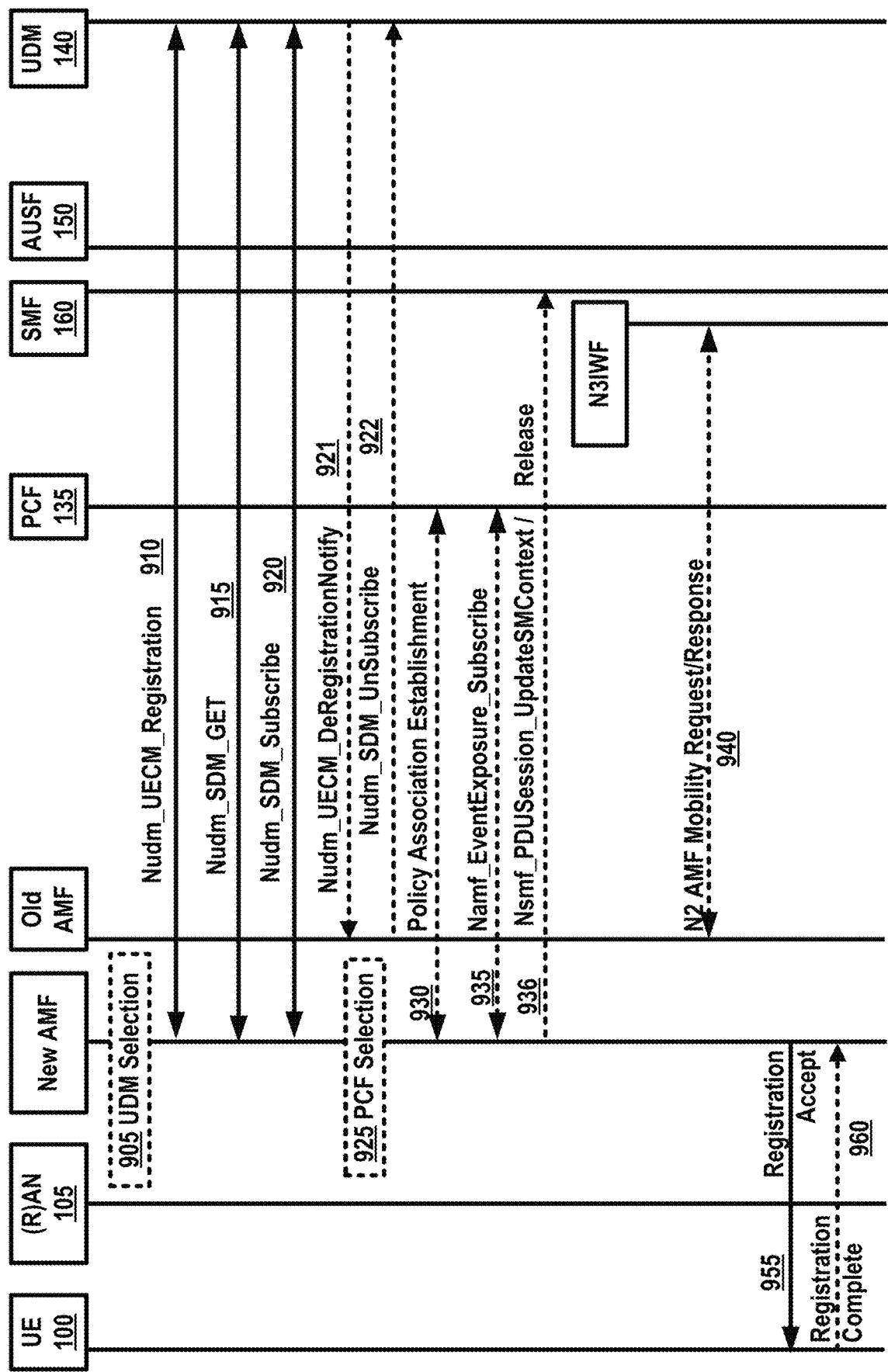
FIG. 9 is an example call flow as per an aspect of an embodiment of the disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
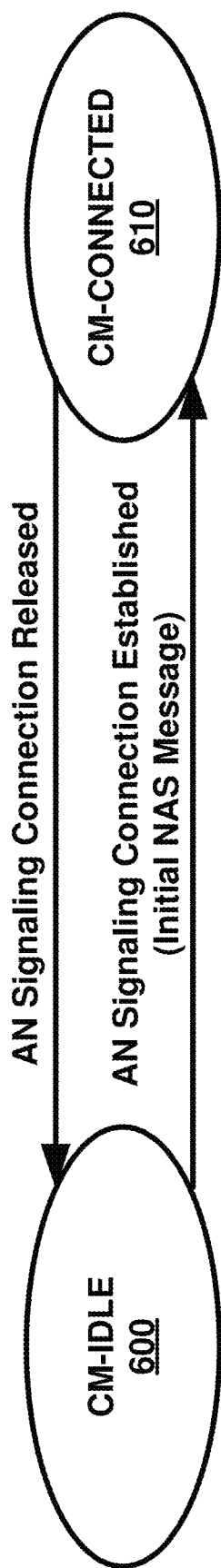
FIG. 6A and FIG. 6B depict two connection management state models in UE 100 and AMF 155 as per an aspect of embodiments of the present disclosure.
Figure 6B:
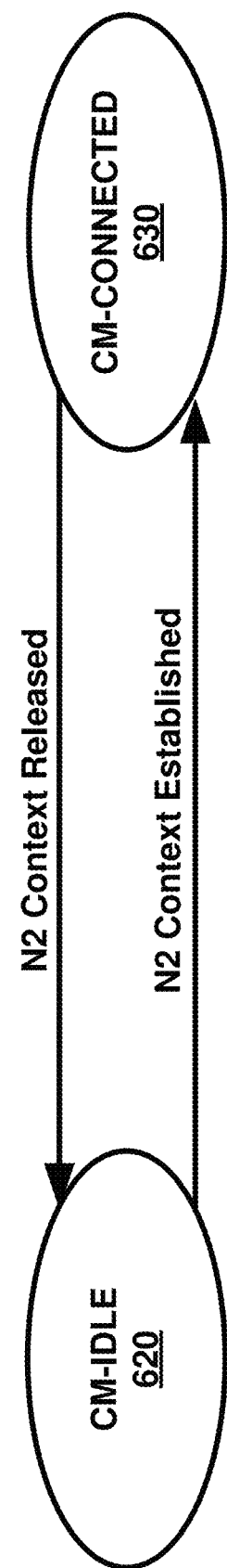

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
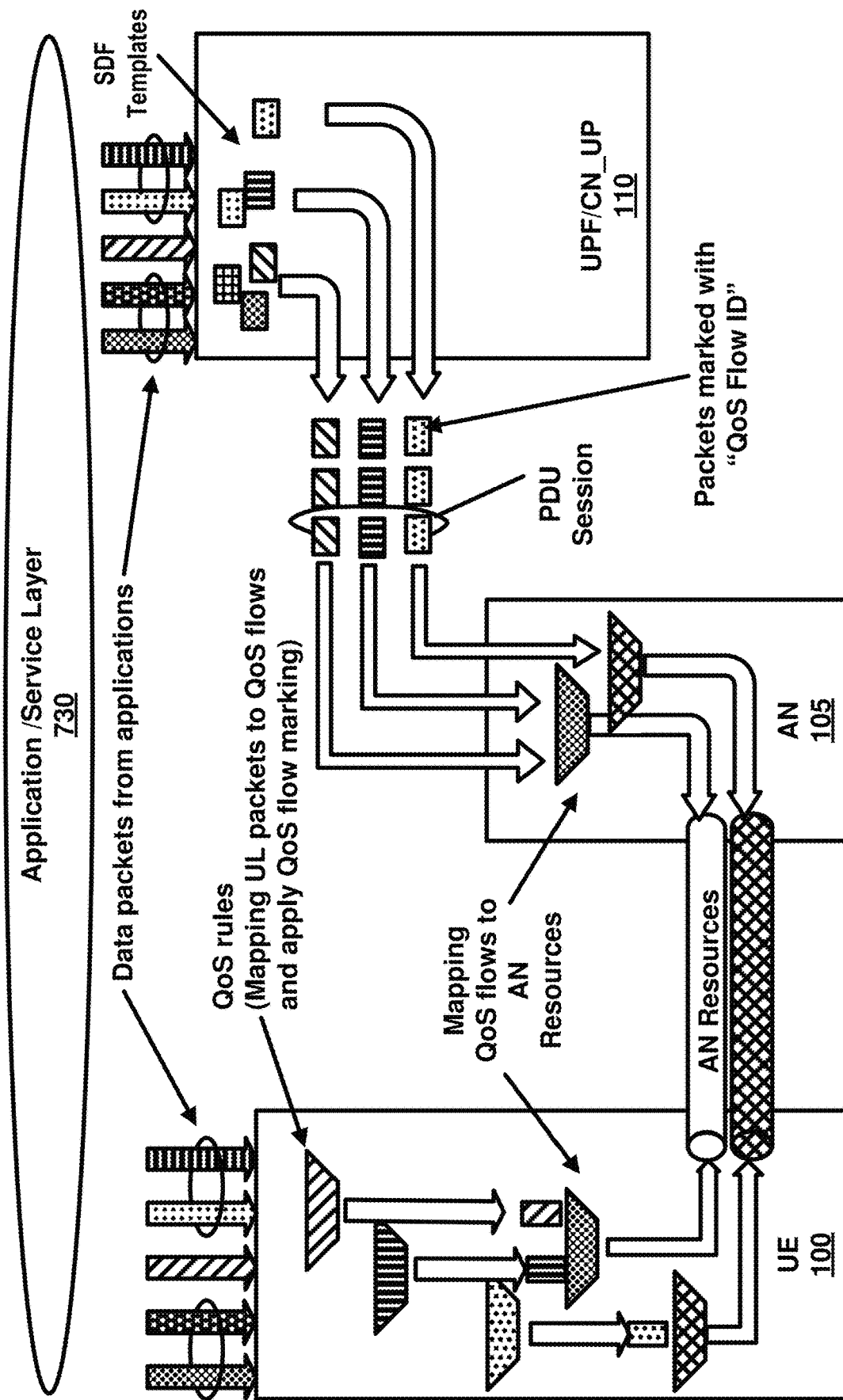
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services.

This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer.

The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type.

The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query(access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_Event-Exposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
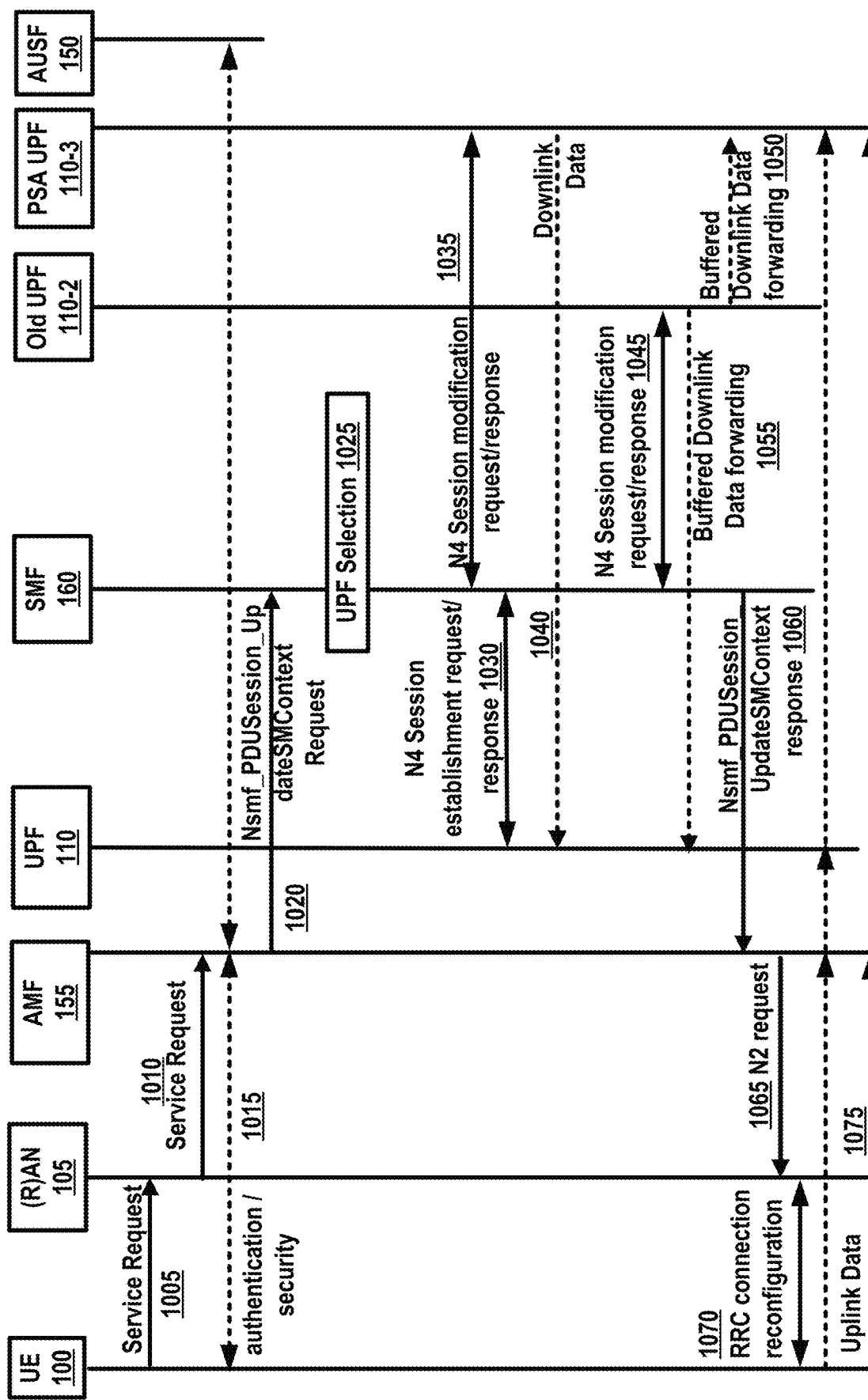
FIG. 10 is an example call flow as per an aspect of an embodiment of the disclosure.
Figure 11:
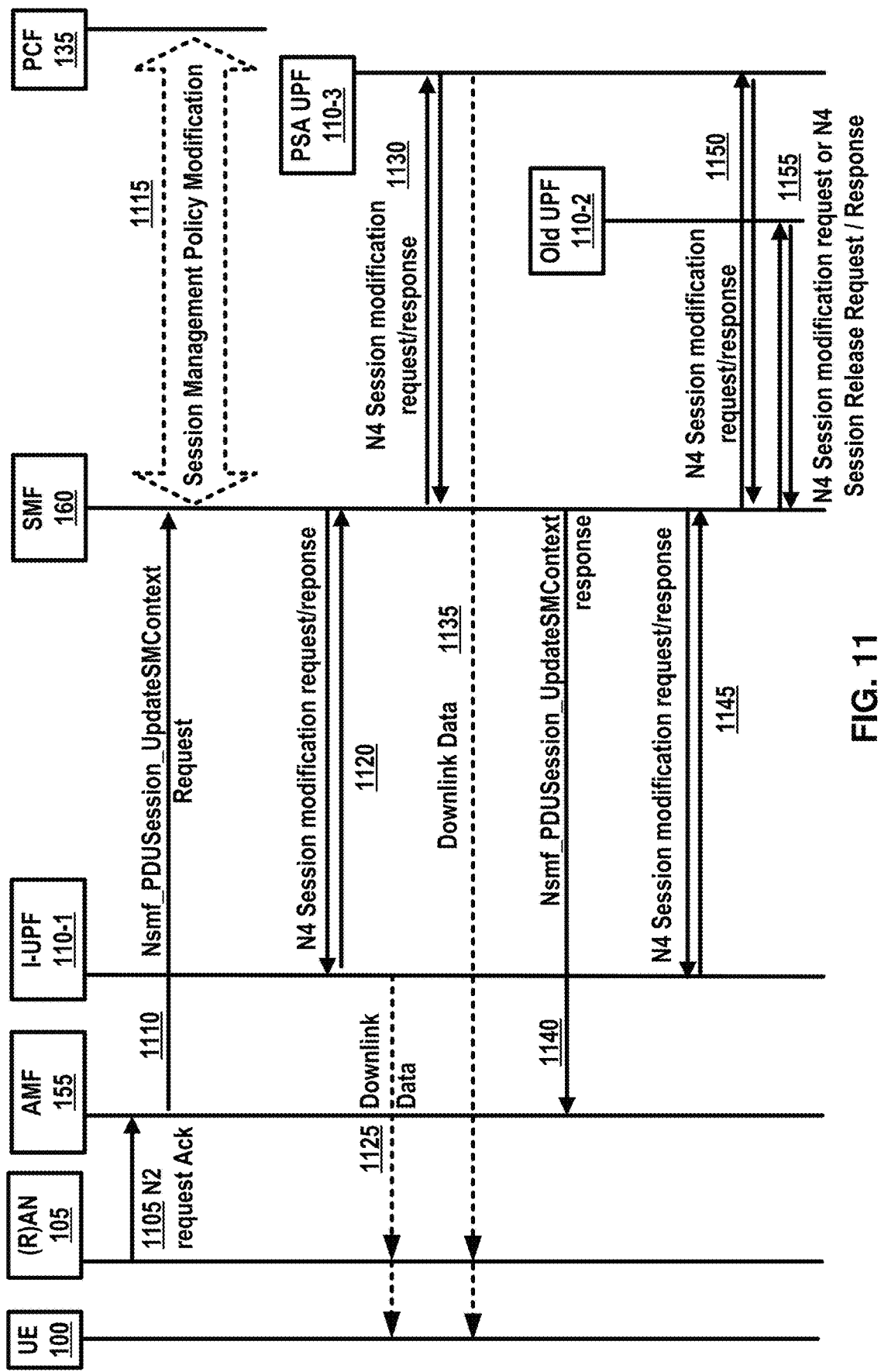
FIG. 11 is an example call flow as per an aspect of an embodiment of the disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
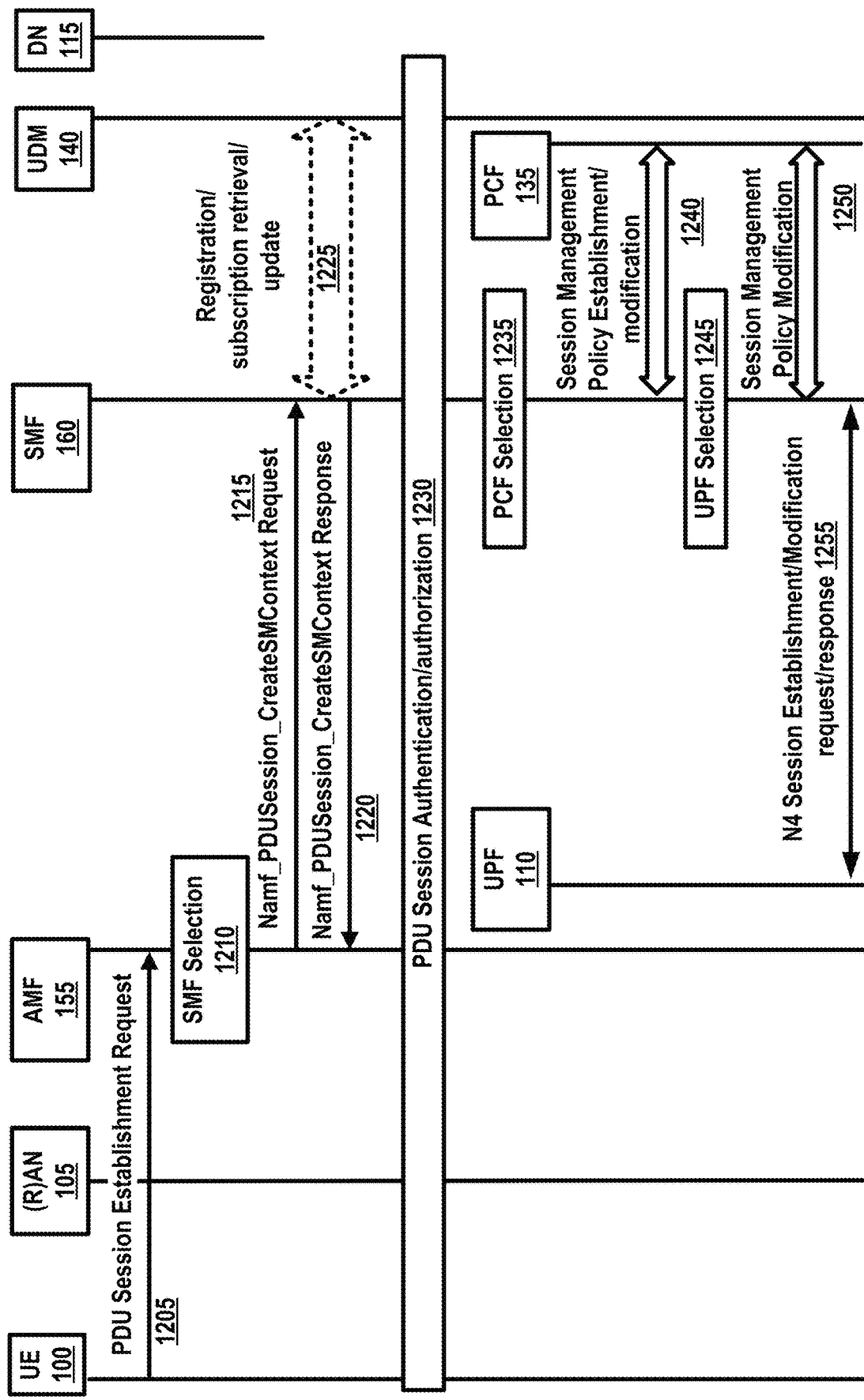
FIG. 12 is an example call flow as per an aspect of an embodiment of the disclosure.
Figure 13:
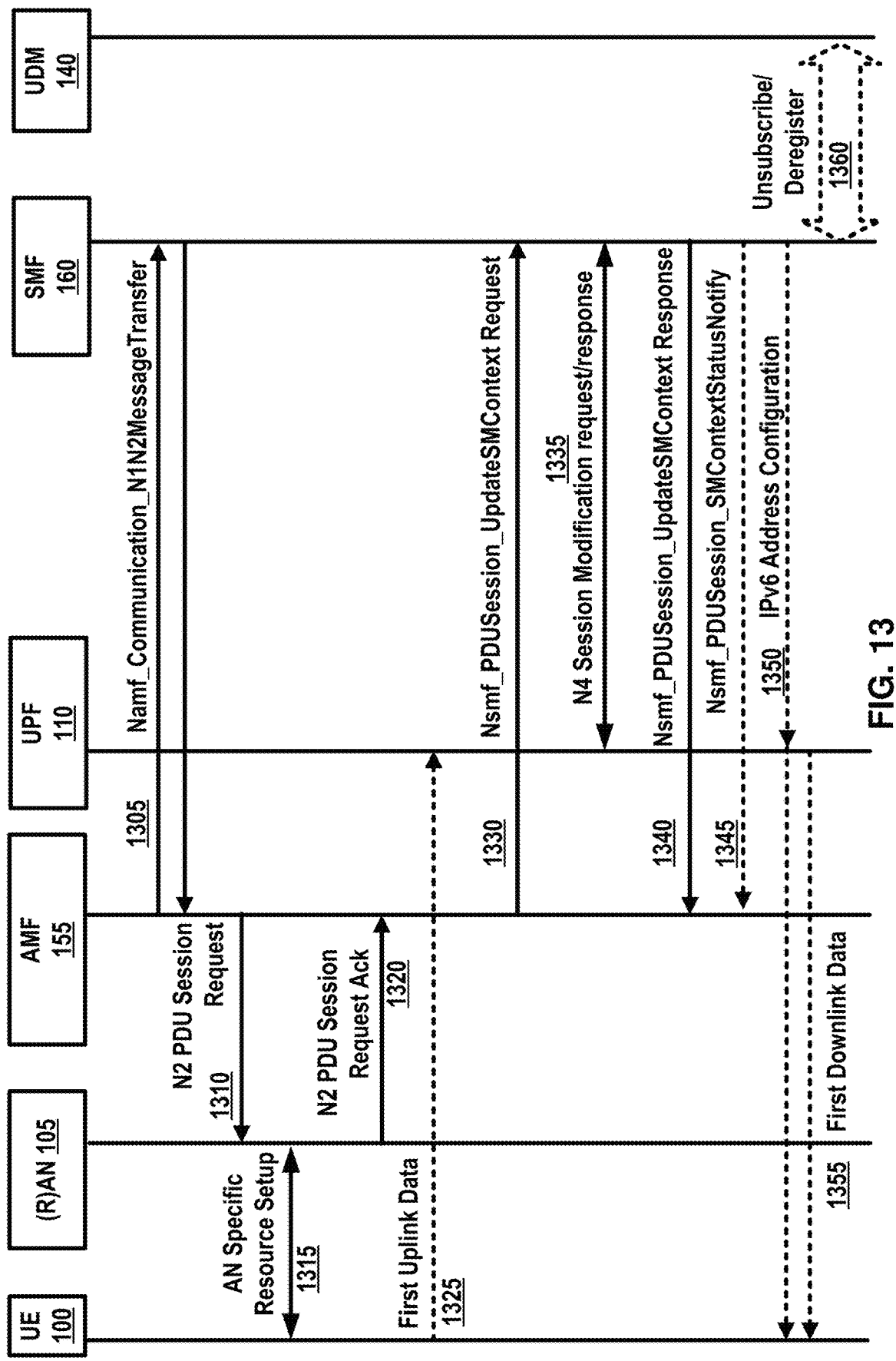
FIG. 13 is an example call flow as per an aspect of an embodiment of the disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g when request type indicates initial request), the AMF 155 may invoke the Nsmf_PDUSession_CreateSMContext request, but if the AMF 155 already has an association with an SMF 160 for the PDU session ID provided by the UE 100 (e.g when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

The 5GS may be operated as stand-alone time sensitive networking (TSN) network or part of a non-stand-alone TSN network, e.g. an industrial communication network, and/or the like. 5GS may support three modes of operation as depicted in example FIG. 15. In a fully distributed model shown at the bottom of FIG. 15, the TSN end stations, e.g., talkers and listeners, may communicate TSN stream requirements directly to the TSN network. Each TSN bridge on the path from talker to listeners may propagate the TSN user and network configuration information along with the active topology for the TSN stream to the neighboring bridge(s). The network resources may be managed locally in each TSN bridge. In a centralized network and distributed user model shown in the middle of FIG. 15, the TSN end stations, e.g., Talkers and Listeners, may communicate the TSN stream requirements directly to the TSN network. The TSN stream requirements are forwarded to a centralized network configuration (CNC). The TSN bridges may provide their network capabilities information and active topology information to the CNC. The CNC may have a complete view of the TSN network and is enabled to compute respective end-to-end communication paths from a talker to the listeners that fulfil the TSN stream requirements as provided by the end stations. The computation result may be provided by the CNC as TSN configuration information to each TSN bridge in the path between involved TSN end stations (Talkers to the Listeners) as network configuration information. In a fully centralized model shown at the top of FIG.

15, the TSN end stations, e.g., Talkers and Listeners, may communicate the TSN stream requirements to a centralized user configuration (CUC). The CUC may adapt the TSN end station stream requirements before forwarding them to the CNC. The CNC performs the same actions as described in the centralized network/distributed user model, except that CNC may send specific TSN configuration information to the CUC. The CUC may determine/derive the TSN configuration information for the TSN end stations and notify them accordingly.

In an example, a TSN system may employ 5GS as a TSN link, as a TSN bridge, and/or the like. The TSN system may be integrated with a 5GS.

Figure 17:
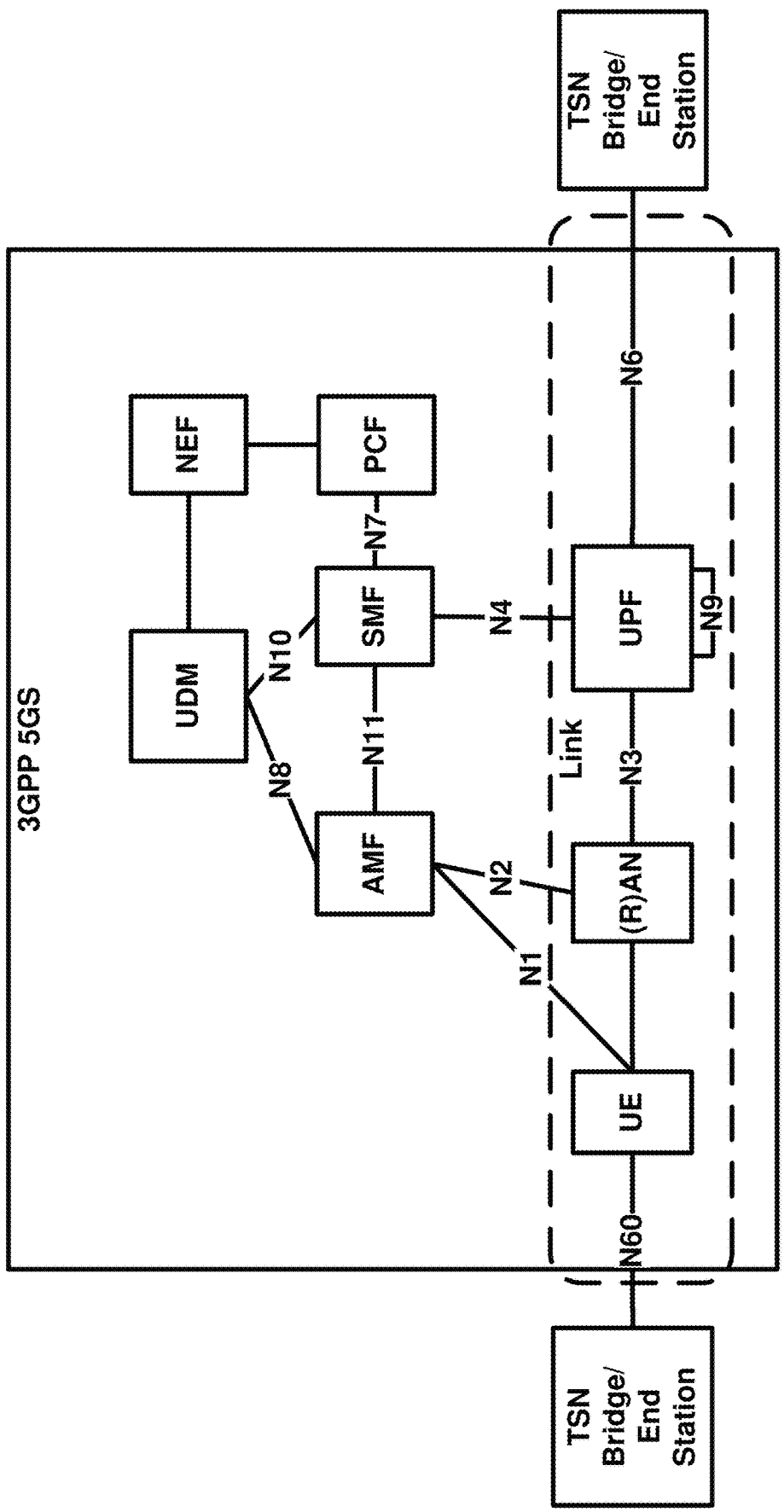
FIG. 17 is an example diagram as per an aspect of an embodiment of the disclosure.

As depicted in example FIG. 17, the 5GS may be employed to the external network as a TSN link, e.g., as an Ethernet connection/link between a UE and a UPF. The link may be defined by the connected entities, i.e. either two TSN bridges or a TSN end station and a TSN bridge, two TSN end stations, and/or the like. The link capabilities may be described by the ingress/egress ports of the TSN bridges connected to the end of a link or by the TSN streaming requirements of a TSN end station directly connected to the link. The exposed capabilities may comprise delay information, link speed, available bandwidth information, and/or the like.

Figure 18:
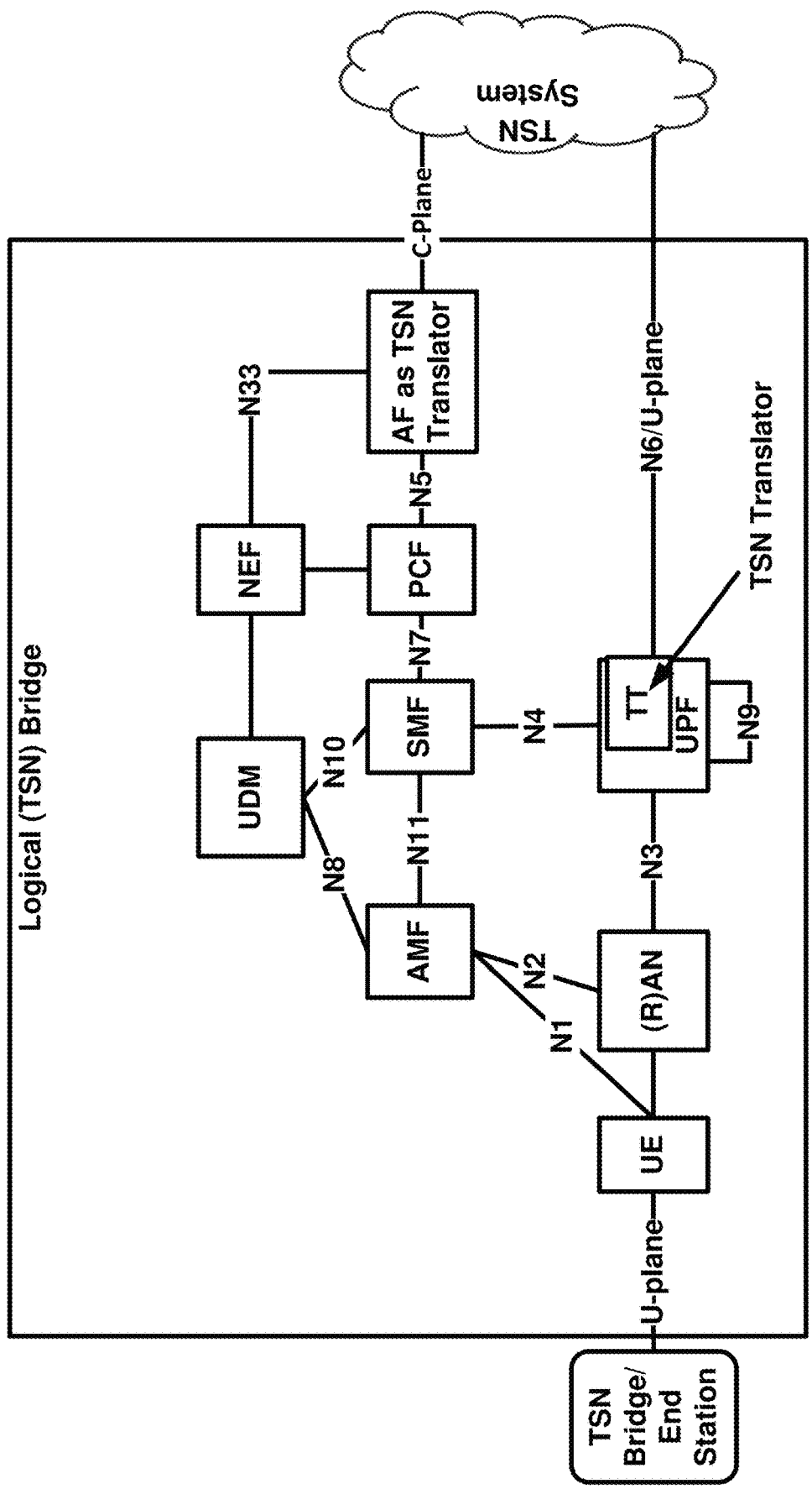
FIG. 18 is an example diagram as per an aspect of an embodiment of the disclosure.
Figure 19:
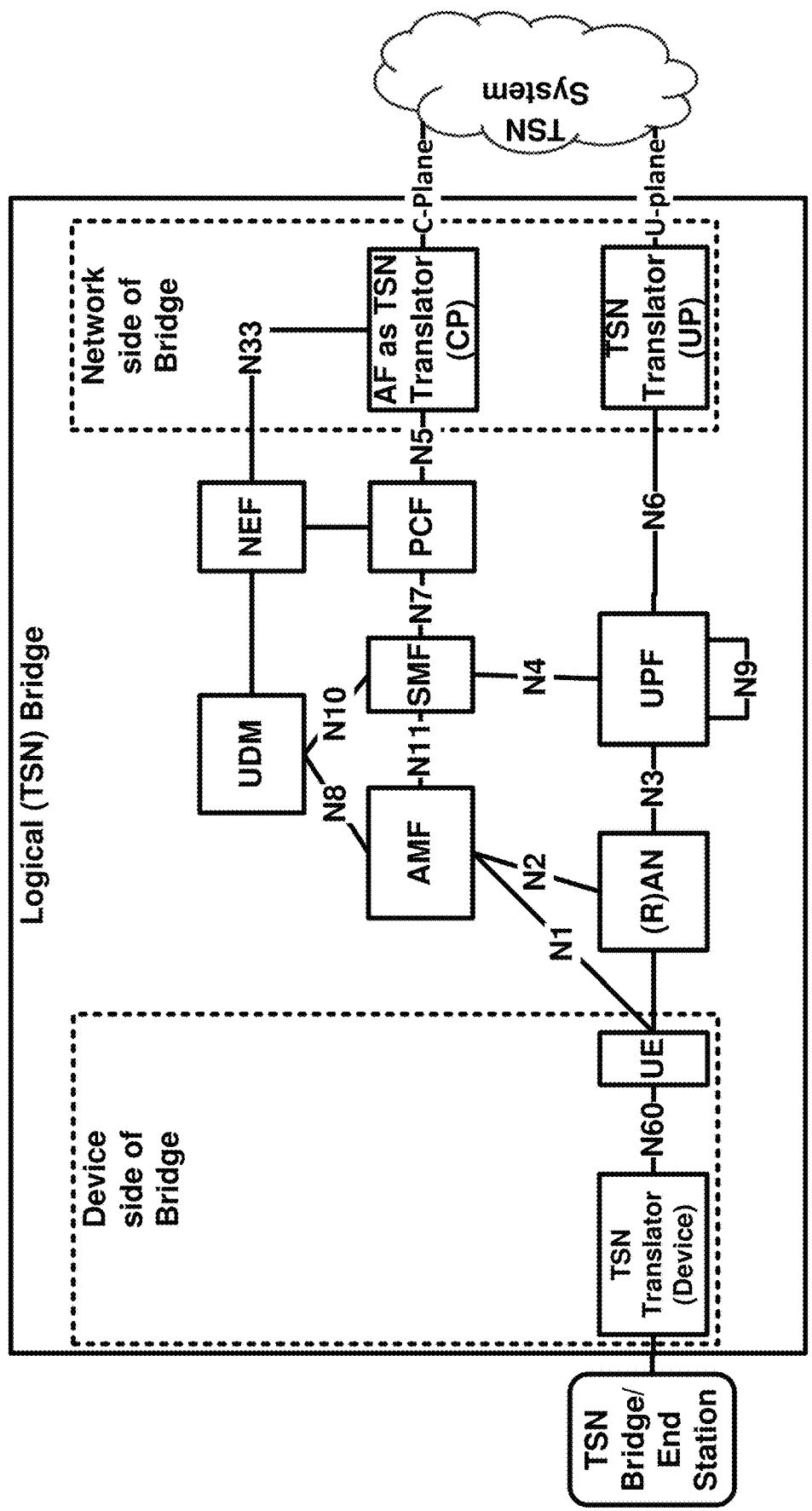
FIG. 19 is an example diagram as per an aspect of an embodiment of the disclosure.

In an example as depicted in FIG. 18 and FIG. 19, 5GS may be employed as a TSN bridge. The 5GD may receive TSN related reservation requests using a 5G QoS framework. The 5GS may employ 5G internal signaling to satisfy TSN reservation requests. When the 5GS is deployed as a TSN bridge (e.g., logical TSN bridge), the TSN bridge may comprise an adaptation function to translate the 5GS protocols and information objects to TSN protocols and information objects and vice versa. The 5GS bridge may provide TSN ingress and egress ports via a TSN Translator (Device) on the UE side and via the "TSN Translator" (CP and UP) on the CN side towards the DN. The 5GS bridge may support different TSN configuration models. In an example, one or more TSN compliant interfaces may be employed by the TSN bridge with the respective protocols towards TSN end stations, TSN bridges, CNC, CUC, and/or the like on the control plane and/or user plane. The TSN bridge self-management and the functions required to interact with CNC may be located at the network translator.

Figure 20:
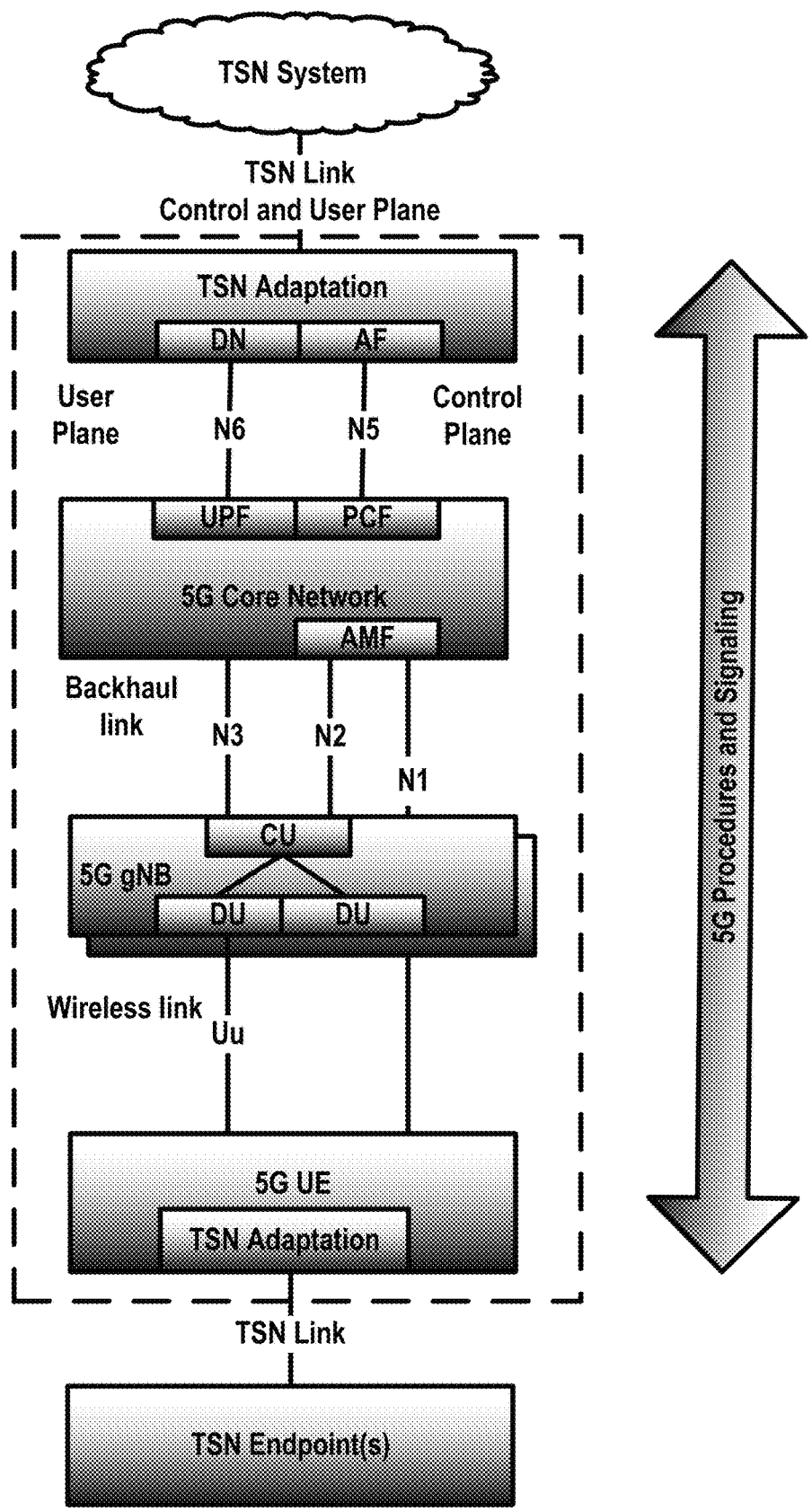
FIG. 20 is an example diagram as per an aspect of an embodiment of the disclosure.

In an example, as depicted in FIG. 20, a 5GS may be integrated with a TSN system. When the 5GS is integrated with the TSN system, individual nodes of the 5GS (e.g. UPF, gNB, and/or the like) may interact with TSN procedures initiated by TSN end-points and TSN controllers. This allows the 5GS and associated infrastructure to present itself as multiple TSN-compatible end-points.

Figure 14:
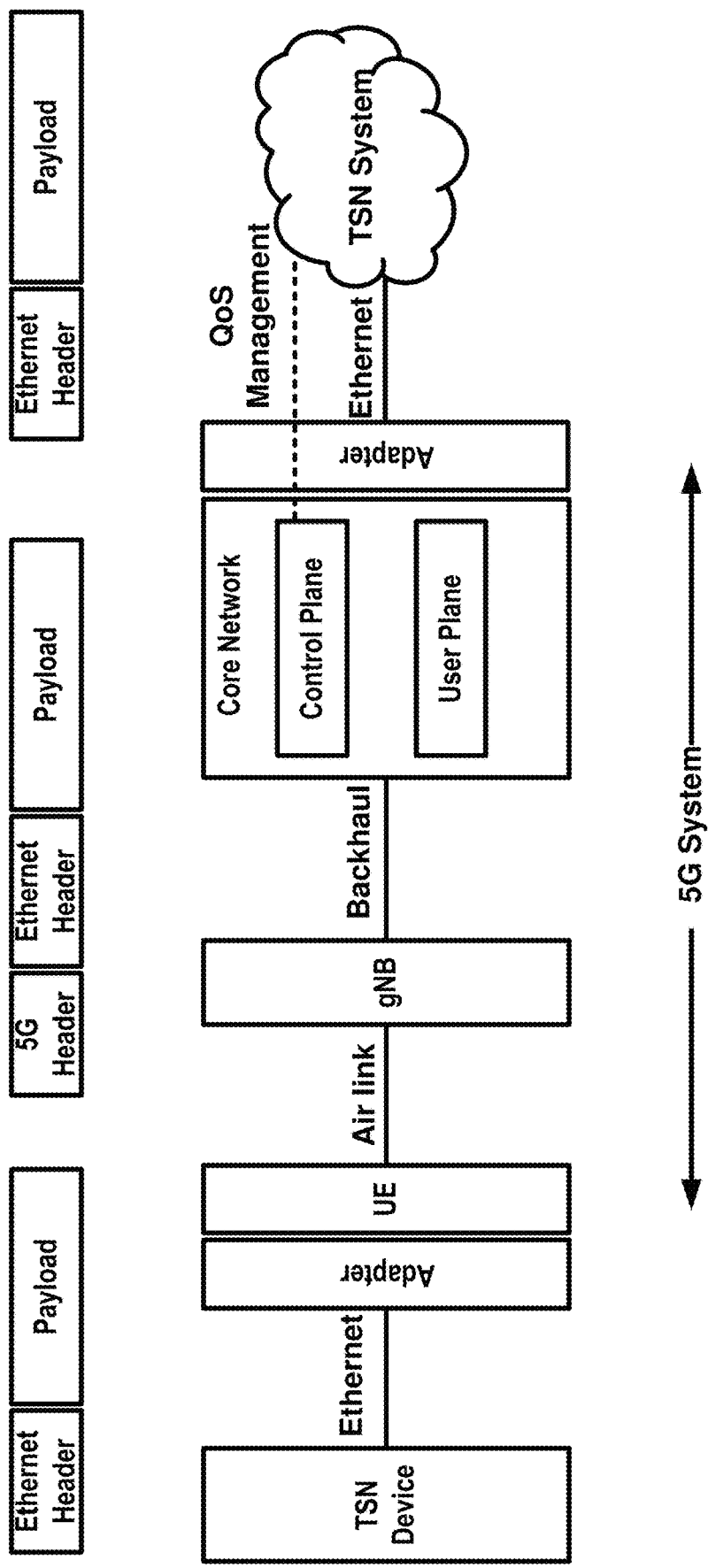
FIG. 14 is an example diagram as per an aspect of an embodiment of the disclosure.
Figure 16:
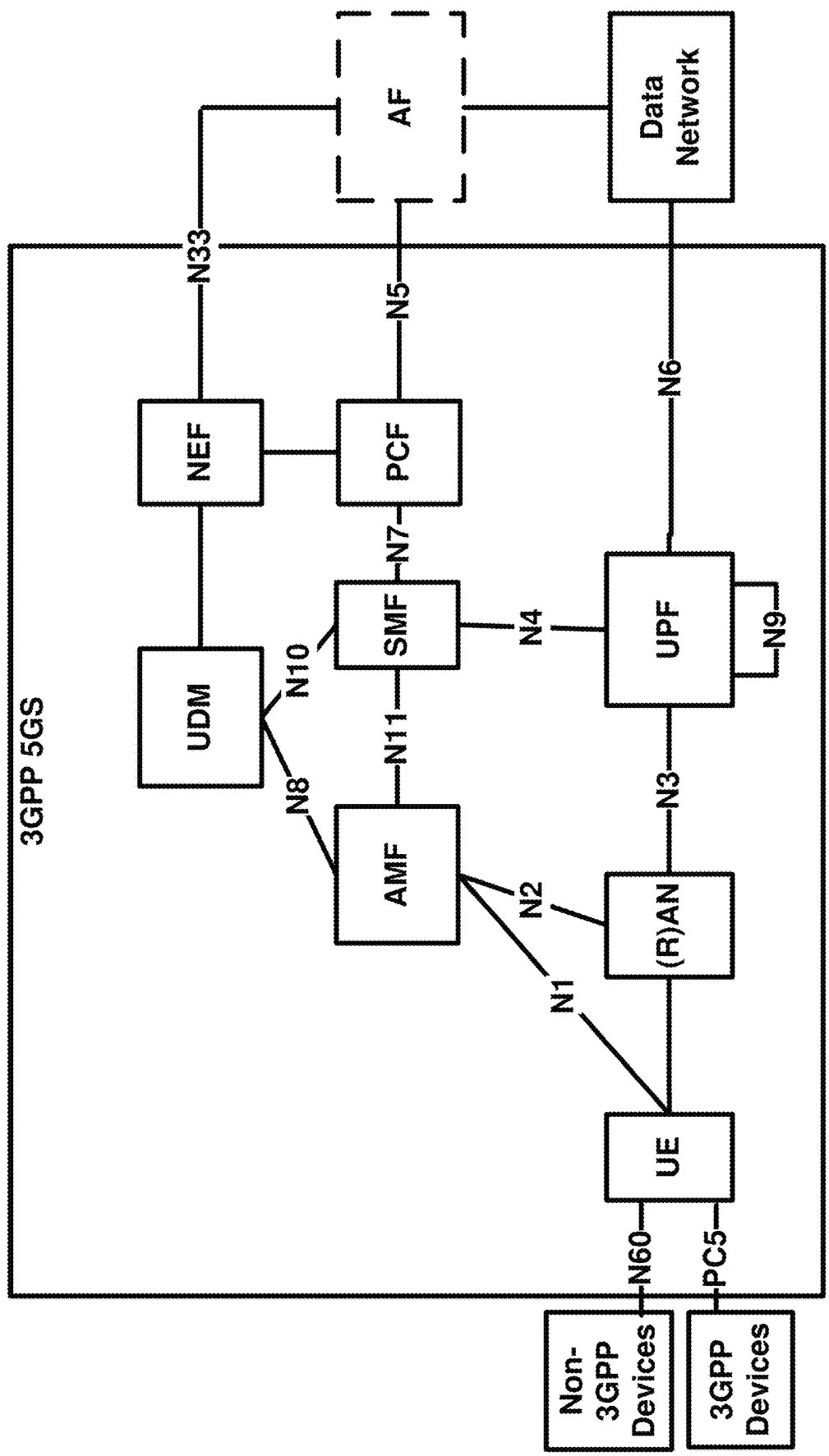
FIG. 16 is an example diagram as per an aspect of an embodiment of the disclosure.

As depicted in an example FIG. 14, 5GS may be integrated with a TSN system. The TSN system may generate control and data traffic and send to the 5GS. Control and data traffic may comprise TSN QoS information, stream information, port information, and/or the like. Ethernet frames and/or headers may be mapped to or encapsulated within 5G frames/packets and sent via an air interface to the 5GS. A 5G radio with an integrated Ethernet adapter may be connected to a wireless device (UE).

In an example embodiment, a 3GPP network may support derivation of TSN bridge delay managed object attributes (e.g., independentDelayMin/Max, dependentDelayMin/Max, and/or the like) for a 3GPP bridge based on 3GPP attributes, e.g., QoS flow packet delay budget (PDB) values, guaranteed flow bit rate (GFBR), the maximum data burst volume (MDBV) indicated in the QoS profile, and/or the like. Mapping of 3GPP attributes to TSN capabilities may be in the SMF and/or PCF and the exposure of capabilities towards TSN bridge may be via NEF, SMF, PCF, and/or the like.

In an example, a TSN bridge delay managed object may comprise frame length-related attributes per tuple (ingress port, egress port, traffic class). Frame length-related attributes may comprise: independentDelay Min/Max (e.g., incurred bridge delay independent of the frame size (typically in ns)), dependentDelay Min/Max (e.g., incurred bridge delay per base volume (typically in ps per byte)), and/or the like.

Figure 21:
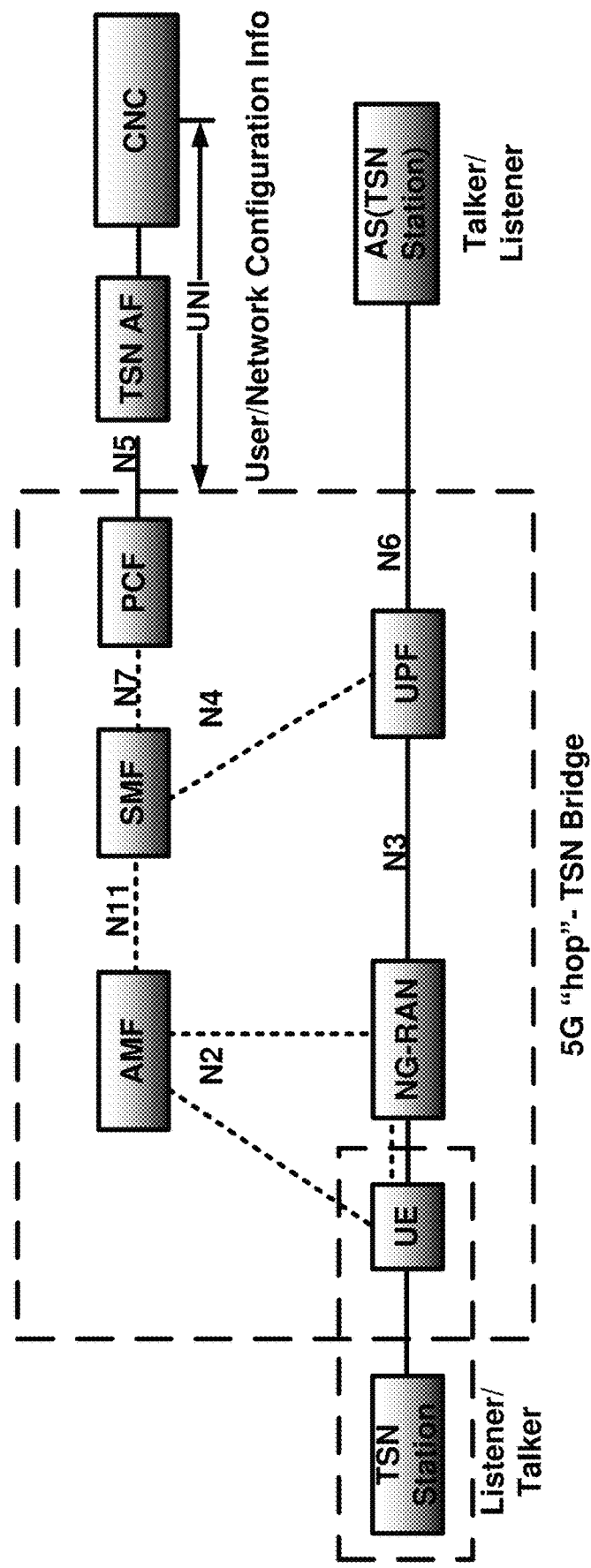
FIG. 21 is an example diagram as per an aspect of an embodiment of the disclosure.

In an example as depicted in FIG. 21, when centralized model or the fully centralized model and the centralized network/distributed user model is employed in TSN network, the 5GS may be enhanced to act as a TSN bridge in the network. An AF may act as a controller function to collect 5GS virtual bridge related information and register it to CNC via TSN defined application interfaces, since the CNC maintains capabilities of each TSN bridge in the TSN network and the topology of the network. In an example, based on the information that the CNC maintains, the CNC may calculate the forwarding and scheduling rules on each bridge for a TSN stream that required by CUC which collects the TSN stream requirements from end stations for fully centralized model. In an example, a control plane based QoS negotiation may be employed. As depicted in FIG. 21, the CNC may negotiate with a PCF through the TSN AF to generate a TSN-aware QoS profile for a stream. The TSN AF may convert TSN traffic characteristics to TSN QoS requirements, TSN QoS Profile, and/or the like.

In an example, for the control plane based solution, the AF may act as a controller function to collect 5GS virtual bridge related information (e.g. AF receives the information from SMF and may register it to CNC via TSN defined application interfaces). The information may comprise: bridge identity, port identities, bridge delay, sending delay, bridge related topology information, and/or the like. In an example, bridge identity may identify a TSN bridge in the TSN network. In an example, ports identities may identify ports in a TSN bridge. Bridge delay may comprise a delay value of frames as they pass through the bridge, that may comprise maximum and minimum of independent and dependent delay. Sending delay may be the delay for a frame transmitted from a TSN bridge port to a neighboring port on a different bridge. Bridge related topology may comprise the bridge and port identities and port capabilities of a TSN bridge and neighboring bridges. In an example, identities of the virtual bridge and related ports of the UPF may be preconfigured on the UPF and may be reported to the AF via the SMF when the UPF sets up. The UE or PDU session may be virtualized to be a virtual port on the virtual bridge with a (unique) identity that may be allocated by the SMF or the UPF. The TSN AF may interact with the 5G CN and may perform the mapping between TSN network parameters and a new deterministic QoS profile for the 5GS, negotiate the traffic treatment and related QoS policies, and/or the like. In an example, the TSN AF may directly talk to the other 5GC NFs or via the NEF.

In an example, 5GS virtual bridge information may comprise bridge ID, port IDs, bridge internal information (e.g., bridge delay) and bridge port related information (e.g., propagation delay), and/or the like. Information for 5GS virtual bridge may be reported to AF by 5GS control plane, like the bridge ID, port IDs, bridge internal information (e.g., bridge delay) and bridge port related information (e.g., propagation delay), and/or the like.

Figure 42:
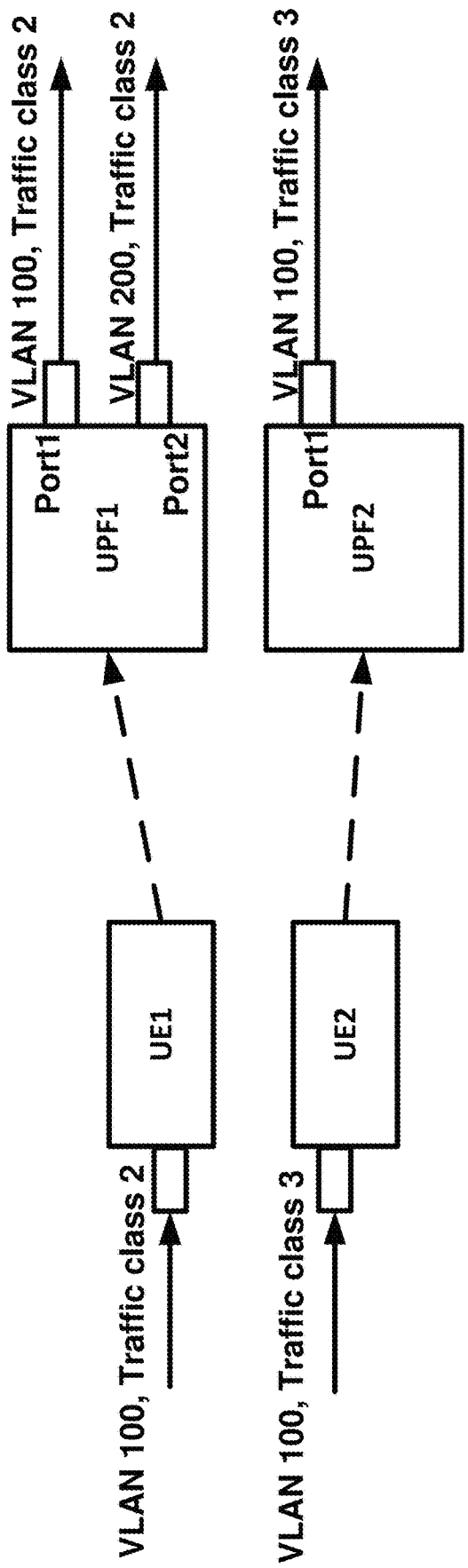
FIG. 42 is an example diagram as per an aspect of an embodiment of the disclosure.

In an example as depicted in FIG. 42, the 5GS virtual bridge may be per UPF, per TSN network (indicated by DNN), and the 5GS virtual bridge user plane may comprise UPF ports and the UE ports connected to such UPF ports via PDU session. Identities of the virtual bridge and related UPF ports may be preconfigured on UPF and may be reported to AF through SMF when UPF sets up or the PDU Session is established. The UE port identity may be unique in a 5GS virtual bridge and the UE port identity may be allocated by UPF. The UPF port and UE port related information may be reported to AF by SMF directly or via NEF. The UPF port related information may be reported to the SMF by UPF using the node level signaling or PDU session level signaling. The UE port related information may be reported by UE to the SMF over NAS or over UP of its corresponding PDU session. In an example, a UE may operate in switch mode, Ethernet switch mode, and/or the like. In an example, the UE port of 5GS virtual bridge may be the physical port of UE, virtual port/interface of the UE, and/or the like.

In an example, traffic scheduling in TSN bridge may be per traffic class, which is service level of packets transmission. A TSN bridge port may support different traffic classes. In an example, if the TSN bridge is aware of VLAN, a TSN bridge port may support different VLANs. When SMF selects the UPF for the PDU Session, it may consider the UE subscribed traffic classes and VLANs.

As depicted in example FIG. 42, UPF1 and UPF2 support different VLANs and traffic classes based on deployment. When UE1 and UE2 establish PDU session, the UPF1 and UPF2 are selected respectively to meet their subscribed VLANs and traffic classes. As the bridge delay defined in 802.1QCC is per traffic class per port pair, the UPF may determine the right port pairs to serve the PDU session, and the SMF may report bridge delay on such port pairs. For UE1 in the figure for example, the UPF1 may determine the Port1, which supports traffic class 2, VLAN 100 requested by UE1, to serve the PDU Session. Then SMF may report the bridge delay of traffic class 2 for port pair (UE1 port and UPF1 Port1).

Figure 43:
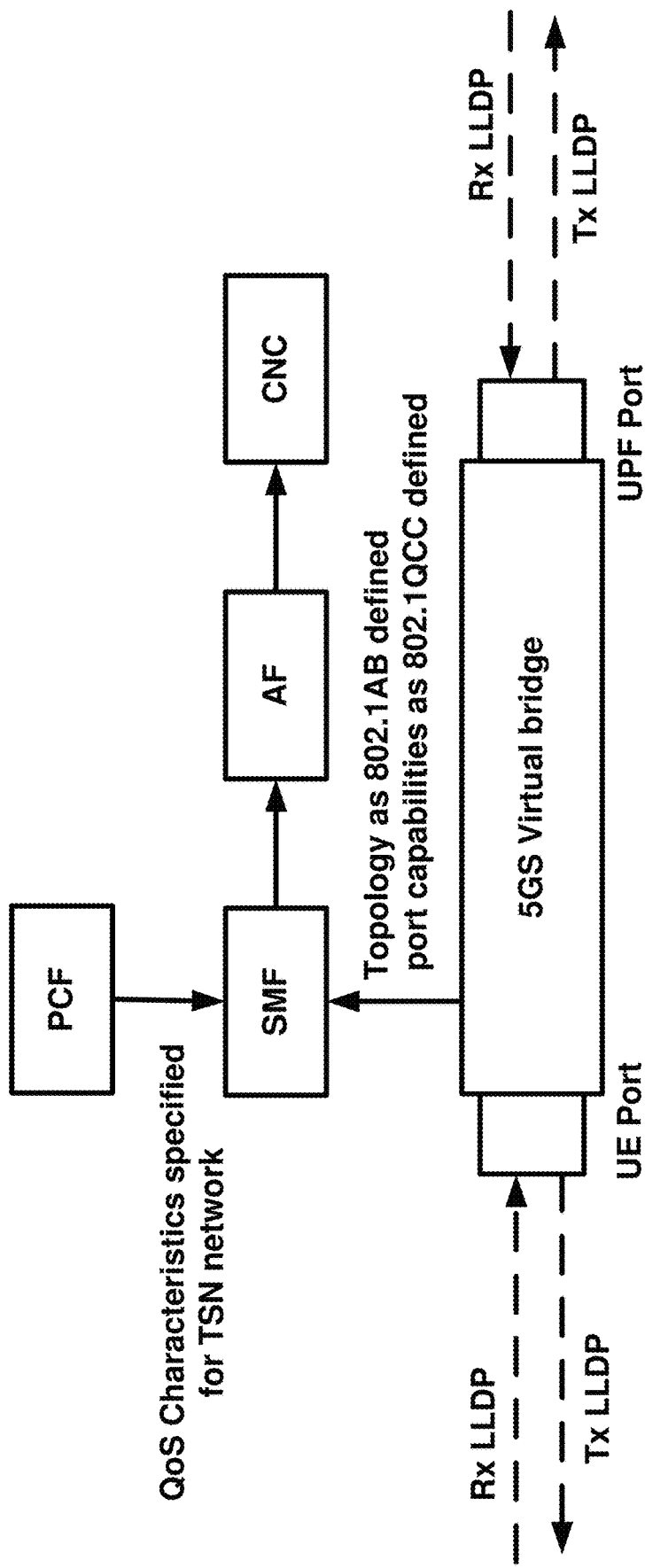
FIG. 43 is an example diagram as per an aspect of an embodiment of the disclosure.
Figure 44:
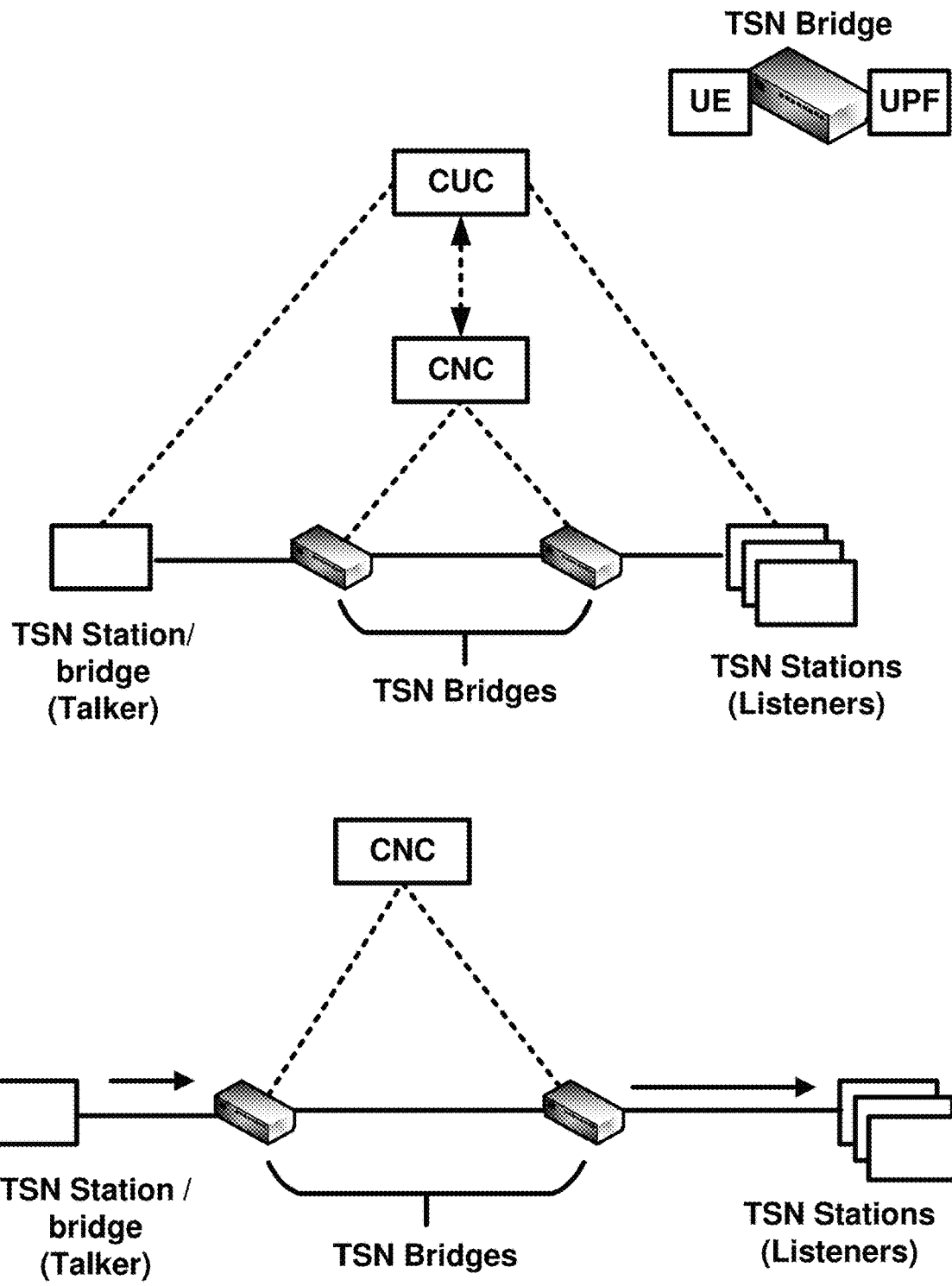
FIG. 44 is an example diagram as per an aspect of an embodiment of the disclosure.
Figure 45:
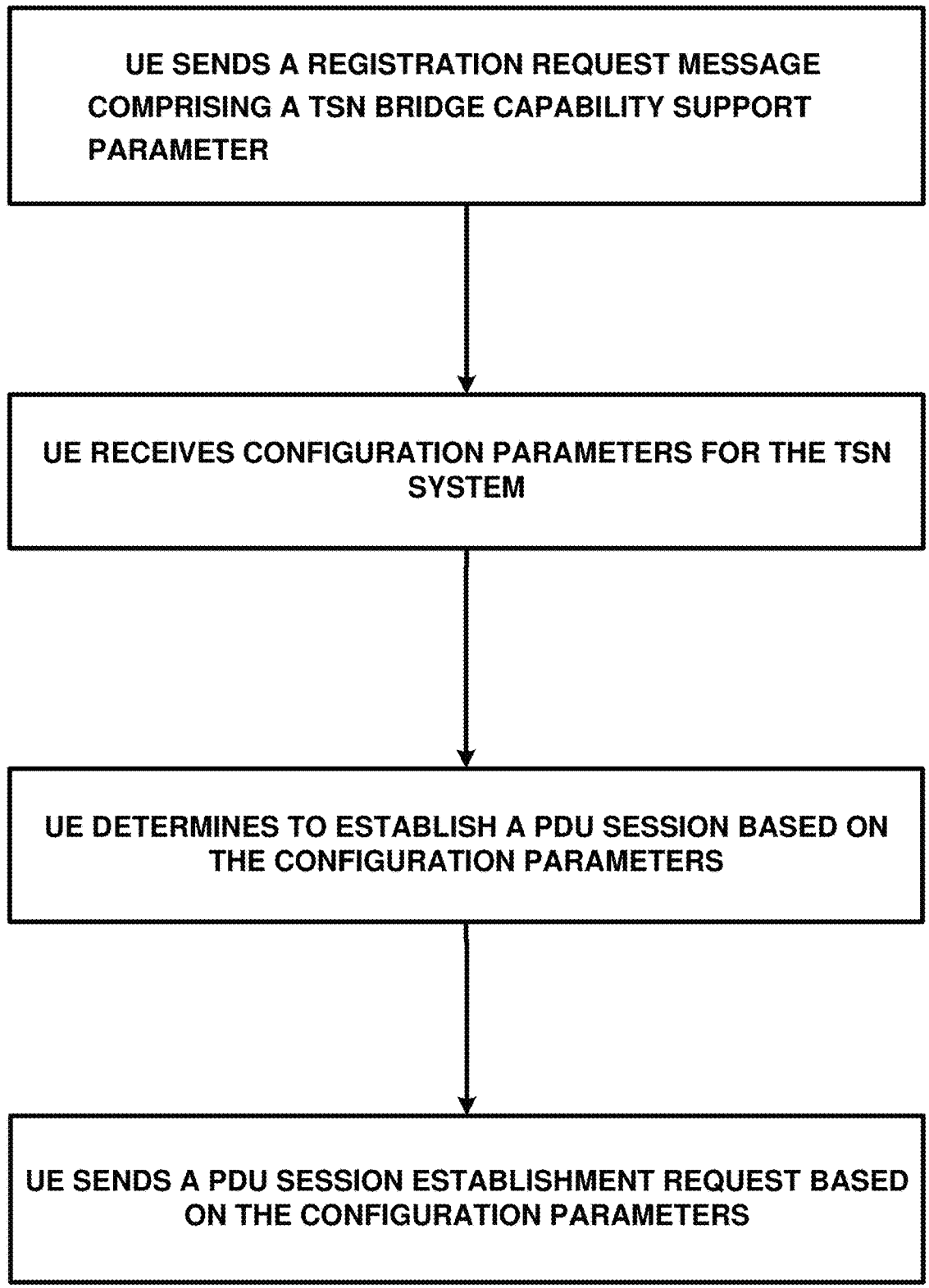
FIG. 45 is an example diagram as per an aspect of an embodiment of the disclosure.
Figure 46:
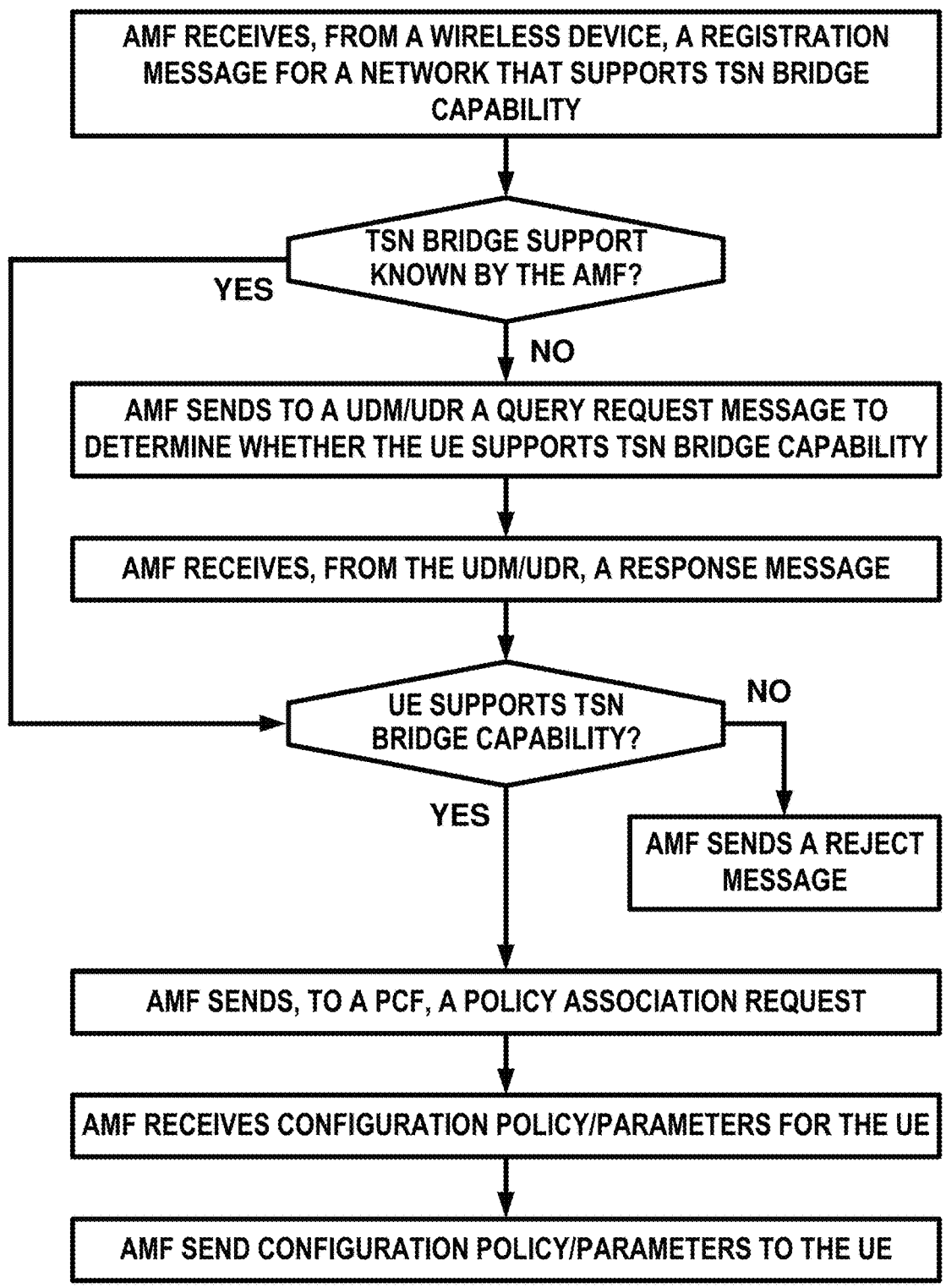
FIG. 46 is an example diagram as per an aspect of an embodiment of the disclosure.

In an example as depicted in FIG. 43, for 5GS virtual bridge topology discovery, the UPF and UE may report topology information as 802.1AB defined to SMF when received link layer discovery protocol (LLDP) packets from one or more devices (e.g., UE, end station, TSN device, Ethernet device, and/or the like). The topology information may be reported when it is discovered at the first time or when it is changed/modified. The UPF and UE may send LLDP packets in order to enable the one or more devices discovering/reporting the 5GS virtual bridge. One or more port of 5GS virtual bridge may support sending LLDP or receiving LLDP. For propagation delay and port capabilities as 802.1Qcc defined, the UPF and UE may report them to SMF similar as topology information reporting. The 5GS may support TSN network specific QoS characteristics and the mapping between such QoS characteristics and the traffic classes. Packet delay budget (PDB) in the QoS characteristics may be employed to realize the maximum latency transmission for deterministic delivery. The SMF may get the QoS characteristics for UE's subscribed traffic classes and SMF may employ the PDB in them as the bridge delay for the corresponding traffic class on the port pair. The AF may collect/gather/obtain/receive and may maintain 5GS virtual bridge related information. The AF may act as the control plane of the 5GS virtual bridge, and may register or update those information to CNC as 802.1Qcc and 802.1AB defined. For QoS profile generation, the AF may maintain the relationship between UE ID, 5GS virtual bridge ID and UE port ID. The AF may determine/find the corresponding UE ID when receiving TSN stream rule (Bridge ID, Ingress port ID, Egress port ID, Stream description, stream id, and/or the like) from CNC. The AF may determine the traffic class in the TSN stream rule and map the traffic class to corresponding 5QI.

In an example embodiment, a TSN bridge may report capabilities. In an example, identities of 5GS virtual bridge and UPF ports may be pre-configured on UPF based on deployment. The UPF may report its port capabilities and propagation delay as 802.1Qcc defined, the topology information as 802.1AB defined, and the corresponding DNN to SMF using node level singling, and the SMF may forward the received information to the AF directly or via NEF in order to generate or update the 5GS virtual bridge and bridge port. The UE may send PDU session establishment request to the AMF. The AMF may select a SMF for the PDU Session. The SMF may receive the UE subscribed traffic classes and VLANs from the UDM, and may receive the QoS characteristics (e.g., 5QI, PDB) corresponding to the subscribed traffic classes from PCF. The SMF may select a UPF to support the subscribed traffic classes and subscribed VLANs. The SMF may send N4 session establishment request to UPF with DNN, traffic class IDs and VLAN values to request for allocating UE port ID and determining serving UPF ports. The UPF may determine the 5GS virtual bridge for the PDU session, and may allocate an identity for UE port. Based on the traffic classes and VLANs that UPF port supports in the DN, the UPF may determine the UPF ports to serve the PDU session. The UPF may send the allocated UE port identity with corresponding 5GS virtual bridge identity, the serving UPF port IDs with corresponding traffic class IDs, and/or the like to the SMF. The SMF may send the PDU session related 5GS virtual bridge ID and may allocate UE port ID to UE. The information may be employed for UE to perform topology discovery and information reporting. The SMF may take the PDB in QoS characteristics as the bridge delay for corresponding traffic class and port pair, and may send the 5GS virtual bridge related information (bridge delay, UE port ID, UPF port ID, traffic class, 5GS virtual bridge ID, UE ID) to the AF or via NEF in order to add the UE port or update the bridge properties.

In an example, when the PDU session is established, the UE may report its port capabilities and propagation delay as 802.1Qcc defined and report the topology information as 802.1AB defined to SMF over NAS or user plane. The AF may receive/collect/gather and may maintain the 5GS virtual bridge properties including bridge ID, port ID of UPF ports, port ID of UE ports, port related capabilities and bridge delay of port pairs, and/or the like. The AF may send the 5GS virtual bridge properties to CNC to create a TSN bridge or update the bridge when the bridge properties are changed.

In an example embodiment, the UE may operate as an Ethernet switch. The SMF may configure the UE to operate as an Ethernet switch with configuration parameters provided during the establishment of a PDU Session, or configuration of the TSN bridge. The PDU session may provide access to the end station via the TSN bridge to communication with one or more end stations. The UE operating as an Ethernet switch may be part of one or more TSN systems. One or more backend devices may be connected to the UE operating as an Ethernet switch. In an example, the SMF may provide configuration parameters to the UE in switch mode. The configuration parameters may comprise an indicator whether the UE in Ethernet switch mode may turn on or off the Spanning Tree Algorithm, a periodic timer of sending BDPU messages, a bridge identifier of the UE in Ethernet switch mode, an indicator whether the UE in Ethernet switch mode may notify the change of port's status, an indicator whether the UE in Ethernet switch mode may report the list of MAC address(es) of the TSN end stations, backend devices, and/or the like connected in the backend networks.

In an example, if the SMF indicates to the UE to report the list of MAC address(es) of the backend devices or the TSN end stations, the UE in switch mode may obtain the list of MAC address(es) of the backend devices connected or changed in the backend networks. In an example, when one PDU session provides communication for more than one TSN systems, the UE may obtain/determine the mapping relationship of MAC address(es) and the TSN systems. The UE may inform the SMF of the list of MAC address(es) and the mapping relationship during the PDU session establishment/modification procedure when the UE receives the indicator or detects the changes on the backend devices. The SMF may provide to the UPF Ethernet packet filter set and forwarding rule(s) based on the MAC address(es) and the mapping relationship. The UPF may detect and forward Ethernet frames based on the Ethernet packet filter set and forwarding rule(s) received from the SMF.

In an example, the UE in Ethernet switch mode may report its port states that may result from the execution of the spanning tree algorithm, and/or the like so that the SMF may control the UPF's port states based on the report to prevent the waste of network resources.

In an example, the UPF may support S-tag (IEEE 802.1ad), C-tag (IEEE 802.1q). In an example, a PDU session may provide access to one or more TSN systems, TSN end station, and/or the like. S-tag and/or C-tag for the stream of data packets may be employed. TSN system configurations may be pre-configured on the UE or provided to the UE by the network e.g., SMF, and/or the like. In an example, a TSN system identifier may be employed to identify the TSN system, one or more TSN end stations, and/or the like. In an example, the operator may assign the list of TSN systems or TSN end station identifiers for the UEs. The identifiers may be configured in the UDR, UDM, and/or the like. The SMF may be configured by the operator to have the mapping tables for TSN identifiers, VLAN ID, C-tag, S-tag, and/or the like. The SMF may map the list of the TSN end station identifiers connected to the UE, which is notified through the procedures of PDU Session establishment, into the S-tag and C-tag, and packet filter for the uplink traffic. The UPF may insert S-tag and C-tag onto the traffic which is sent to N6, and/or the like based on the packet filter for the uplink traffic.

In an example, a 3GPP system, 5GS, and/or the like may be employed to act as a TSN bridge. The TSN bridge ports may be deployed at a UE and a UPF. A TSN system may transmit and receive data packets, a stream of data packets, and/or the like. In existing technologies, when the UE receives a request from a TSN station (e.g., a bridge, a switch port, a TSN end station, and/or the like), or from an application related to the TSN system on the UE, the UE may request configuration of a session for the TSN system or select the route for the request. The UE may select a route or establish PDU sessions which do not meet the TSN system requirements or application preferences and, as a result, applications may not work as expected. Embodiments of the present disclosure provide mechanisms to enhance the performance of TSN systems, TSN bridge configuration, and/or the like. Embodiments of the present disclosure provide implementations of signaling between the UE and 3GPP system that supports TSN, configuration of parameters, and signaling for UE configuration update (UCU) procedure.

Figure 22:
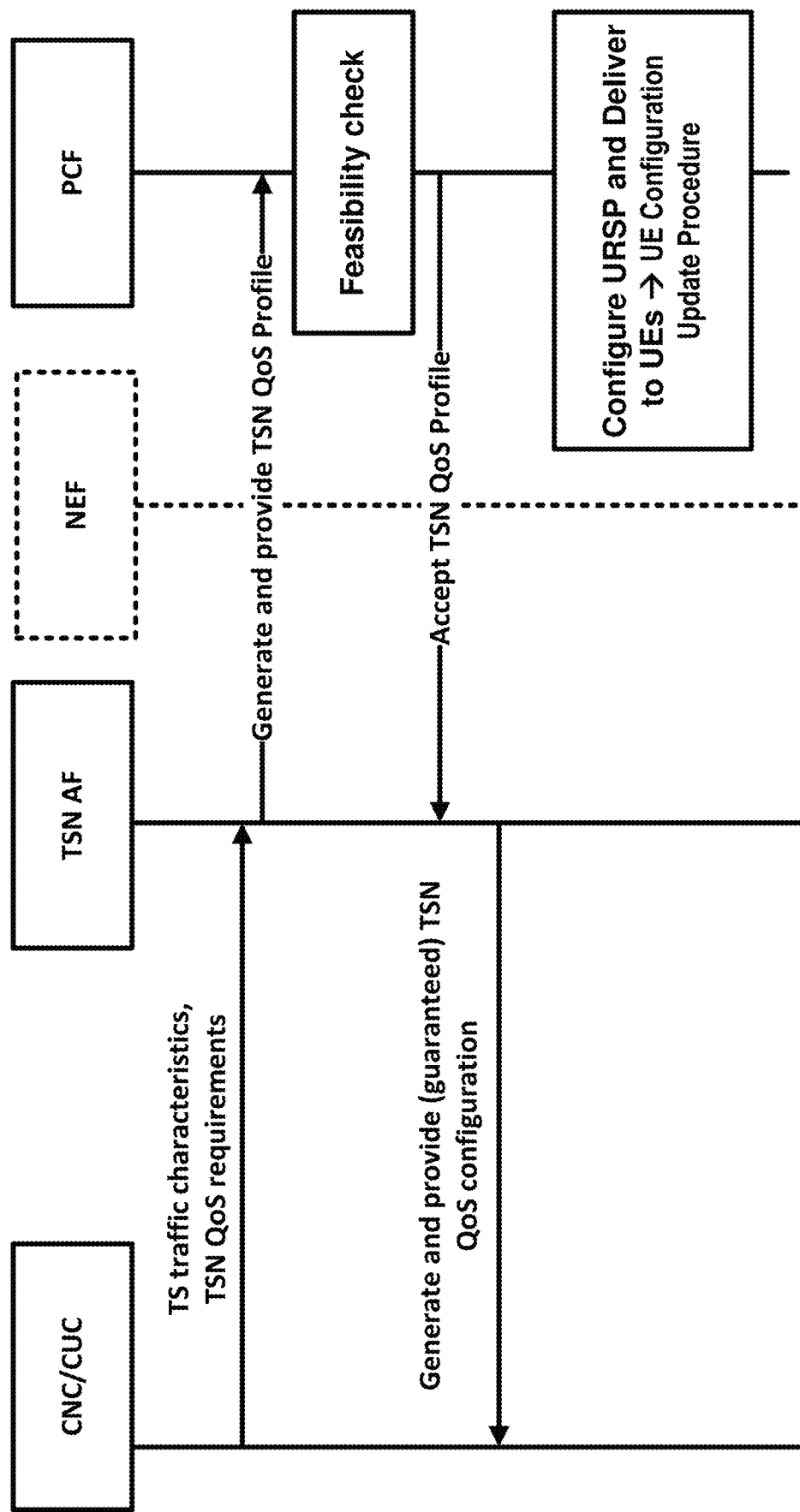
FIG. 22 is an example call flow as per an aspect of an embodiment of the disclosure.
Figure 23:
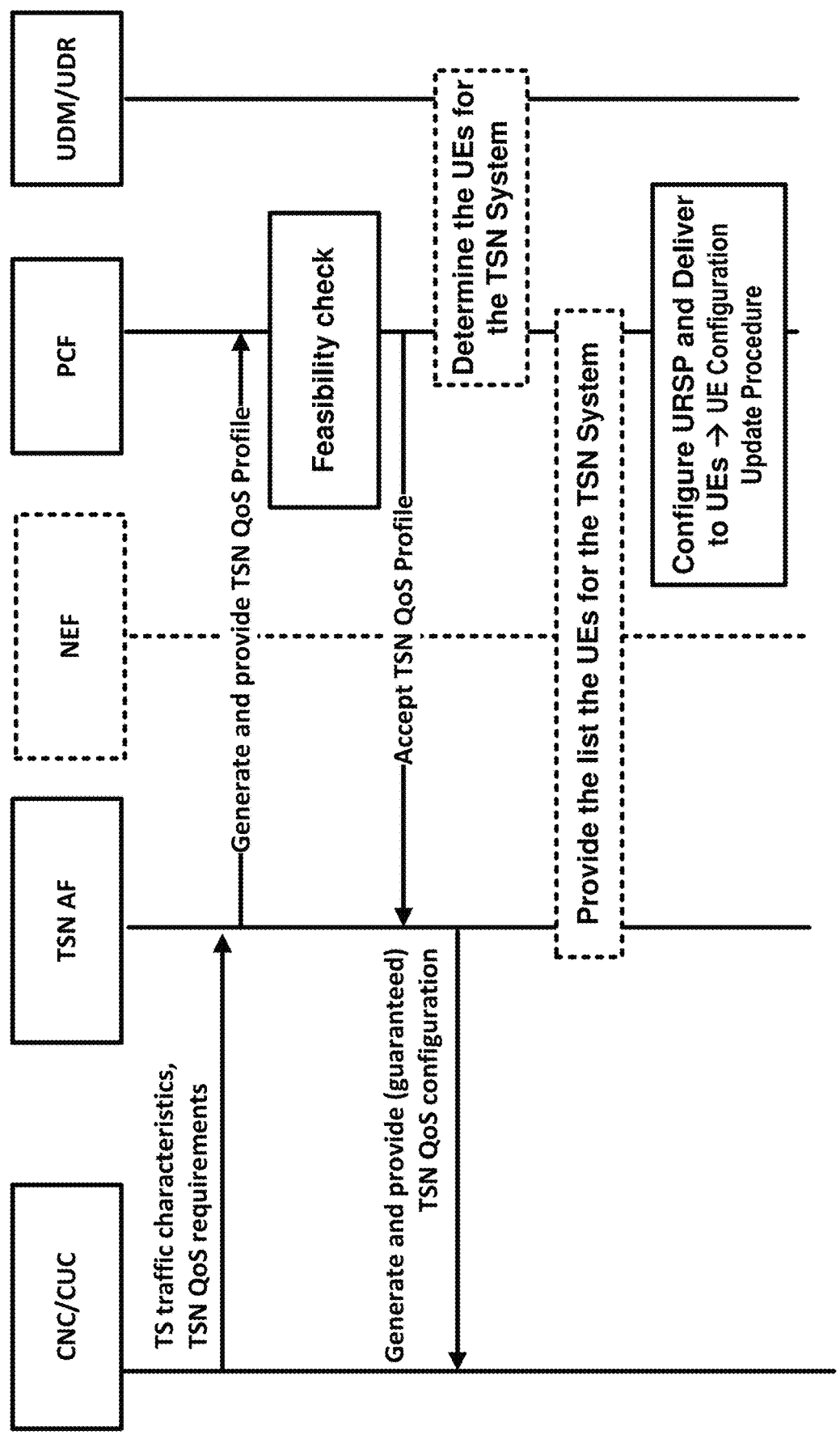
FIG. 23 is an example call flow as per an aspect of an embodiment of the disclosure.

In an example embodiment as depicted in FIG. 22, a TSN AF may be employed for the conversion/mapping/association between TSN bridge requirements, TSN traffic characteristics, and/or the like to TSN QoS requirements, TSN QoS Profile, and/or the like. The TSN AF may provide TSN QoS profile to a PCF (e.g., directly or via NEF). The PCF may perform a feasibility check with SMF, UDM/UDR, and/or the like, and the SMF may check further with a RAN node, a UPF, and/or the like. If a communication network/system (e.g., EPC, 5GS, and/or the like) is able to fulfil the requested QoS profile from the TSN AF, the PCF may indicate to the acceptance of the requested TSN QoS requirements to the TSN AF. If the 5GS is unable to fulfil the QoS profile requirements, it may send a reject message to the TSN AF that may be relayed to the CNC, CUC, the TSN system, and/or the like. Based on the agreed QoS profile between TSN and the communication network (5G network), the PCF may determine one or more related QoS policies and rules and provide that to the SMF and UE.

In an example embodiment, the PCF may determine/configure a UE route selection policy (URSP). The URSP may be for a TSN system configuration at the UE. The PCF may generate the URSP with a set of one ore more rules/policies that are associated with a traffic descriptor, connection capabilities descriptor, and/or the like. In an example, the traffic descriptor may further comprise a system descriptor. The descriptor may be a TSN bridge identifier, a TSN port identifier of the UE, a TSN port priority of the UE, an identifier of the stream (e.g., TSN stream or stream ID) and/or the like. The connection capabilities may be part of the traffic descriptor of the URSP. For the URSP rule/policy associated with the TSN system, the connection capabilities indicator may be TSN, TSN bridge, IEEE 802.1Q, and/or the like.

The URSP may be employed by the UE to determine how to route outgoing traffic. Traffic may be routed to an established PDU session, may be offloaded to non-3GPP access outside a PDU session, or may trigger establishment of a new PDU Session, and/or the like. In an example, the URSP may be employed by the UE to determine if a detected application may be associated to an established PDU session, may be offloaded to non-3GPP access outside a PDU Session, or may trigger the establishment of a new PDU session. The URSP rules may comprise one or more traffic descriptors that specify the matching criteria and one or more of the following components: SSC mode selection policy (SSCMSP) that may be employed by the UE to associate the matching application with SSC modes, a network slice selection policy (NSSP) that may be employed by the UE to associate the matching application with S-NSSAI, a DNN selection policy that may be employed by the UE to associate the matching application with the DNN, a PDU session type policy that may be employed by the UE to associate the matching application with a PDU session type, a Non-seamless Offload Policy that may be employed by the UE to determine that the matching application may be non-seamlessly offloaded to non-3GPP access (e.g., outside of a PDU Session), an access type preference (e.g., If the UE needs to establish a PDU Session for the matching application, this indicates the preferred access type (3GPP or non-3GPP)), and/or the like.

In an example, an ANDSP and URSP may be pre-configured in the UE or may be provisioned to the UE from the PCF. The pre-configured policy may be applied by the UE when it has not received the same type of policy from the PCF. The PCF may select the ANDSP and URSP applicable for one or more UEs based on local configuration, subscribed S-NSSAIs and operator policies taking into consideration e.g. accumulated usage, load level information per network slice instance, UE location. In the case of a roaming UE, the V-PCF may retrieve ANDSP and URSP from the H-PCF over N24, Npcf, and/or the like. When the UE is roaming and the UE has valid rules from both HPLMN and VPLMN, the UE may give priority to the valid ANDSP rules from the VPLMN. The ANDSP and URSP may be provided from the PCF to the AMF via N15, Namf interface, and/or the like and then from AMF to the UE via the N1 interface, NAS message, and/or the like. The PCF may be notified that the UE Policy delivery has failed. When the failure happens (e.g. because of UE unreachable), the PCF may subscribe the connectivity state changes (IDLE or CONNECTED) event. After reception of the notify message indicating that the UE enters the CM-Connected state, the PCF may retry to deliver the UE policy (e.g., URSP). In an example, when the UE has valid URSP rules, the UE may perform the association based on user preference and rules. When there is applicable user preference for the matching application, the user preference takes precedence over any present route selection component. In an example, the SSC mode selection and network slice selection components may be prioritized. For the existing PDU session(s), the UE may examine the URSP rules within the UE policy in order to determine whether the existing PDU session(s) are maintained. The UE may initiate a PDU Session release procedure for the PDU session(s) that cannot be maintained.

The URSP, as depicted in example FIG. 32, FIG. 33, FIG. 34, FIG. 35, FIG. 36, FIG. 37, FIG. 38, FIG. 39, FIG. 40, and FIG. 41, may comprise one or more rules for selection of a route based on a traffic descriptor, a set of one or more traffic descriptors, a list of route selection descriptors, one or more route selection components, and/or the like.

Figure 24:
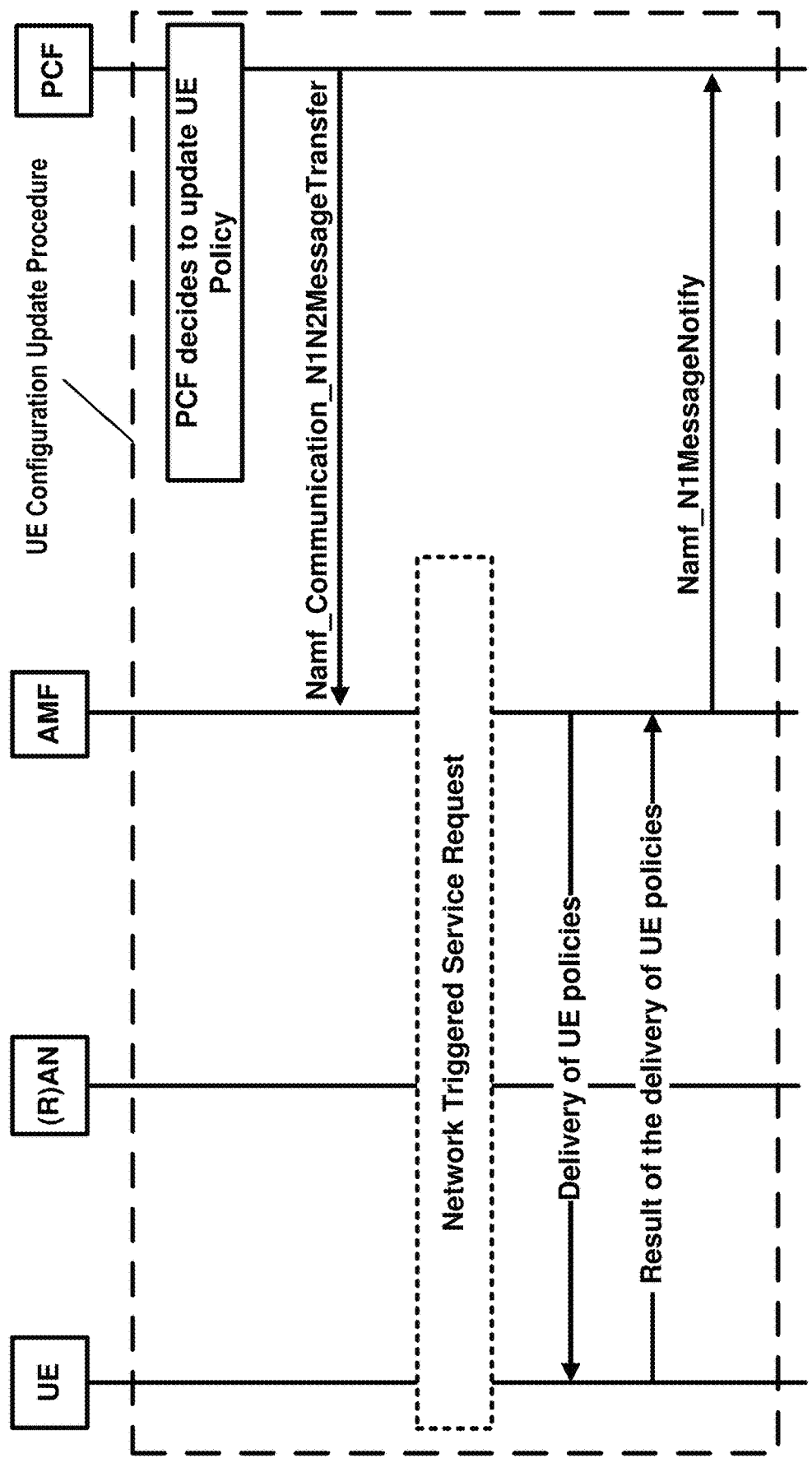
FIG. 24 is an example call flow as per an aspect of an embodiment of the disclosure.

In an example as depicted in FIG. 24, when the PCF determines/decides to update UE policy, the UE may employ a UE configuration update (UCU) procedure, a UE policy delivery procedure, and/or the like. The procedures may be based on triggering conditions such as an initial registration or a procedure that requires updating UE policy. In an example, for an initial registration case, the PCF may compare the list of public service identifiers (PSIs) included in the UE access selection and PDU session selection related policy information in Npcf_UEPolicyControl_Create request and may determine whether UE access selection and PDU session selection related policy information have to be updated and be included in the response to the AMF. For the network triggered UE policy update case (e.g. change of TSN related policy/configuration, creation of new TSN related configuration policy, change of UE location, the change of subscribed S-NSSAIs, and/or the like), the PCF may check the latest list of PSIs to decide which UE access selection and/or PDU session selection related policies have to be sent to the UE. The PCF may examine/check if the size of the resulting UE access selection and PDU session selection related policy information exceeds a predefined limit. If the size is under the limit, then UE access selection and PDU Session selection related policy information may be included in a single Namf_Communication_N1N2MessageTransfer service operation. If the size exceeds the predefined limit, the PCF may split the UE access selection and PDU session selection related policy information in smaller, logically independent UE access selection and PDU session selection related policy information, ensuring the size of each is under the predefined limit. One or more URSP, UE access selection, and PDU session selection related policy information may be sent in separated Namf_Communication_N1N2MessageTransfer service operations.

In an example, the PCF may invoke Namf_Communication_N1N2MessageTransfer service operation provided by the AMF. The message may comprise SUPI, UE Policy Container, URSP, and/or the like. If the UE is registered and reachable by AMF in either 3GPP access or non-3GPP access, the AMF may transfer/send/transmit the UE Policy container to the UE via the registered and reachable access. If the UE is registered in both 3GPP and non-3GPP accesses and reachable on both access and served by the same AMF, the AMF may transfer/send/transmit the UE Policy container to the UE via one of the accesses based on the AMF local policy. If the UE is not reachable by AMF over both 3GPP access and non-3GPP access, the AMF may report to the PCF that the UE policy container may not be delivered to the UE using Namf_Communication_N1N2TransferFailureNotification. If the AMF decides/determines to transfer the UE policy container to the UE via 3GPP access, e.g. the UE is registered and reachable by AMF in 3GPP access, or if the UE is registered and reachable by AMF in both 3GPP and non-3GPP accesses served by the same AMF and the AMF decides to transfer the UE policy container to the UE via 3GPP access based on local policy, and the UE is in CM-IDLE and reachable by AMF in 3GPP access, the AMF may start a paging procedure by sending a paging message and invoke a network triggered service request procedure. Upon reception of paging request, the UE may initiate the UE triggered service request procedure.

In an example embodiment, if the UE is in CM-CONNECTED over 3GPP access or non-3GPP access, the AMF may transfer the UE policy container (UE access selection and PDU session selection related policy information) received from the PCF to the UE. The UE policy container may comprise the URSP.

In an example, the UE may update the UE policy provided by the PCF and may send the result to the AMF. If the AMF received the UE policy container and the PCF subscribed to be notified of the reception of the UE policy container, the AMF may send/forward the response of the UE to the PCF by employing a Namf_N1MessageNotify operation. The PCF may maintain the latest list of PSIs delivered to the UE and may update the latest list of PSIs in the UDR/UDM by invoking Nudr_DM_Update (SUPI, policy data, policy set entry, updated PSI data, and/or the like) service operation.

Figure 25:
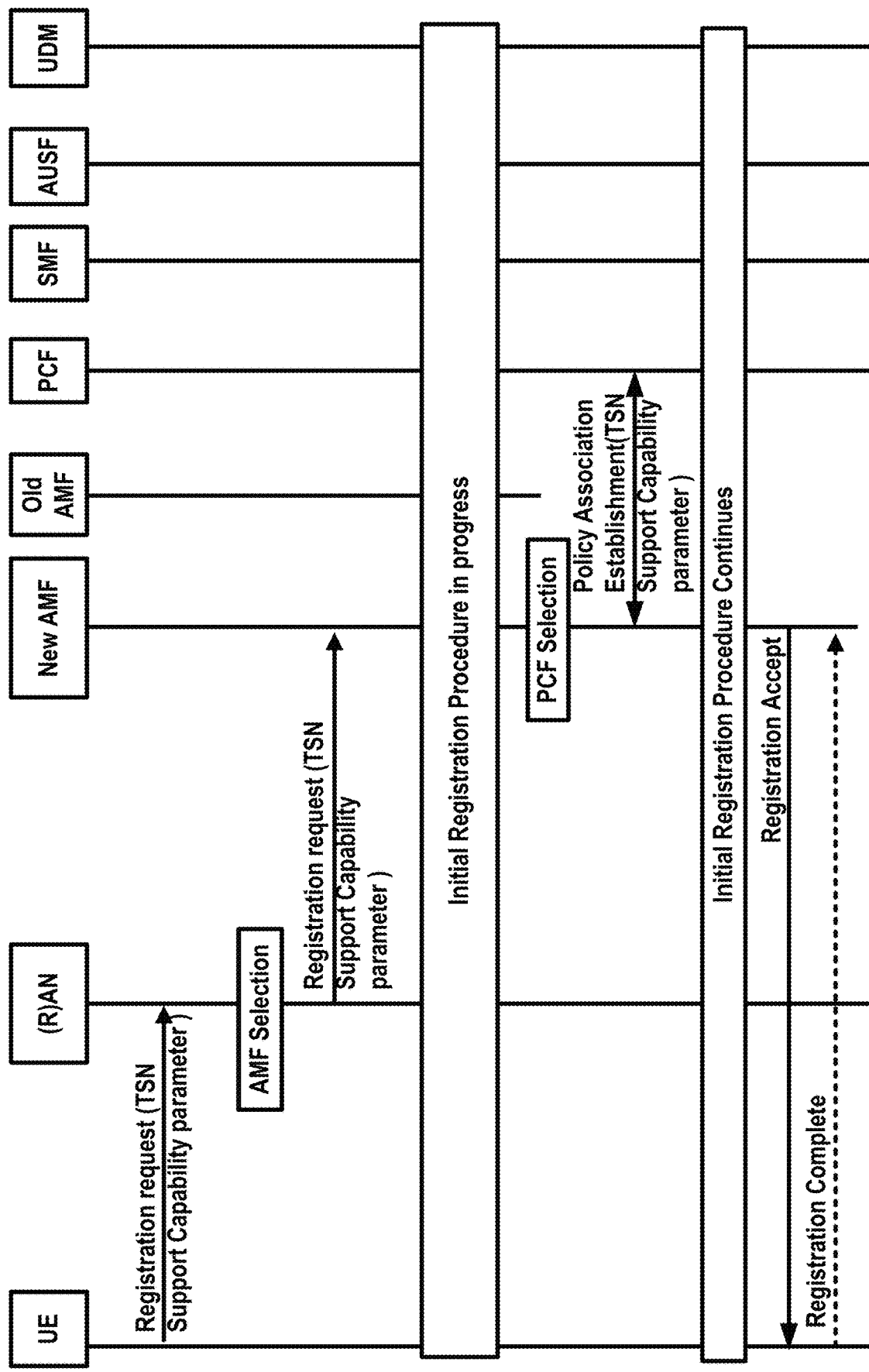
FIG. 25 is an example call flow as per an aspect of an embodiment of the disclosure.

In an example embodiment as depicted in FIG. 25, a registration procedure (e.g., the initial registration procedure as depicted in FIG. 8 and FIG. 9) may be performed by the UE (e.g., a wireless device, a device that supports bridge functionality, IEEE 802.1Q, VLAN port, physical bridge port, virtual bridge port, ethernet switch, learning ethernet switch, and/or the like).

In an example, the UE may send to a RAN node (e.g., a base station, eNB, gNB, and/or the like) a registration request message e.g., an AN message. The registration request message may comprise a TSN support capability parameter/flag (e.g., TSN bridge capability support parameter, TSN bridge capability, and/or the like), AN parameters, registration request (e.g., registration type, SUCI or 5G-GUTI or PEI, last visited TAI (if available), security parameters, requested NSSAI, [mapping of requested NSSAI], default configured NSSAI indication, UE radio capability update, UE MM core network capability, PDU Session status, List Of PDU sessions to be activated, follow-on request, MICO mode preference, requested DRX parameters, [LADN DNN(s) or indicator of requesting LADN information]), UE policy container (the list of PSIs, indication of UE support for ANDSP and the operating system identifier), and/or the like), and/or the like. In an example, the registration request may further comprise the TSN support capability parameter/flag.

In an example, if a 5G-S-TMSI or GUAMI is not included or the 5G-S-TMSI or GUAMI does not indicate a valid AMF, the (R)AN node, based on (R)AT and requested NSSAI, if available may selects an AMF. In an example, the RAN node may select the AMF based on the TSN support capability parameter/flag. In an example, the (R)AN may forward the registration request message to the AMF based on the N2 connection of the UE. In an example, if the (R)AN cannot select an appropriate AMF, it may forward the registration request to an AMF which has been configured, in (R)AN, to perform AMF selection.

In an example, the (R)AN may send to the (new) AMF an N2 message. The N2 message may be a registration request message. The N2 message may comprise N2 parameters, the registration request, UE Policy Container, and/or the like. The N2 message may further comprise the TSN support capability parameter/flag. When NG-RAN is employed, the N2 parameters may comprise the selected PLMN ID, location information and cell identity related to the cell in which the UE is camping, UE context request which may indicate that a UE context including security information requires to be setup at the NG-RAN. When NG-RAN is employed, the N2 parameters may further comprise the establishment cause. In an example, when the establishment cause is associated with priority services (e.g. MPS, MCS, TSN and/or the like), the AMF may include a message priority header to indicate priority information. Other NFs may relay the priority information by including the message priority header in service-based interfaces.

In an example, the (new) AMF, based on the identifiers of the UE (e.g., SUPI, and/or the like), may select a UDM. The UDM may select a UDR instance. If the AMF has changed since the last registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the (new) AMF may register with the UDM using Nudm_UECM_Registration for the access to be registered (and may subscribe to be notified when the UDM deregisters this AMF). The AMF may provide the indication for homogenous support of IMS voice over PS sessions to the UDM. If the AMF does not have subscription data for the UE, the AMF may retrieve the access and mobility subscription data, SMF selection subscription data and UE context in SMF data by employing Nudm_SDM_Get operation, and/or the like. The UDM may retrieve this information from UDR by Nudr_DM_Query, and/or the like. After a successful response is received, the AMF may subscribe to be notified using Nudm_SDM_Subscribe when the data requested is modified. The UDM may subscribe to UDR by Nudr_DM_Subscribe. The GPSI may be provided to the AMF in the access and mobility subscription data from the UDM if the GPSI is available in the UE subscription data. The UDM may provide indication that the subscription data for network slicing is updated for the UE. If the UE is subscribed to TSN in the serving PLMN, TSN priority may be included in the access and mobility subscription data provided to the AMF. In an example, the TSN priority may indicate that the user/UE is subscribed to TSN services/system. The TSN priority may be employed in the registration accept message to the UE to inform the UE whether configuration of an access identity is valid within the selected PLMN, network, NPN, and/or the like. In an example, the TSN priority may be part of system enablers for priority mechanisms. The 3GPP system, 5GS and the 3GPP, 5G QoS model may allow classification and differentiation of services such as TSN, public warning system, SMS over NAS, IMS support, emergency services, mission critical service, multimedia priority services, and/or the like, based on subscription-related and invocation-related priority mechanisms. These mechanisms provide abilities such as invoking, modifying, maintaining, releasing, and/or the like of service, stream, and/or QoS flows with priority, and delivering QoS flow packets according to the QoS characteristics under network congestion conditions. Subscription-related priority mechanisms may comprise the ability to prioritize flows based on subscription information, including the prioritization of RRC connection establishment based on unified access control mechanisms and the establishment of prioritized QoS Flows. Invocation-related priority mechanisms may be the ability for the service layer to request/invoke the activation of prioritized QoS flows through an interaction over Rx/N5 and packet detection in the UPF. QoS mechanisms applied to established QoS flows may include the ability to fulfil the QoS characteristics of QoS flows through preservation of differentiated treatment for prioritized QoS flow and resource distribution prioritization.

The (new) AMF may provide the access type it serves for the UE to the UDM and the access type may be set to 3GPP access. The UDM may store the associated access type together with the serving AMF and may retain the AMF identity associated to the other access type if any. The UDM may store in UDR information provided at the AMF registration by Nudr_DM_Update, and/or the like. The (new) AMF may create a UE context for the UE after getting the access and mobility subscription data from the UDM. the access and mobility subscription data may include whether the UE is allowed to include NSSAI in the 3GPP access RRC connection establishment.

Figure 26:
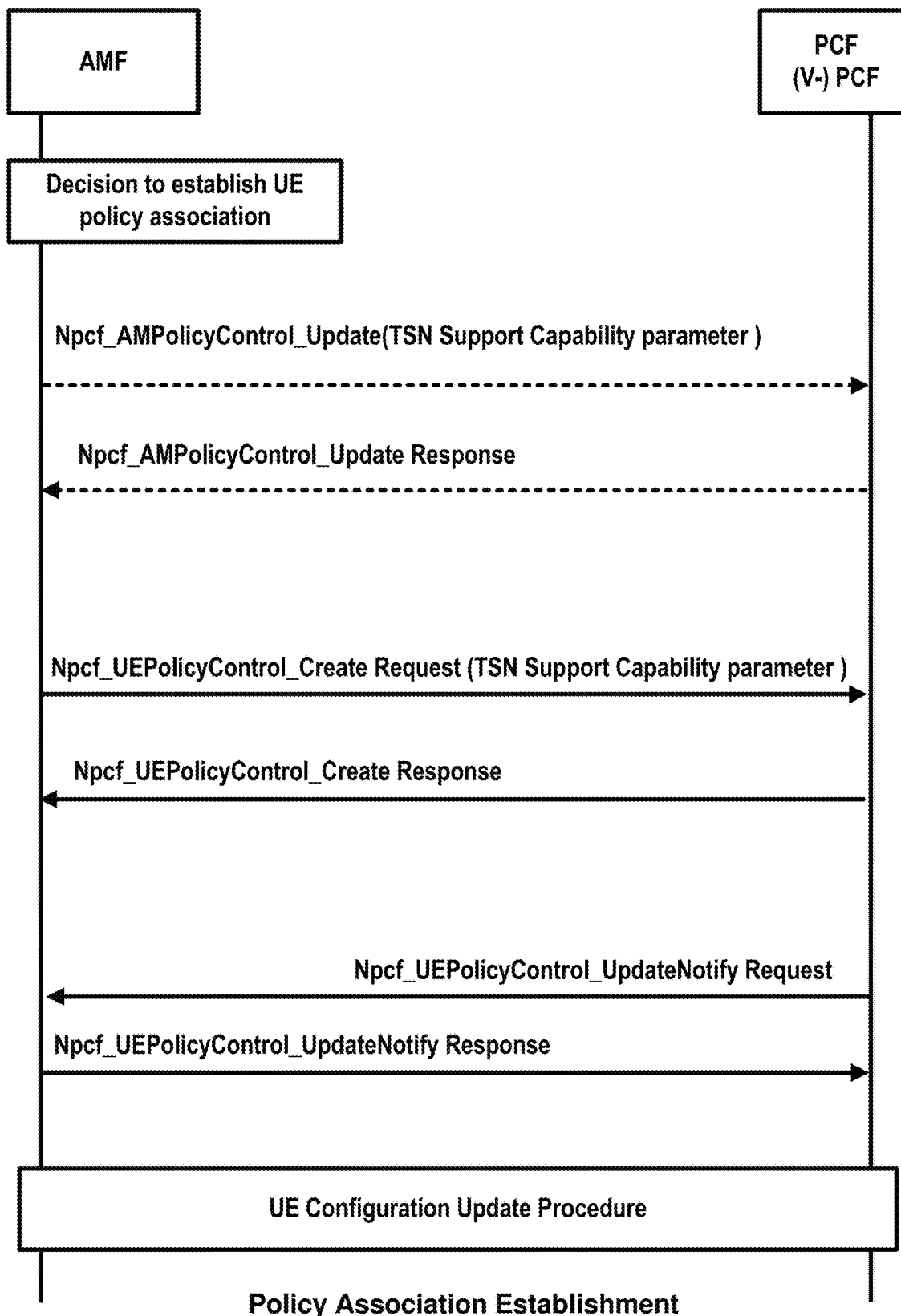
FIG. 26 is an example call flow as per an aspect of an embodiment of the disclosure.

In an example, the AMF may determine/decide to initiate PCF communication. If the AMF determines to contact the (V-)PCF identified by PCF ID included in UE context from the (old) AMF, the AMF may contact the (V-)PCF identified by the (V-)PCF ID. If the AMF determines/decides to perform PCF discovery and selection and the AMF selects a (V)-PCF and may select an H-PCF (for roaming scenario). In an example, the (new) AMF may perform an AM policy association modification as depicted in FIG. 26. If the (new) AMF contacts the PCF identified by the (V-)PCF ID received during inter-AMF mobility, the new AMF may include the PCF ID(s) in the Npcf_AMPolicyControl Create operation. If the AMF notifies the mobility restrictions (e.g. UE location) to the PCF for adjustment, or if the PCF updates the mobility restrictions itself due to some conditions (e.g. application in use, time and date, and/or the like), the PCF may provide the updated mobility restrictions to the AMF. If the subscription information includes tracing requirements, the AMF may provide the PCF with tracing requirements.

In an example, the AMF may send to the SMF a Nsmf_PDUSession_UpdateSMContext message/operation, and/or the like. The AMF may invoke the Nsmf_PDUSession_UpdateSMContext operation. The Nsmf_PDUSession_UpdateSMContext operation may be employed to update the AMF-SMF association to support a PDU session and/or to provide SMF with N1/N2 SM information received from the UE or from the AN. The Nsmf_PDUSession_UpdateSM-Context operation message may comprise the TSN capability support parameter/flag, PDU session ID, N1 SM container received from the UE, N2 SM information received from the AN (e.g. N3 addressing information, notification indicating that the QoS targets cannot be fulfilled for a QFI, Secondary RAT Usage Data), operation type (e.g. UP activate, UP deactivate, UP To Be Switched), Serving GW Address(es) and Serving GW DL TEID(s) for data forwarding during HO from 5GS to EPS, UE location information, AN type, UE Time Zone, H-SMF identifier/address, EBI(s) to be revoked, PDU Session(s) to be re-activated, Direct Forwarding Flag, ARP list, S-NSSAI, Data Forwarding Tunnel (setup/release), UE presence in LADN service area, Target ID, Target AMF ID, GUAMI, backup AMF(s) (if NF Type is AMF), indication of access type can be changed, and/or the like.

In an example, the AMF may invoke the Nsmf_PDUSession_ReleaseSMContext service operation towards the SMF when any PDU session status indicates that it is released at the UE, the AMF invokes the Nsmf_PDUSession_ReleaseSMContext service operation towards the SMF in order to release any network resources related to the PDU Session.

In an example, the (new) AMF may send to N3IWF an N2 AMF mobility request 0 message/command. If the AMF has changed and the old AMF has indicated an existing NGAP UE association towards a N3IWF, the new AMF may create an NGAP UE association towards the N3IWF to which the UE is connected. This may release the existing NGAP UE association between the old AMF and the N3IWF. The N3IWF may send to the new AMF an N2 AMF Mobility Response 0 message/command.

In an example, the new AMF may send to the UE a registration accept message. The registration accept message may comprise 5G-GUTI, registration area, mobility restrictions, PDU session status, allowed NSSAI, [mapping of allowed NSSAI], [configured NSSAI for the serving PLMN], [mapping of configured NSSAI], [rejected S-NSSAIs], periodic registration update timer, LADN information and accepted MICO mode, IMS Voice over PS session supported Indication, emergency service support indicator, accepted DRX parameters, network support of Interworking without N26, access stratum connection establishment NSSAI inclusion mode, network slicing subscription change indication, operator-defined access category definitions). The allowed NSSAI for the access type for the UE is included in the N2 message carrying the registration accept message. The AMF may send a registration accept message to the UE indicating that the registration request has been accepted. 5G-GUTI may be included if the AMF allocates a new 5G-GUTI. If the UE is already in RM-REGISTERED state via another access in the same PLMN, the UE may employ the 5G-GUTI received in the registration accept for both registrations. If no 5G-GUTI is included in the Registration Accept, then the UE may employ the 5G-GUTI assigned for the existing registration for the new registration. If the AMF allocates a new registration area, it may send the registration area to the UE via registration accept message. If there is no registration area included in the registration accept message, the UE may consider the old registration area as valid. Mobility restrictions may be included in case mobility restrictions applies for the UE and registration type is not emergency registration. The AMF may indicate the established PDU sessions to the UE in the PDU session status. The UE may remove locally any internal resources related to PDU sessions that are not marked as established in the received PDU session status. If the AMF invokes the Nsmf_PDUSession_UpdateSMContext procedure for UP activation of PDU session(s) and receives rejection from the SMF, then the AMF may indicate to the UE the PDU session ID and the cause why the user plane resources were not activated. When the UE is connected to the two AMFs belonging to different PLMN via 3GPP access and non-3GPP access then the UE may remove locally any internal resources related to the PDU session of the current PLMN that are not marked as established in received PDU session status. If the PDU session status information was in the registration request, the AMF may indicate the PDU session status to the UE. The mapping of allowed NSSAI may be the mapping of one or more S-NSSAI of the Allowed NSSAI to the HPLMN S-NSSAIs. The mapping of configured NSSAI may be the mapping of one or more S-NSSAI of the configured NSSAI for the serving PLMN to the HPLMN S-NSSAIs. The AMF may include in the registration accept message the LADN Information for the list of LADNs that are available within the registration area determined by the AMF for the UE. If the UE included MICO mode in the request, then the AMF may respond whether MICO mode may be used. The AMF may include operator-defined access category definitions to let the UE determine the applicable operator-specific access category.

In an example, the (new) AMF may send to the UE a registration accept message. The registration accept message may comprise configurations for the TSN system (e.g., S-NSSAI(s) for the TSN, DNN of the TSN system, and/or the like), 5G-GUTI, registration area, mobility restrictions, PDU session status, allowed NSSAI, [mapping of allowed NSSAI], [configured NSSAI for the serving PLMN, NPN, TSN system], [mapping of configured NSSAI for the TSN system], [rejected S-NSSAIs], periodic registration update timer applicable to the TSN system, LADN information of the TSN system, accepted MICO mode for the UE that is part of the TSN bridge, IMS Voice over PS session supported Indication, emergency service support indicator, accepted DRX parameters for the TSN system, network support of interworking without N26, access stratum connection establishment NSSAI inclusion mode, network slicing subscription change indication, operator-defined access category definitions, and/or the like.

In an example, in order to set the TSN support capability parameter indication the AMF may determine to perform a UE capability match request procedure to check the compatibility of the UE and NG-RAN radio capabilities related to TSN capabilities, TSN system, and/or the like. If the AMF hasn't received TSN system support match indicator from the NG-RAN on time then, based on implementation, the AMF may set TSN capability support parameter indication and update it at a later stage.

In an example, the new AMF may perform a UE policy association establishment procedure as depicted in FIG. 26. The new AMF may send a Npcf_UEPolicyControl Create request message to the PCF. The PCF may send a Npcf_UEPolicyControl_Create Response to the (new) AMF. In an example, the PCF may trigger/invoke the UE configuration update procedure as depicted in FIG. 24.

In an example, the UE may send a registration complete message to the AMF when it has successfully updated itself after receiving any of the URSP, [configured NSSAI for the serving PLMN], [mapping of configured NSSAI] and a network slicing subscription change indication, and/or the like. The UE may send the registration complete message to the AMF to acknowledge if a new 5G-GUTI was assigned.

In an example, the UE policy association establishment procedure as depicted in FIG. 26, may comprise the following procedure. In an example, The AMF may receive the UE policy container from the UE. In an example, in response to receiving the UE Policy container received from UE, the AMF may determine/decide to establish UE policy association with the PCF. The AMF may send a Npcf_UEPolicyControl create request. The Npcf_UEPolicyControl create request may comprise the TSN support capability parameter/flag, SUPI, access type and RAT, PEI, ULI, UE time zone, serving network and UE policy container (the list of stored PSIs, operating system identifier, indication of UE support for ANDSP, and/or the like). In roaming scenario, based on operator policies, the AMF may provide to the V-PCF the PCF ID of the selected H-PCF. The V-PCF may contact the H-PCF. The PCF may send a Npcf_UEPolicyControl_Create Response to the AMF. In an example, the PCF may provides the policy control request trigger parameters in the Npcf_UEPolicyControl UpdateNotify Request to the AMF. The AMF may send a response to the PCF. The PCF may invoke/trigger the UE configuration update procedure, UCU (as depicted in example FIG. 24) to send the URSP, UE access selection and PDU session selection related policy information, and/or the like to the UE.

Figure 27:
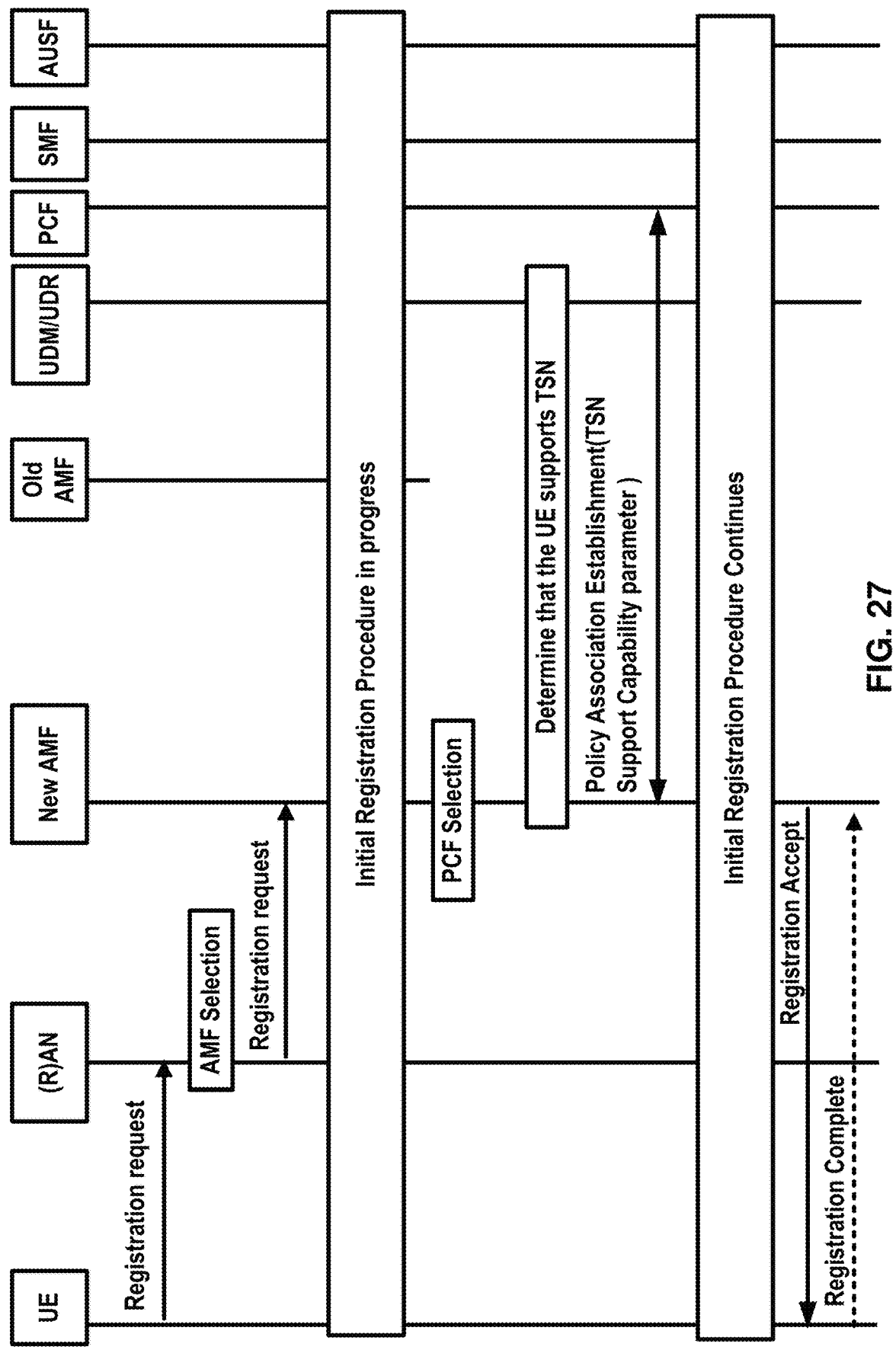
FIG. 27 is an example call flow as per an aspect of an embodiment of the disclosure.

In an example embodiment as depicted in FIG. 27, the UE may send to the RAN node a registration request message. The registration request message may comprise AN parameters, registration request (e.g., registration type, SUCI or 5G-GUTI or PEI, last visited TAI (if available), security parameters, requested NSSAI, [mapping of requested NSSAI], default configured NSSAI indication, UE radio capability update, UE MM core network capability, PDU Session status, List Of PDU sessions to be activated, follow-on request, MICO mode preference, requested DRX parameters, [LADN DNN(s) or indicator of requesting LADN information]), UE policy container (the list of PSIs, indication of UE support for ANDSP and the operating system identifier), and/or the like), and/or the like.

In an example, the (R)AN may send to the (new) AMF an N2 message. The N2 message may be a registration request message. The N2 message may comprise N2 parameters, the registration request, UE Policy Container, and/or the like. When NG-RAN is employed, the N2 parameters may comprise the selected PLMN ID, location information and cell identity related to the cell in which the UE is camping, UE context request which may indicate that a UE context including security information requires to be setup at the NG-RAN. When NG-RAN is employed, the N2 parameters may further comprise the establishment cause. In an example, when the establishment cause may be associated with priority services (e.g. MPS, MCS, TSN and/or the like), the AMF may include a message priority header to indicate priority information. Other NFs may relay the priority information by including the message priority header in service-based interfaces.

In an example, the AMF may retrieve UE capabilities, the access and mobility subscription data, SMF selection subscription data and UE context in SMF data by employing Nudm_SDM_Get operation, and/or the like. The UDM may retrieve this information from UDR by Nudr_DM_Query, and/or the like. In an example, the UDM, UDR, and/or the like may determine that the UE supports TSN bridge functionality. The UDM/UDR may send a response message to the AMF with an indication that the UE supports TSN bridge functionality, and/or the like. After a successful response is received, the AMF may subscribe to be notified using Nudm_SDM_Subscribe when the data requested is modified. The UDM may subscribe to UDR by Nudr_DM_Subscribe. The GPSI may be provided to the AMF in the access and mobility subscription data from the UDM if the GPSI is available in the UE subscription data. The UDM/UDR may provide indication that the UE capabilities, subscription data for network slicing is updated for the UE. If the UE is subscribed to TSN in the serving PLMN, TSN priority may be included in the access and mobility subscription data provided to the AMF. The (new) AMF may provide the access type it serves for the UE to the UDM and the access type may be set to 3GPP access. The UDM may store the associated access type together with the serving AMF and may retain the AMF identity associated to the other access type if any. The UDM may store in UDR information provided at the AMF registration by Nudr_DM_Update, and/or the like. The (new) AMF may create a UE context for the UE after getting the access and mobility subscription data from the UDM. the access and mobility subscription data may include whether the UE is allowed to include NSSAI in the 3GPP access RRC connection establishment.

In an example, when the AMF receives from the UDM/UDR that the UE supports TSN bridge functionality, the AMF may interact with the PCF for policy association establishment, policy association modification, and/or the like.

Figure 28:
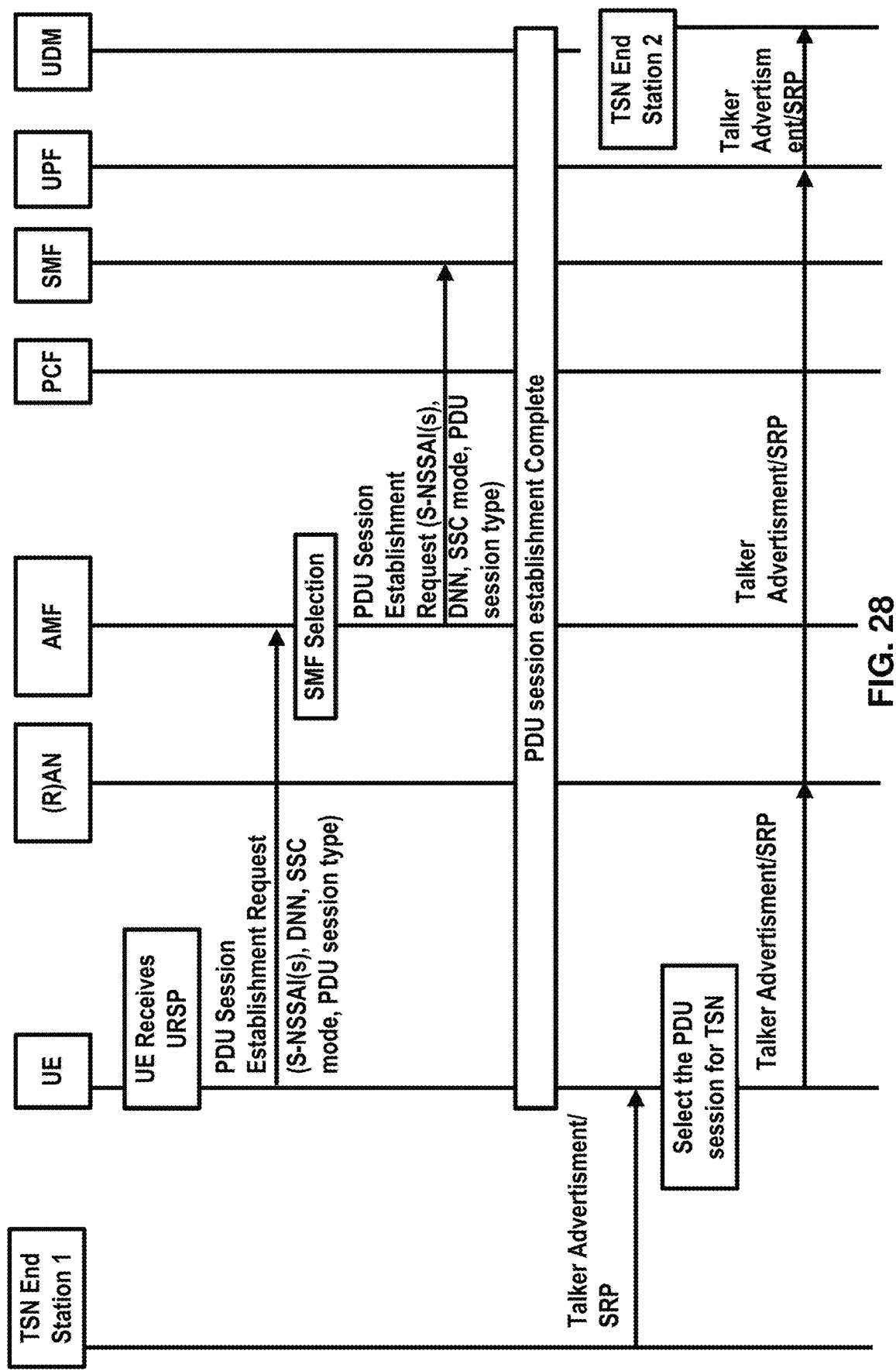
FIG. 28 is an example call flow as per an aspect of an embodiment of the disclosure.
Figure 29:
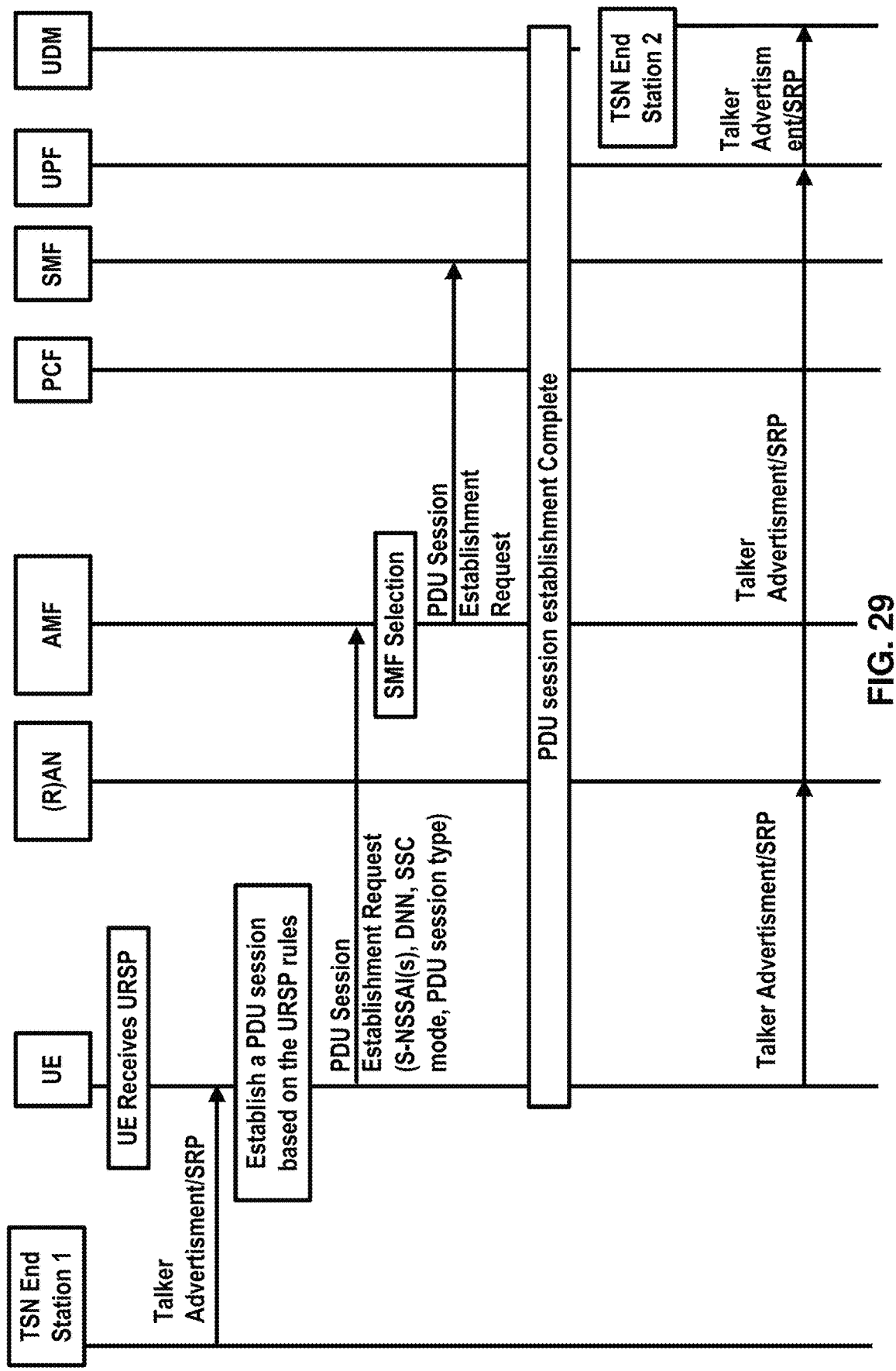
FIG. 29 is an example call flow as per an aspect of an embodiment of the disclosure.

As depicted in example FIG. 28 and FIG. 29, when the UE receives the URSP, the UE may employ the URSP to determine parameters for a selection and/or establishment of a PDU session. If the UE has one or more PDU session established, the UE may select the proper PDU session to serve the TSN request. The selection may be based on the TSN configuration parameters (received from the network, e.g., via the URSP, registration accept message, configuration update message, PCO, and/or the like). In an example, a first station (e.g., a TSN end station, end station 1, and/or the like) may send a request to the UE via a TSN adaptor/translator, and/or the like. The end station request may be a talker advertisement, a message from a bridge, a stream reservation protocol (SRP) message, an MSRP message, an IEEE 802.1Q message, a bridge PDU (BPDU) message, a spanning tree protocol message, an ethernet frame for a VLAN, and/or the like. The UE may determine that the request from the first station, may require a TSN connection capability. The UE may employ the URSP to determine a rule that is associated with a traffic descriptor connection capabilities. The traffic descriptor connection capabilities may be TSN, VLAN bridge, and/or the like. In an example, the UE may employ the URSP to determine a rule that is associated with a traffic descriptor indicating a TSN bridge identifier, TSN (virtual/physical) port identifier, TSN (virtual/physical) port priority, and/or the like. In an example, the UE may employ the URSP to determine a rule that is associated with an interface e.g., ingress interface, ingress port, a system identifier, a private network identifier (e.g., non-public network NPN), and/or the like, indicating e.g., a TSN bridge identifier, TSN (virtual/physical) port identifier, TSN (virtual/physical) port priority, a TSN system identifier, and/or the like. The URSP rule may comprise one or more rules. The one or more rules may comprise a rule precedence, traffic descriptor, and a list of route selection descriptors. The traffic descriptor may comprise application descriptors/identifiers, IP traffic descriptors, Non-IP traffic descriptors, DNN, connection capabilities, and/or the like. The URSP rule associated with the traffic descriptor may comprise a SSC mode selection, slice selection (S-NSSAI(s), network slice ID(s), and/or the like), PDU session type, non-seamless offload indication, access type preference, RAT type preference, and/or the like.

In an example as depicted in FIG. 29, the UE may receive a request from a TSN station. Based on the request from the TSN station, the UE may establish a PDU session based on the TSN configuration parameters received from the network, e.g., via the URSP, registration accept message, configuration update message, PCO, and/or the like.

Figure 31:
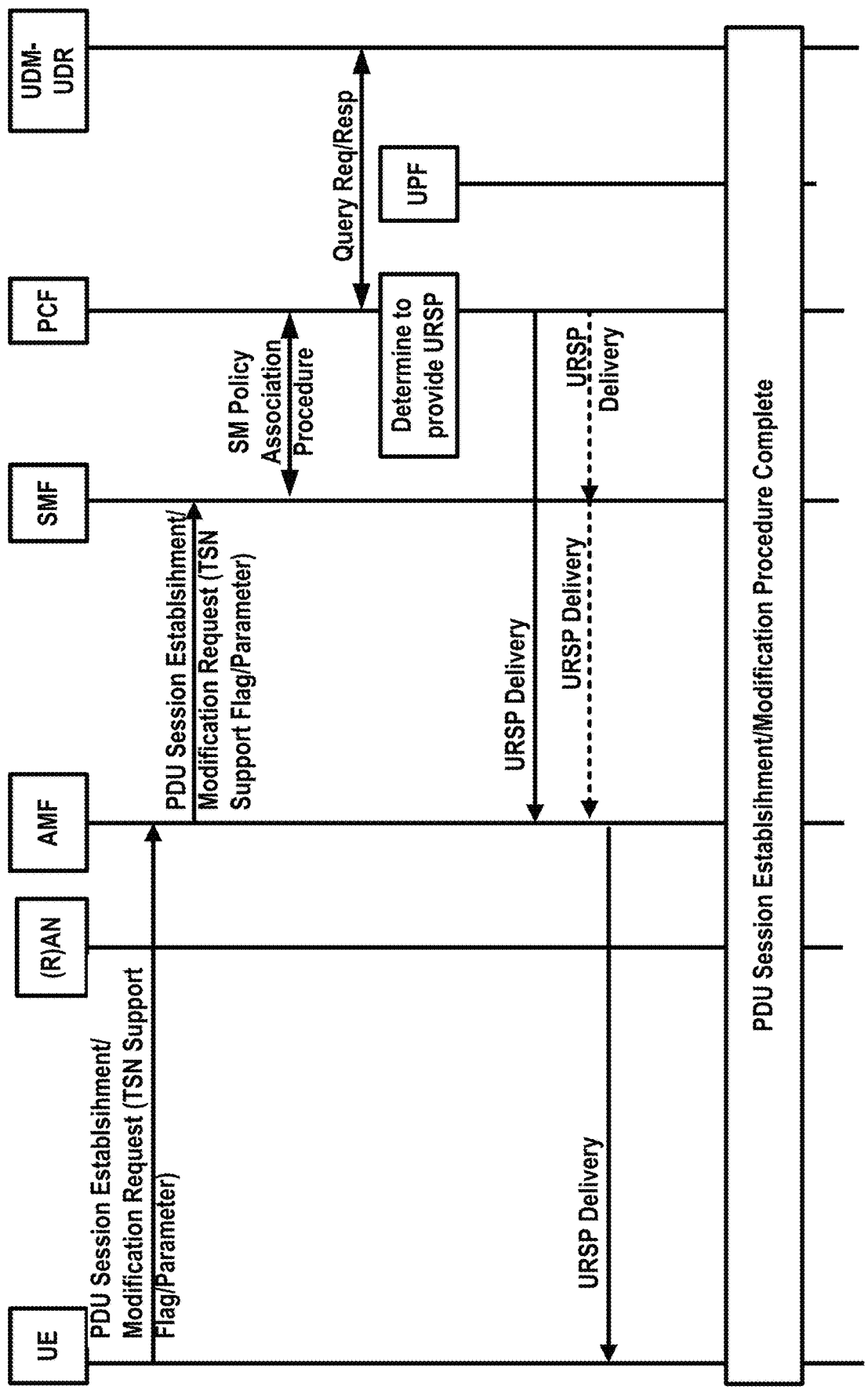
FIG. 31 is an example call flow as per an aspect of an embodiment of the disclosure.
Figure 34:
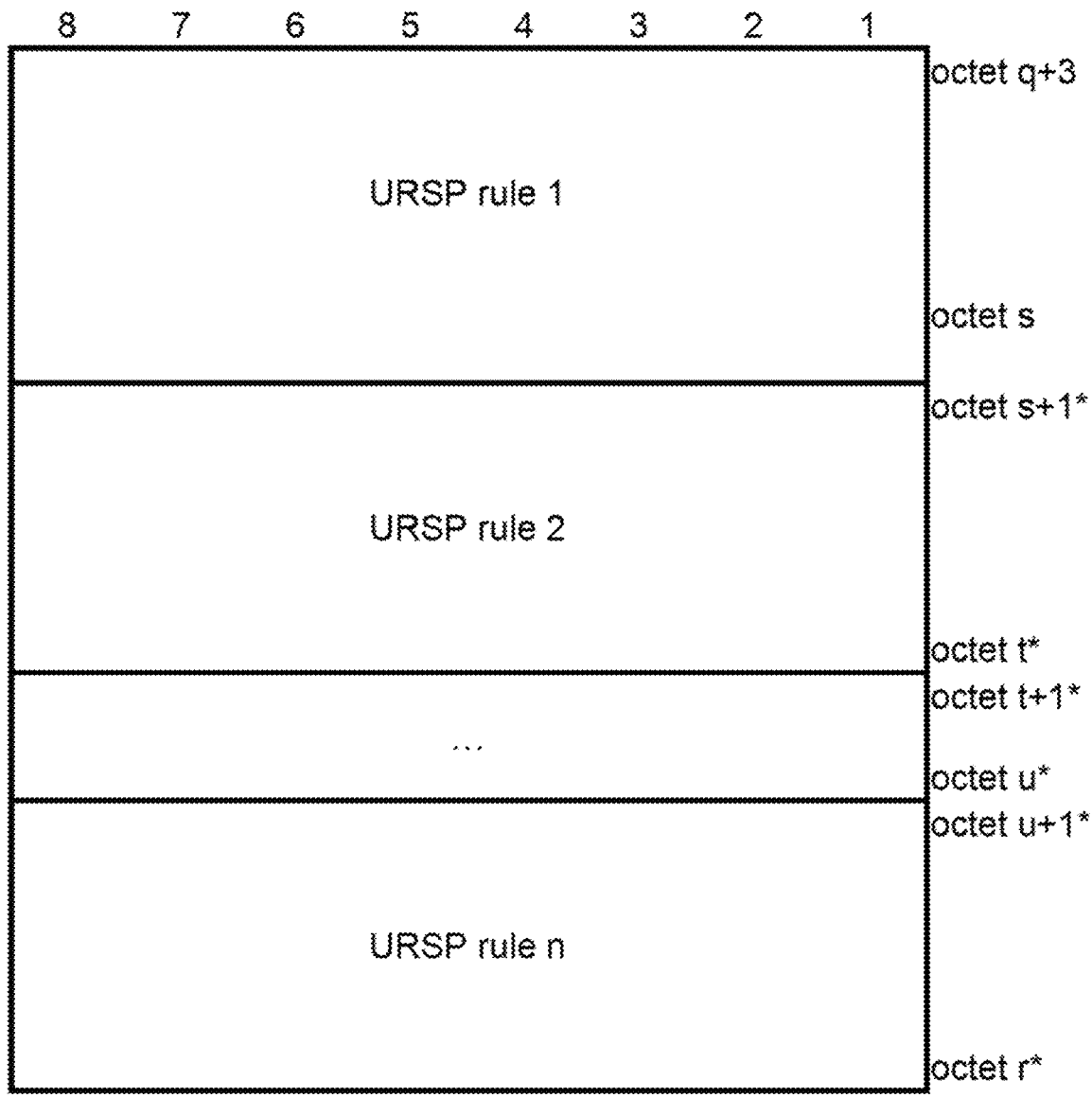
FIG. 34 is an example diagram as per an aspect of an embodiment of the disclosure.
Figure 35:
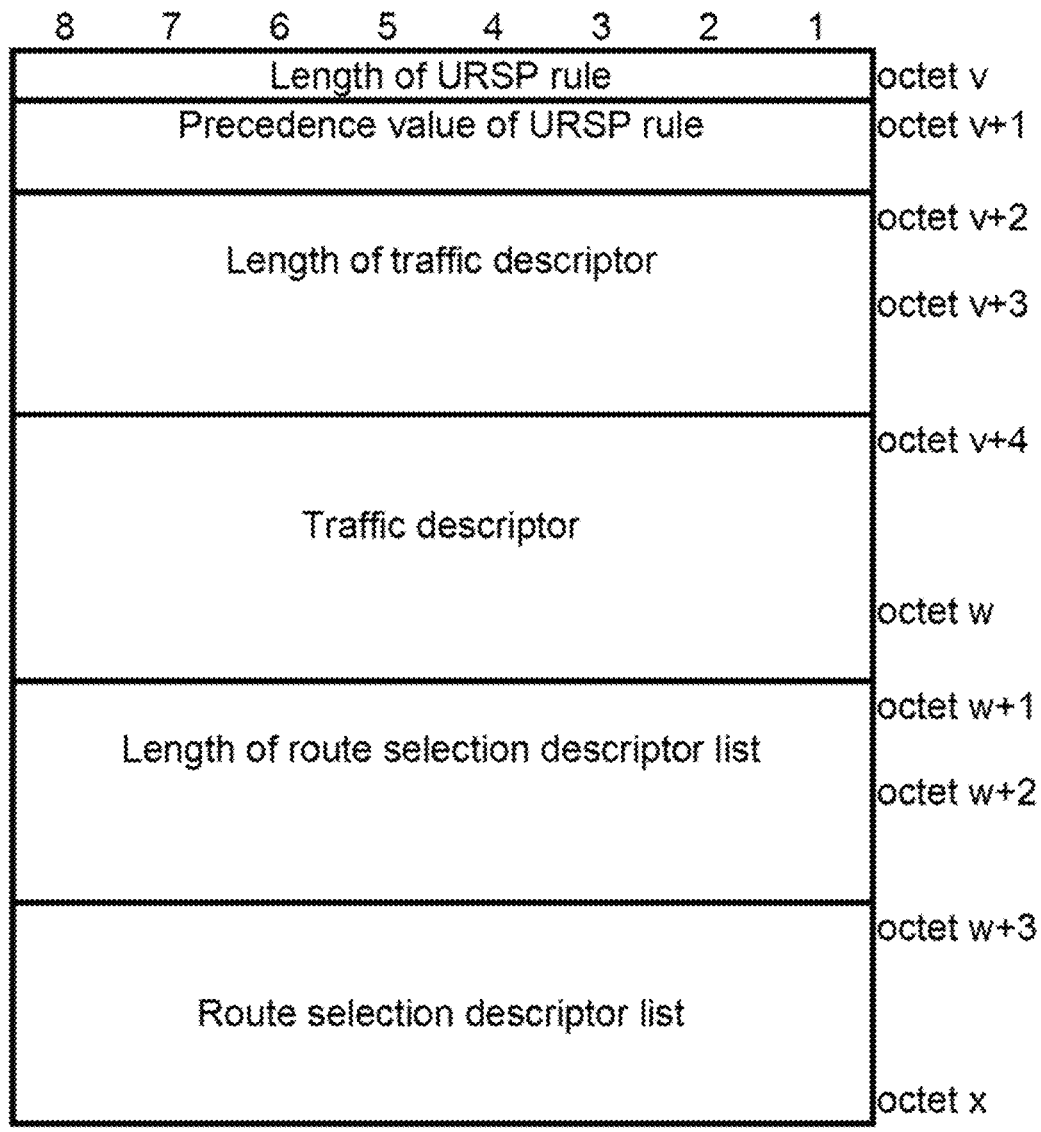
FIG. 35 is an example diagram as per an aspect of an embodiment of the disclosure.
Figure 36:
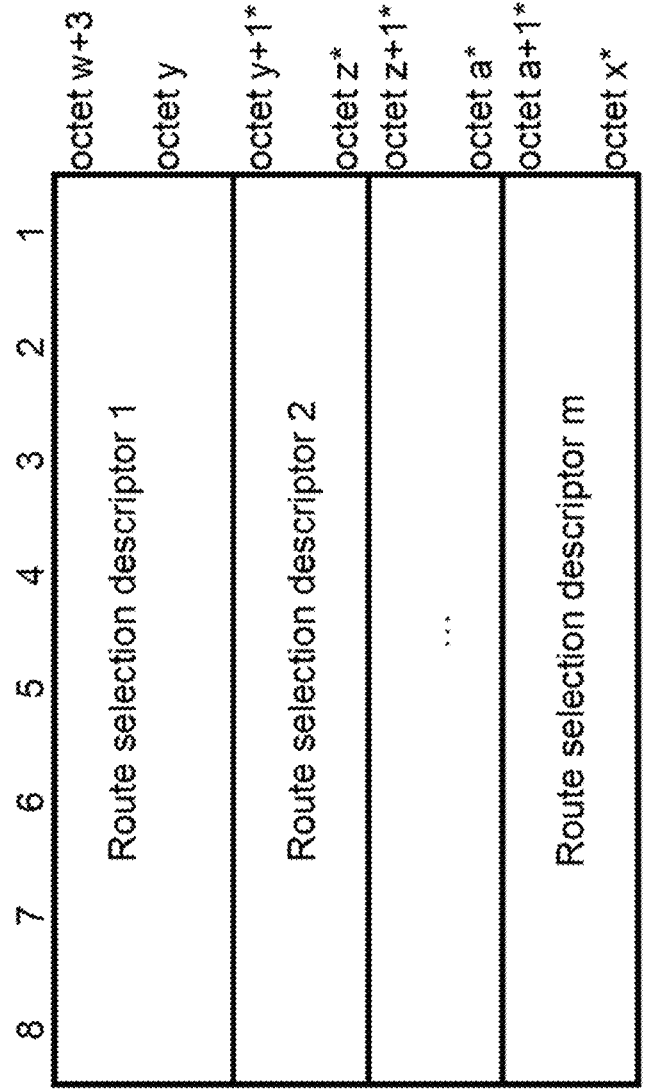
FIG. 36 is an example diagram as per an aspect of an embodiment of the disclosure.
Figure 37:
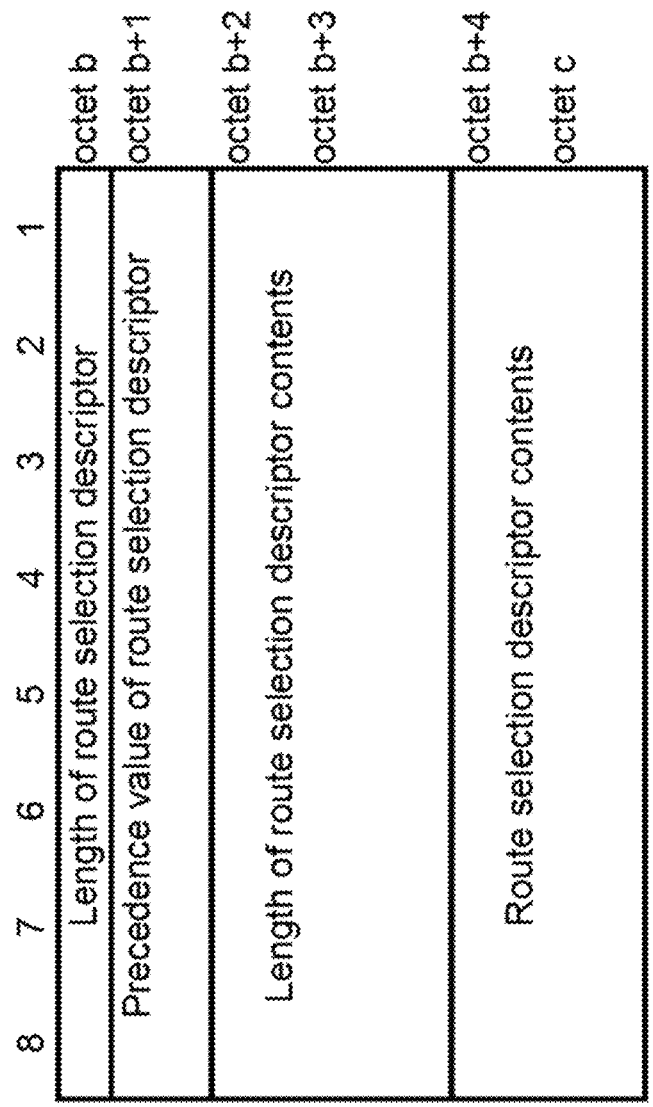
FIG. 37 is an example diagram as per an aspect of an embodiment of the disclosure.

In an example embodiment as depicted in FIG. 31, the UE may perform/invoke/initiate the PDU session establishment procedure (FIG. 12 and FIG. 13).

In an example, during the PDU session establishment procedure, the UE may send to the AMF, a NAS message. The NAS message may comprise S-NSSAI(s), DNN, PDU Session ID, Request type, Old PDU Session ID, N1 SM container (PDU Session Establishment Request), and/or the like. The NAS message may further comprise the TSN support capability parameter/flag indicating that the PDU session may be for the TSN system, for a TSN station, a TSN bridge (behind the UE), and/or the like. In order to establish a new PDU session, the UE may generate a new PDU session ID. The UE may initiates the UE requested PDU session establishment procedure by the transmission of a NAS message comprising a PDU Session establishment request within the N1 SM container. The PDU session establishment request may comprise a PDU session ID, Requested PDU Session Type, a Requested SSC mode, 5GSM Capability PCO, SM PDU DN Request Container, number of packet filters, and optionally Always-on PDU session requested. The PDU session establishment request may further comprise the TSN support capability parameter/flag, and/or the like. The S-NSSAI description may indicate that a slice for TSN system may be required. The PDU session type may indicate that the PDU session is for a TSN system, that may support IEEE 802.1Q procedures, and/or the like.

The AMF may determine that the message corresponds to a request for a new PDU session based on that request type indicates initial request and that the PDU Session ID is not used for any existing PDU Session(s) of the UE. If the NAS message does not contain an S-NSSAI, the AMF may determine a default S-NSSAI for the requested PDU session according to the UE subscription, the TSN support capability parameter, and/or the like. When the NAS message comprises an S-NSSAI but it does not contain a DNN, the AMF may determine the DNN for the requested PDU session by selecting the default DNN for this S-NSSAI if the default DNN is present in the UE's Subscription Information. The serving AMF may select a locally configured DNN for this S-NSSAI. In an example, the AMF may select the DNN based on the TSN support capability parameter/flag, and/or the like.

In an example, the AMF may select an SMF. The AMF may select the SMF based on the TSN support capability parameter/flag. In an example, if the PDU session establishment request comprises a network identifier, NPN ID (that supports TSN), and/or the like, the AMF may select the SMF based on the network ID, NPN ID.

In an example, the AMF may send to the SMF a Nsmf_PDUSession_CreateSMContext Request message comprising SUPI, DNN, S-NSSAI(s), PDU Session ID, AMF ID, Request Type, PCF ID, Priority Access, N1 SM container (PDU Session Establishment Request, User location information, Access Type, PEI, GPSI, UE presence in LADN service area, Subscription For PDU Session Status Notification, DNN Selection Mode, Trace Requirements), and/or the like. In an example, the AMF may send to the SMF a Nsmf_PDUSession_UpdateSMContext Request comprising SUPI, DNN, S-NSSAI(s), PDU Session ID, AMF ID, Request Type, N1 SM container (PDU Session Establishment Request), User location information, Access Type, RAT type, PEI, and/or the like. The Nsmf_PDUSession_CreateSMContext Request message and/or the Nsmf_PDUSession_UpdateSMContext Request message may further comprise the TSN support capability parameter/flag.

In an example, if session management subscription data for corresponding SUPI, DNN and S-NSSAI is not available, the SMF may employ the UDM and/or the UDR to retrieve the session management subscription data using Nudm_SDM_Get (SUPI, Session Management Subscription data, DNN, S-NSSAI) and may subscribe to be notified when this subscription data is modified using Nudm_SDM_Subscribe (SUPI, Session Management Subscription data, DNN, S-NSSAI). UDM may get this information from UDR by Nudr_DM_Query (SUPI, Subscription Data, Session Management Subscription data, DNN, S-NSSAI) and may subscribe to notifications from UDR for the same data by Nudr_DM_subscribe. The S-NSSAI used with the UDM maybe the S-NSSAI with value for the HPLMN, or the non-public network. The SMF may employ DNN selection mode when deciding whether to retrieve the session management subscription data e.g. in case the (DNN, S-NSSAI) is not explicitly subscribed, the SMF may use local configuration.

In an example, when the SMF does not receive the TSN support capability indicator/parameter/flag, the SMF may query UDM/UDR to determine that the UE supports TSN bridge capabilities.

In an example, the SMF may send to the AMF a Nsmf_PDUSession_CreateSMContext Response comprising a cause, SM context ID or N1 SM container (PDU Session Reject (Cause)), and/or the like, or an Nsmf_PDUSession_UpdateSMContext Response message.

In an example, the SMF may select the PCF. The SMF may perform a SM policy association establishment procedure. In an example, the SMF may perform an SMF initiated SM policy association modification procedure. The SM policy association establishment/modification procedure may be employed to establish/modify an SM policy association with the PCF and get the default PCC Rules for the PDU session. The GPSI may be included if available at SMF. If the Request Type in step 3 indicates existing PDU session, the SMF may provide information on the policy control request trigger condition(s) that have been met by an SMF initiated SM policy association modification procedure. The PCF may provide policy information to the SMF. In an example, the In an example, during the SM policy association establishment/modification procedure, the SMF may determine that the PCC authorization is required and may request to establish an SM policy association with the PCF by invoking Npcf_SMPolicyControl_Create operation, Npcf_SMPolicyControl_Update request operation and/or the like. The SMF may include the following information: the TSN support capability parameter/flag, SUPI, PDU Session id, PDU Session Type, S-NSSAI, NSI ID (if available), DNN, GPSI (if available), access type, AMF instance identifier and if available, the IPv4 address and/or IPv6 network prefix, PEI, User Location Information, UE Time Zone, Serving Network, RAT type, charging characteristics, session AMBR, default QoS information, trace requirements, internal group identifier, and/or the like. The SMF may provide trace requirements to the PCF when it has received trace requirements and it has selected a different PCF than the one received from the AMF. If the PCF does not have the subscriber's subscription related information, it may send a request to the UDR by invoking Nudr_DM_Query (SUPI, DNN, S-NSSAI, policy data, PDU session policy control data, accumulated usage data) service in order to receive the information related to the PDU Session. The PCF may request notifications from the UDR on changes in the subscription information by invoking Nudr_DM_Subscribe (Policy Data, SUPI, DNN, S-NSSAI, Notification Target Address (Notification Correlation Id), Event Reporting Information (continuous reporting), PDU Session policy control data, Accumulated Usage data) service. In an example, the UDR may indicate to the PCF that the UE supports TSN capability, TSN bridge capability, IEEE 802.1Q, and/or the like. The PCF may make the authorization and the policy decision. The PCF may respond to the SMF with a Npcf_SMPolicyControl_Create/update response message, and/or the like. The response may comprise policy information. The policy information may be the URSP. The SMF may send the URSP to the UE via the AMF. The SMF may enforce/apply the decision. The SMF may subscribe to the PCF to changes in the policy decisions. In an example, when the PCF determines that the UE supports TSN capacities, the PCF may invoke the UE configuration update procedure and deliver the URSP to the UE via the AMF.

In an example, when the UE indicates to the network that it supports TSN bridge functionality, the network may initiate a configuration update on the UE. The configuration update may comprise change of network slice(s) e.g., S-NSSAI(s), updating the allowed S-NSSAI(s) of the UE, change of DNN, and/or the like. The configuration update may comprise a network triggered session, PDU session modification, service request procedure, and/or the like. The configurations may be updated via a protocol configuration update (PCO). The PCO may be included in PDU session modification messages. In an example, the PCO may be a session management information element, and/or the like.

In an example, the PCO may employed to transfer external network protocol options associated with a PDU session context, a PDP context activation, and/or the like. The PCO may employed to transfer additional (protocol) data (e.g. configuration parameters, error codes or messages/events, and/or the like) associated with an external protocol or an application.

The UE may send a PCO to the AMF requesting TSN configuration information. The AMF may send the request to the SMF. The SMF may send a request to the PCF to determine the TSN system configuration parameters e.g., S-NSSAI, DNN, and/or the like. The AMF may send a request to the PCF to determine the TSN system configuration parameters e.g., S-NSSAI, DNN, and/or the like. The AMF may send the PCO to the UE. The PCO may be part of a session management procedure, e.g., SM-NAS, NAS, NAS-SM, and/or the like. The session management procedure may comprise a PDU session modification request, and/or the like that may be send by the SMF to the UE via the AMF. The PCO that is received by the UE may comprise configuration options for the TSN system, e.g., a list of one or more S-NSSAIs, one or more DNN(s), PDU session type, access type, RAT type, and/or the like.

In an example, in response to sending the TSN support indication by the UE, the network may trigger change of network slice (S-NSSAI(s)), change of DNN, and/or the like for the UE. The UE may invoke a PDU session modification procedure, a session management procedure, and/or the like. The network initiated PDU session modification may be performed when the PCF performs a PCF initiated SM policy association modification procedure to notify SMF about the modification of policies. This may have been triggered by a policy decision or upon TSN AF requests, e.g. application function influence on traffic routing, and/or the like. In an example, the SMF initiated request for modification may be performed when the UDM updates the subscription data of SMF by Nudm_SDM_Notification (SUPI, session management subscription data). The SMF may update the session management subscription data and may acknowledge the UDM by returning an Acknowledgment message comprising the SUPI, and/or the like.

In an example, for the SMF requested PDU session modification, the SMF may invokes Namf_Communication_N1N2MessageTransfer (e.g., comprising N2 SM information (PDU Session ID, QFI(s), QoS Profile(s), Session-AMBR), N1 SM container (PDU session modification command (PDU Session ID, QoS rule(s), QoS Flow level QoS parameters if needed for the QoS Flow(s) associated with the QoS rule(s), QoS rule operation and QoS Flow level QoS parameters operation, Session-AMBR)), and/or the like). If the UE is in CM-IDLE state and an ATC is activated, the AMF may update and store the UE context based on the Namf_Communication_N1N2MessageTransfer. When the UE is reachable e.g., when the UE enters CM-CONNECTED state, the AMF forwards the N1 message to synchronize the UE context with the UE. The AMF may send N2 PDU session request (N2 SM information received from SMF, NAS message (PDU Session ID, N1 SM container (PDU session modification command))) message to the (R)AN. The (R)AN may issue AN specific signaling exchange with the UE that is related with the information received from SMF. For example, in case of a NG-RAN, an RRC connection reconfiguration may take place with the UE modifying the (R)AN resources related to the PDU Session. In an example, the PDU session modification command may comprise an indication to change network slice(s), S-NSSAI(s), DNN, and/or the like. The S-NSSAI(s), DNN, and/or the like may be associated to the TSN system, TSN bridge function, and/or the like.

Figure 30:
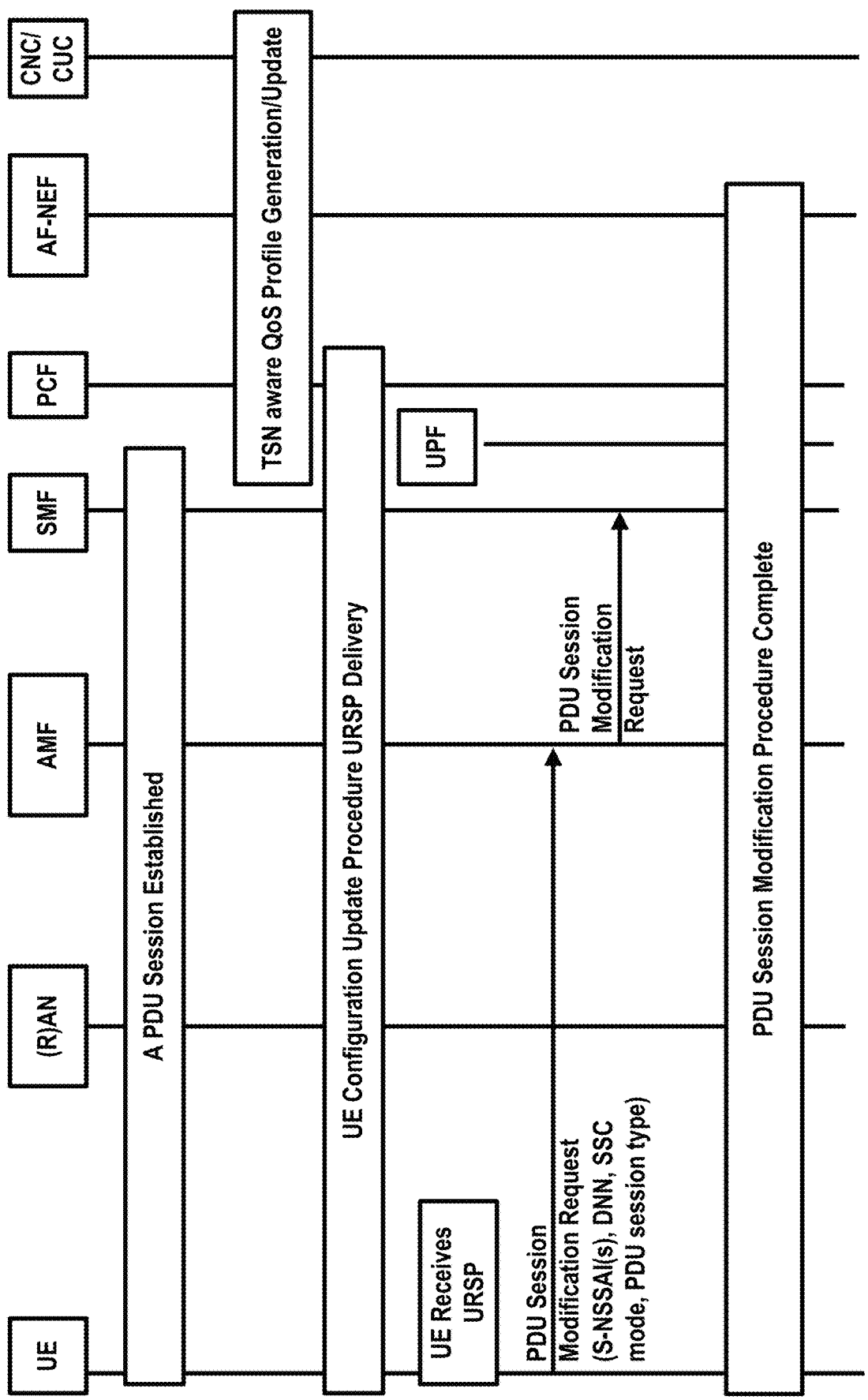
FIG. 30 is an example call flow as per an aspect of an embodiment of the disclosure.

As depicted in an example FIG. 30, the wireless device may have one or more PDU sessions established. The one or more PDU sessions may be for the TSN system e.g., configured for the TSN system. In an example, a CNC/CUC may request the TSN AF for a profile generation or update. The profile generation/update may comprise modification of 3GPP system configurations, QoS update, resource allocation/reservation, and/or the like. The TSN AF may interact with the PCF via an NEF. The TSN AF may request the PCF to generate a TSN configuration, a TSN QoS profile, and/or the like. The PCF may accept the request. The PCF may send a request to the SMF for delivery of the updated policy, the TSN system configuration for the 3GPP system, URSP, and/or the like. The SMF may send a message to the AMF to request transfer of policies and configurations to the UE (the wireless device).

In an example, the PCF may send a policy delivery request message, and/or the like to the AMF to request delivery of the policies and configurations to the UE. The SMF may update the configuration of the UPF by employing N4 session level or node level procedures.

In an example, when the SMF receives the policies and configurations from the PCF, the SMF may invoke/initiate a PDU session modification procedure. The SMF may employ a invokes Namf_Communication_N1N2MessageTransfer message, and/or the like. The Namf_Communication_

N1N2MessageTransfer message may comprise a PCO IE. The PCO may comprise the TSN configuration information.

In an example, FIG. 41 depicts example rules in a URSP. In an example, a URSP rule may apply to a traffic descriptor application identifier and connection capabilities indicating TSN. The rule may indicate that upon establishment or modification of a PDU session that may be employed for the TSN system, S-NSSAI-a, DNN_1 and access type non-3GPP may be included in the establishment/modification request. In an example, a rule may be applied to any application identifier, and for connection capabilities=TSN. The rule may indicate that upon establishment/modification/configuration of a PDU session or a communication network system serving the TSN system, S-NSSAI-b may be selected for slice, access type of 3GPP may be employed, and/or the like.

In an example embodiment, a wireless device (a UE, an ethernet bridge/switch device, and/or the like) may send to an access and mobility management function, a registration request message. The registration request message may comprise a TSN bridge capability support parameter that may indicate that the wireless device may support a TSN bridge functionality. In an example, the wireless device, may receive from a policy control function via the access and mobility management function based on the TSN bridge capability support parameter, a configuration update message. The configuration update message may comprise at least one route configuration rule. The wireless device may determine based on the TSN request message and the at least one route configuration rule, one or more configuration parameters for establishing a packet data unit (PDU) session. The wireless device may send to the access and mobility management function, a request to establish the PDU session. The request may comprise the one or more configuration parameters, and/or the like.

In an example embodiment, the TSN bridge capability support parameter may comprise number of ports on the wireless device, a parameter indicating that the wireless device supports spanning tree protocol, a parameter indicating that the wireless device supports TSN bridge functions, and/or the like.

In an example embodiment, the wireless device may receive from a first station (e.g., a TSN bridge, VLAN switch, a TSN end station, and/or the like), a TSN request message. The TSN request message may require establishing a packet data unit (PDU) session for the TSN system.

In an example, the determining by the wireless device may be based on the TSN request message that requires establishing a packet data unit (PDU) session. In an example, the TSN request may be a stream reservation protocol message. In an example, the TSN request may be received from a TSN bridge. In an example, the TSN request may be received from a TSN station (TSN end station). In an example, the determining of the one or more configuration parameters may be further based on the TSN request message.

In an example, the at least one route configuration rule may be a user equipment route selection policy (URSP). The at least one route configuration rule may comprise a traffic descriptor of the TSN system. The traffic descriptor of the TSN system may comprise an identifier of a TSN bridge, an identifier of a traffic descriptor of the TSN system, a priority value of the traffic descriptor of the TSN system, and/or the like. The at least one route configuration rule may comprise a TSN connection capability. In an example, the configuration update message may comprise a protocol configuration option (PCO) information element. The configuration update message may be a registration accept message.

In an example, the one or more configuration parameters may comprise at least one of a single network slice selection assistance information (S-NSSAI) associated with the TSN system, a data network name (DNN) associated with the TSN system, a PDU session type associated with the TSN system, an access type associated with the TSN system, a radio access technology (RAT) type associated with the TSN system, and/or the like.

In an example, the configuration update message may be a registration accept message.

In an example, the registration request message may further comprise an identifier of the wireless device, a subscription concealed identifier (SUCI), one or more security parameters, one or more single network slice selection assistance information (S-NSSAI), one or more discontinuous reception (DRX) parameters, and/or the like.

In an example, the wireless device may receive from the AMF a registration accept message. The registration accept message may comprise a network slicing subscription change indication, a single network slice selection assistance information (S-NSSAI) associated with the TSN system, one or more discontinuous reception (DRX) parameters for the wireless device that supports the TSN bridge functionality, a local area data network (LADN) Information for the TSN system, an accepted MICO mode preference for the TSN system, a data network name (DNN) associated with the TSN system, a PDU session type preference associated with the TSN system, an access type associated with the TSN system, a radio access technology (RAT) type associated with the TSN system, and/or the like.

In an example, a base station may select the AMF based on the TSN bridge capability support parameter. The AMF may select a session management function (SMF) based on the TSN bridge capability support parameter.

In an example embodiment, a wireless device may send to an access and mobility management function, a registration request message comprising a TSN bridge capability support parameter that indicates that the wireless device may support a TSN bridge functionality. The wireless device may receive from a policy control function via the access and mobility management function based on the TSN bridge capability support parameter, a configuration update message. The configuration update message may comprise at least one route configuration rule, and/or the like. The wireless device may determine based on the configuration update message and the at least one route configuration rule, one or more configuration parameters associated with a traffic descriptor for the TSN system, for modifying a packet data unit (PDU) session. The wireless device may send to the access and mobility management function, a request to modify the PDU session. The request may comprise the one or more configuration parameters.

In an example, the TSN bridge capability support parameter may comprise number of ports on the wireless device, a parameter indicating that the wireless device supports spanning tree protocol, a parameter indicating that the wireless device supports TSN bridge functions, a hardware capability of the UE to provide physical/virtual ports that support VLAN, IEEE 802.1Q, MAC address learning, and/or the like. In an example, the one or more configuration parameters may comprise a user equipment route selection policy (URSP). The URSP may comprise the traffic descriptor of the TSN system. The traffic descriptor for the TSN system may comprise one or more of a connection capabilities type indicator, an identifier of the TSN bridge, an identifier of a port, and/or the like. The connection capabilities type may be TSN connection capability indicator (e.g., traffic descriptor ☐ connection capabilities=TSN, and/or the like).

In an example, the one or more configuration parameters may comprise at least one of a single network slice selection assistance information (S-NSSAI) for the TSN system, a data network name (DNN) for the TSN system, a PDU session type for the TSN system, an access type for the TSN system, a radio access technology (RAT) type for the TSN system, and/or the like.

In an example, the configuration update message may comprise a protocol configuration option (PCO) information element. The configuration update message may be a registration accept message. In an example, the determining to modify the PDU session may be in response to receiving the configuration update message. The determining to modify the PDU session may be in response to receiving a TSN request message. The TSN request message may be a stream reservation protocol message. The TSN request message may be received from a TSN bridge. The TSN request message may be received from a TSN station (TSN end station).

In an example, the registration request message may further comprise an identifier of the wireless device, a subscription concealed identifier (SUCI), one or more security parameters, one or more single network slice selection assistance information (S-NSSAI), one or more discontinuous reception (DRX) parameters, and/or the like. The wireless device may receive from the AMF a registration accept message. The registration accept message may comprise a network slicing subscription change indication, a single network slice selection assistance information (S-NSSAI) associated with the TSN system, one or more discontinuous reception (DRX) parameters for the wireless device that supports the TSN bridge functionality, a local area data network (LADN) Information for the TSN system, an accepted MICO mode preference for the TSN system, a data network name (DNN) associated with the TSN system, a PDU session type preference associated with the TSN system, an access type associated with the TSN system, a radio access technology (RAT) type associated with the TSN system, and/or the like.

In an example, a base station may select the AMF based on the TSN bridge capability support parameter. The AMF may select a session management function (SMF) based on the TSN bridge capability support parameter.

In an example embodiment, an access and mobility management function (AMF) may receive from a wireless device, a registration request message for a network that supports time sensitive network (TSN). The AMF may determine that the wireless device may support TSN bridge capability. The AMF may send to a policy control function (PCF), a policy association request message comprising a TSN bridge capability support parameter. The AMF may receive from the PCF, a route selection policy. The route selection policy may comprise one or more configuration parameters of the wireless device that may correspond to a traffic descriptor for a TSN system. The AMF may send to the wireless device, the route selection policy. The AMF may send to the wireless device, a registration accept message. The AMF may receive from the wireless device, a packet data unit (PDU) session establishment/modification request message. The PDU session establishment/modification request message may comprise the one or more configuration parameters, and/or the like.

In an example, the AMF may send to a UDM/UDR a query request for determining one or more capabilities of the wireless device. The AMF may receive from the UDM/UDR, a query response message indicating that the wireless device supports TSN bridge capability.

In an example, the registration request message may further comprise the TSN bridge capability support parameter. The determining may be based on the registration request message.

In an example embodiment, a policy control function (PCF) may receive from an application function of a time sensitive network (TSN) system, a request to generate a profile for the TSN system. The PCF may determine based on the request, a route selection policy comprising one or more configuration parameters for the TSN system. The PCF may send to a wireless device the route selection policy that corresponds to a traffic descriptor for the TSN system.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 47:
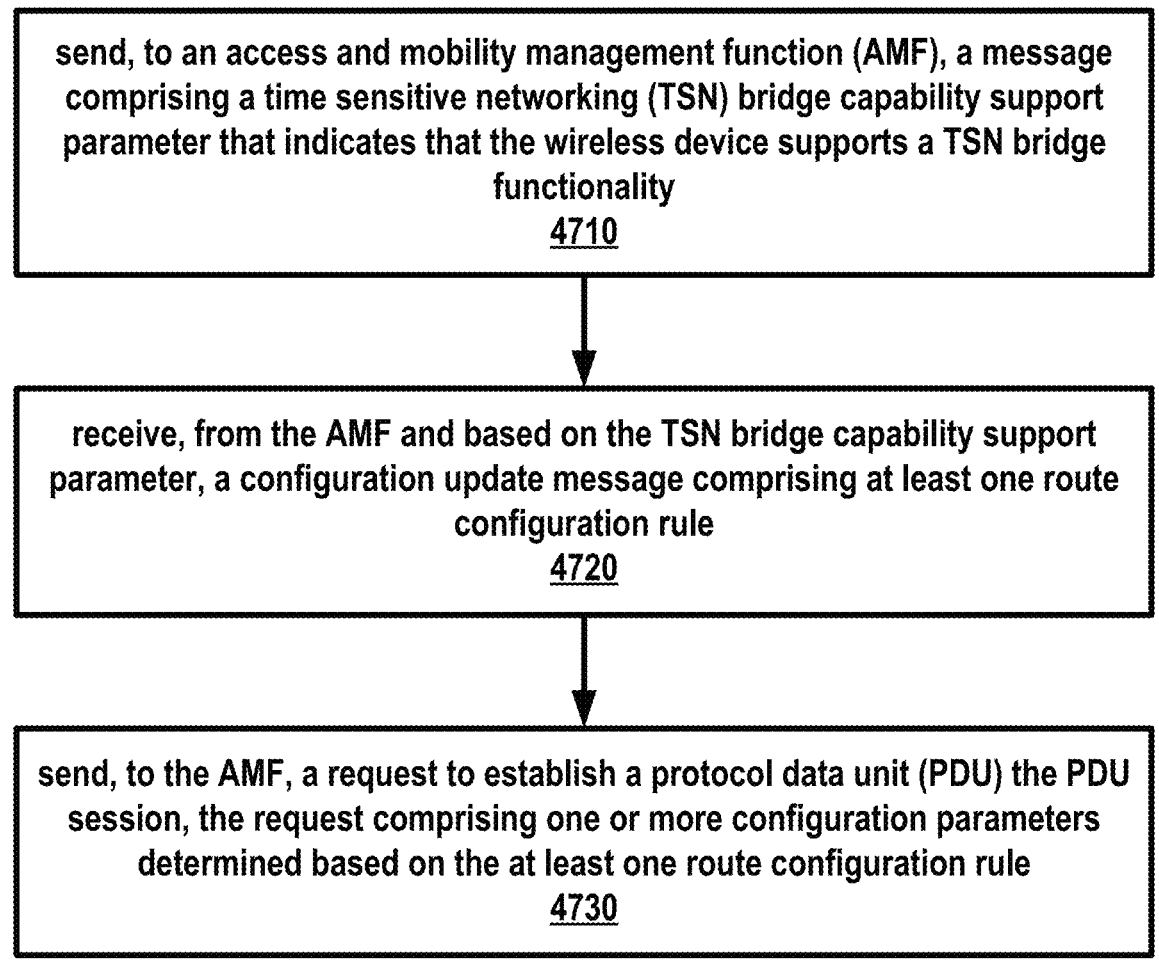
FIG. 47 is a flow diagram as per an aspect of an example embodiment of the present disclosure.

FIG. 47 is a flow diagram as per an aspect of an example embodiment of the present disclosure. At 4710, a wireless device sends to an access and mobility management function (AMF), a message comprising a TSN bridge capability support parameter that indicates that the wireless device supports a TSN bridge functionality. At 4720, the wireless device receives from the AMF and based on the TSN bridge capability support parameter, a configuration update message comprising at least one route configuration rule. At 4730, the wireless device sends to the AMF, a request to establish the PDU session, the request comprising one or more configuration parameters determined based on the at least one route configuration rule.

Figure 48:
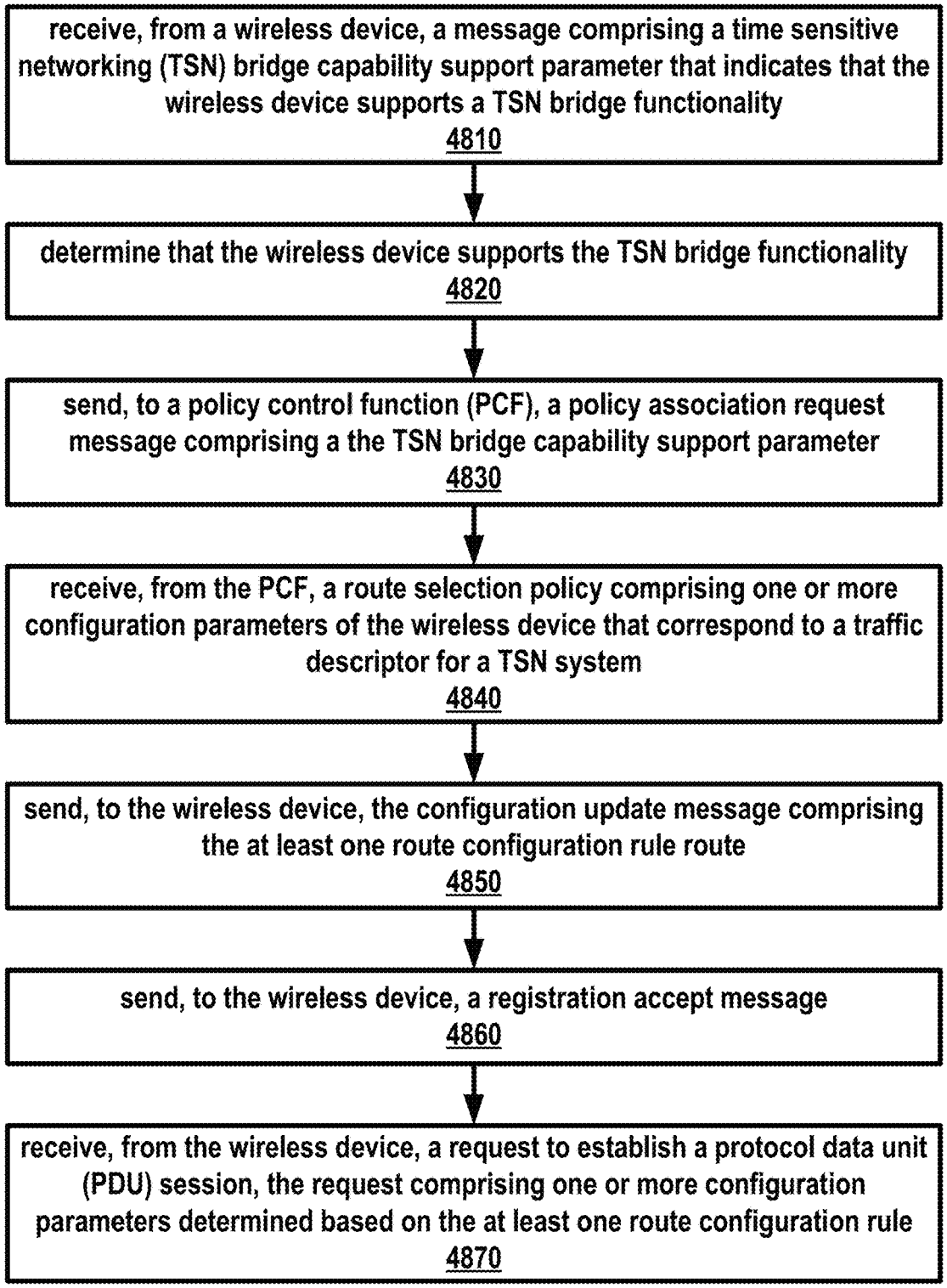
FIG. 48 is a flow diagram as per an aspect of an example embodiment of the present disclosure.

FIG. 48 is a flow diagram as per an aspect of an example embodiment of the present disclosure. At 4810, an AMF receives from a wireless device, a message comprising a time sensitive networking (TSN) bridge capability support parameter that indicates that the wireless device supports a TSN bridge functionality. At 4820, the AMF determines that the wireless device supports the TSN bridge functionality. At 4830, the AMF sends to a policy control function (PCF), a policy association request message comprising a the TSN bridge capability support parameter. At 4840, the AMF receives from the PCF, a route selection policy comprising one or more configuration parameters of the wireless device that correspond to a traffic descriptor for a TSN system. At 4850, the AMF sends to the wireless device, the configuration update message comprising the at least one route configuration rule route. At 4860, the AMF sends to the wireless device a registration accept message. At 4870, the AMF receives from the wireless device, a request to establish a protocol data unit (PDU) session, the request comprising one or more configuration parameters determined based on the at least one route configuration rule.

In an example embodiment, the TSN bridge capability support parameter may comprise a number of ports on the wireless device, a parameter indicating that the wireless device supports spanning tree protocol, a parameter indicating that the wireless device supports TSN bridge functions. The wireless device may receive from a first station (e.g., TSN end station), a TSN request message that requires establishing a packet data unit (PDU) session, wherein the determining the one or more configuration parameters may be further based on the TSN request message. The TSN request may be a stream reservation protocol message. The TSN request may be received from a TSN bridge. The at least one route configuration rule may be a user equipment route selection policy (URSP). The URSP may comprise a traffic descriptor of the TSN system comprising: an identifier of a TSN bridge, an identifier of a traffic descriptor of the TSN system, a priority value of the traffic descriptor of the TSN system. The URSP may comprise a TSN connection capability. The configuration update message may comprise a protocol configuration option (PCO) information element. The configuration update message may be a registration accept message. The one or more configuration parameters may comprise at least one of: a single network slice selection assistance information (S-NSSAI) associated with the TSN system, a data network name (DNN) associated with the TSN system, a PDU session type associated with the TSN system, an access type associated with the TSN system, a radio access technology (RAT) type associated with the TSN system, and/or the like.

In an example embodiment, a wireless device may comprise one or more processors, memory storing instructions that, when executed by the one or more processors, cause the wireless device to send, to an access and mobility management function (AMF), a message comprising a time sensitive networking (TSN) bridge capability support parameter that indicates that the wireless device supports a TSN bridge functionality, receive, from the AMF and based on the TSN bridge capability support parameter, a configuration update message comprising at least one route configuration rule, and send, to the AMF, a request to establish the PDU session. The request may comprise one or more configuration parameters determined based on the at least one route configuration rule. The TSN bridge capability support parameter may comprise a number of ports on the wireless device, a parameter indicating that the wireless device supports spanning tree protocol, a parameter indicating that the wireless device supports TSN bridge functions, and/or the like. The instructions may further cause the wireless device to receive, from a first station, a TSN request message that requires establishing a packet data unit (PDU) session, wherein the determining the one or more configuration parameters is further based on the TSN request message. The TSN request may be a stream reservation protocol message. The TSN request may be received from a TSN bridge. The at least one route configuration rule is a user equipment route selection policy (URSP), wherein the URSP may comprise a traffic descriptor of the TSN system comprising: an identifier of a TSN bridge, an identifier of a traffic descriptor of the TSN system, and/or a priority value of the traffic descriptor of the TSN system. The URSP may comprise a TSN connection capability. The configuration update message may comprise a protocol configuration option (PCO) information element. The configuration update message may be a registration accept message. The one or more configuration parameters may comprise at least one of: a single network slice selection assistance information (S-NSSAI) associated with the TSN system, a data network name (DNN) associated with the TSN system, a PDU session type associated with the TSN system, an access type associated with the TSN system and/or a radio access technology (RAT) type associated with the TSN system.

In an example, a system may comprise a wireless device that may comprise one or more first processors, first memory storing first instructions that, when executed by the one or more first processors, cause the wireless device to send a message comprising a time sensitive networking (TSN) bridge capability support parameter that indicates that the wireless device supports a TSN bridge functionality, receive, from the AMF and based on the TSN bridge capability support parameter, a configuration update message comprising at least one route configuration rule, and send, to the AMF, a request to establish the PDU session, the request comprising one or more configuration parameters determined based on the at least one route configuration rule. The system may comprise an access and mobility management function (AMF) comprising: one or more second processors, second memory storing second instructions that, when executed by the one or more second processors, cause the AMF to receive, from the wireless device, the message, determine that the wireless device supports the TSN bridge functionality, send, to a policy control function (PCF), a policy association request message comprising the TSN bridge capability support parameter, receive, from the PCF, a route selection policy comprising one or more configuration parameters of the wireless device that correspond to a traffic descriptor for a TSN system, send to the wireless device, the configuration update message comprising the at least one route configuration rule, send to the wireless device, a registration accept message, and receive, from the wireless device, the request to establish the PDU session. The at least one route configuration rule may be a user equipment route selection policy (URSP). The URSP may comprise: a traffic descriptor of the TSN system comprising: an identifier of a TSN bridge, an identifier of a traffic descriptor of the TSN system, a priority value of the traffic descriptor of the TSN system. The URSP may comprise a TSN connection capability.

In an example embodiment, an access and mobility management function (AMF) may receive from a wireless device, a registration request message for a network that supports time sensitive network (TSN). The AMF may determine that wireless device supports TSN bridge capability. The AMF may send to a policy control function (PCF), a policy association request message comprising a TSN bridge capability support parameter. The AMF may receive from the PCF, a route selection policy comprising one or more configuration parameters of the wireless device that corresponds to a traffic descriptor for a TSN system. The AMF may send to the wireless device, the route selection policy. The AMF may send to the wireless device, a registration accept message. The registration accept message may comprise the route selection policy. The AMF may receive from the wireless device, a packet data unit (PDU) session establishment/modification request comprising the one or more configuration parameters. In an example, the AMF may send to a UDM/UDR a query request for determining one or more capabilities of the wireless device. The AMF may receive from the UDM/UDR, a query response message indicating that the wireless device supports TSN bridge capability. The registration request message may further comprise the TSN bridge capability support parameter. The determining may be based on the registration request message.

In an example embodiment, a policy control function (PCF) may receive from an application function of a time sensitive network (TSN) system, a request to generate a profile for the TSN system. The PCF may determine based on the request, a route selection policy comprising one or more configuration parameters for the TSN system. The PCF may send to a wireless device the route selection policy that corresponds to a traffic descriptor for the TSN system.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   receiving, by a session management function (SMF) from a wireless device, a time sensitive networking (TSN) bridge parameter comprising port information of a TSN bridge;
   sending, by the SMF to a policy and charging control function (PCF), a request for policy information, the request comprising the TSN bridge parameter; and
   receiving, by the SMF from the PCF, a response to the request, the response comprising policy information for the wireless device.

2. The method of claim 1, wherein the policy information comprises one or more user equipment route selection policy (URSP) rules.

3. The method of claim 2, wherein the one or more URSP rules are for the TSN bridge.

4. The method of claim 3, wherein the one or more URSP rules comprise:
   a traffic descriptor of a TSN system comprising:
      an identifier of a TSN bridge;
      an identifier of a traffic descriptor of the TSN system; and
      a priority value of the traffic descriptor of the TSN system; and
   a TSN connection capability.

5. The method of claim 1, further comprising sending, by the SMF to the wireless device, the policy information for the wireless device in a configuration update message.

6. The method of claim 5, wherein the configuration update message comprises a protocol configuration option (PCO) information element.

7. The method of claim 5, wherein the configuration update message is a registration accept message.

8. The method of claim 1, wherein the TSN bridge parameter further comprises one or more of:
a number of ports on the wireless device;
a parameter indicating that the wireless device supports spanning tree protocol; and
a parameter indicating that the wireless device supports TSN bridge functions.

9. The method of claim 1, wherein the PCF makes policy decisions based on the TSN bridge parameter, the method further comprising subscribing, by the SMF, to changes in the policy decisions from the PCF.

10. A session management function (SMF) comprising:
one or more processors; and
memory storing instructions that, when executed by the one or more processors, cause the SMF to perform operations comprising:
receiving, from a wireless device, a time sensitive networking (TSN) bridge parameter comprising port information of a TSN bridge;
sending, to a policy and charging control function (PCF), a request for policy information, the request comprising the TSN bridge parameter; and
receiving, from the PCF, a response to the request, the response comprising policy information for the wireless device.

11. The SMF of claim 10, wherein the policy information comprises one or more user equipment route selection policy (URSP) rules.

12. The SMF of claim 11, wherein the one or more URSP rules are for the TSN bridge.

13. The SMF of claim 12, wherein the one or more URSP rules comprise:
a traffic descriptor of a TSN system comprising:
an identifier of a TSN bridge;
an identifier of a traffic descriptor of the TSN system; and
a priority value of the traffic descriptor of the TSN system; and
a TSN connection capability.

14. The SMF of claim 10, wherein the operations further comprise sending, to the wireless device, the policy information for the wireless device in a configuration update message.

15. The SMF of claim 14, wherein the configuration update message comprises a protocol configuration option (PCO) information element.

16. The SMF of claim 14, wherein the configuration update message is a registration accept message.

17. The SMF of claim 10, wherein the TSN bridge parameter further comprises one or more of:
a number of ports on the wireless device;
a parameter indicating that the wireless device supports spanning tree protocol; and
a parameter indicating that the wireless device supports TSN bridge functions.

18. The SMF of claim 10, wherein the PCF makes policy decisions based on the TSN bridge parameter, and wherein the operations further comprise subscribing to changes in the policy decisions from the PCF.

19. A system, comprising:
a session management function (SMF) comprising a first one or more processors;
a policy and charging control function (PCF) comprising a second one or more processors;
a first memory coupled to the first one or more processors, the first memory storing instructions that, when executed by the first one or more processors, cause the SMF to perform operations comprising:
receiving, from a wireless device, a time sensitive networking (TSN) bridge parameter comprising port information of a TSN bridge;
sending, to the PCF, a request for policy information, the request comprising the TSN bridge parameter; and
receiving, from the PCF, a response to the request, the response comprising policy information for the wireless device; and
a second memory coupled to the second one or more processors, the second memory storing instructions that, when executed by the second one or more processors, cause the PCF to perform operations comprising:
receiving, from the SMF, the request for policy information; and
sending, to the SMF, the response to the request.

20. The system, of claim 19, wherein the policy information comprises one or more user equipment route selection policy (URSP) rules.

* * * * *